United States Patent
Ortiz et al.

(10) Patent No.: US 12,260,442 B2
(45) Date of Patent: Mar. 25, 2025

(54) SYSTEMS AND METHODS FOR USER INTERFACE ORCHESTRATION AND PRESENTATION

(71) Applicant: ROYAL BANK OF CANADA, Toronto (CA)

(72) Inventors: Edison U. Ortiz, Orlando, FL (US); Gabriel Y. Woo, Toronto (CA); Ravi Khandavilli, Orlando, FL (US); Adel Al Nabulsi, Toronto (CA); Kirsten Mackereth, Toronto (CA); Justin Simonelis, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 274 days.

(21) Appl. No.: 18/082,513

(22) Filed: Dec. 15, 2022

(65) Prior Publication Data
US 2023/0186376 A1 Jun. 15, 2023

Related U.S. Application Data

(60) Provisional application No. 63/289,974, filed on Dec. 15, 2021.

(51) Int. Cl.
| | |
|---|---|
| G06Q 30/06 | (2023.01) |
| G06F 9/451 | (2018.01) |
| G06Q 30/0207 | (2023.01) |
| G06Q 30/0601 | (2023.01) |
| G06Q 30/0251 | (2023.01) |

(52) U.S. Cl.
CPC ......... *G06Q 30/0625* (2013.01); *G06F 9/451* (2018.02); *G06Q 30/0222* (2013.01); *G06Q 30/0224* (2013.01); *G06Q 30/0631* (2013.01); *G06Q 30/0641* (2013.01); *G06Q 30/0255* (2013.01)

(58) Field of Classification Search
None
See application file for complete search history.

(56) References Cited

U.S. PATENT DOCUMENTS

| | | | | |
|---|---|---|---|---|
| 8,881,047 | B2 * | 11/2014 | Stewart | G06F 9/451 715/781 |
| 9,837,124 | B2 * | 12/2017 | Wolfkill | H04N 5/9305 |
| 11,893,597 | B2 * | 2/2024 | Ortiz | H04L 63/083 |

(Continued)

*Primary Examiner* — Nicholas D Rosen
(74) *Attorney, Agent, or Firm* — Norton Rose Fulbright Canada LLP

(57) ABSTRACT

There is provided a computer system and method for orchestrating a user interface, the method include: obtaining a first data set representative of intercepted data communication messages between a user interface of a user and a merchant hosting server; obtaining a second data set representing an instruction set for loading visual elements on the user interface provided from the merchant hosting server; analyzing the first data set to obtain one or more user-specific characteristics; determining if the user-specific characteristics associated with the user satisfy a trigger condition associated with a current resource offering; and responsive to a positive determination: injecting, into the instruction set for loading the visual elements on the user interface provided from the merchant hosting server, code corresponding to an interactive visual element corresponding to the current resource offering.

21 Claims, 41 Drawing Sheets

(56) References Cited

U.S. PATENT DOCUMENTS

2012/0102428 A1\* 4/2012 Stewart ................. G06F 3/0481
   715/781
2017/0004861 A1\* 1/2017 Wolfkill ............. H04N 21/4722
2018/0121980 A1\* 5/2018 Blass ................... G06Q 10/087

\* cited by examiner

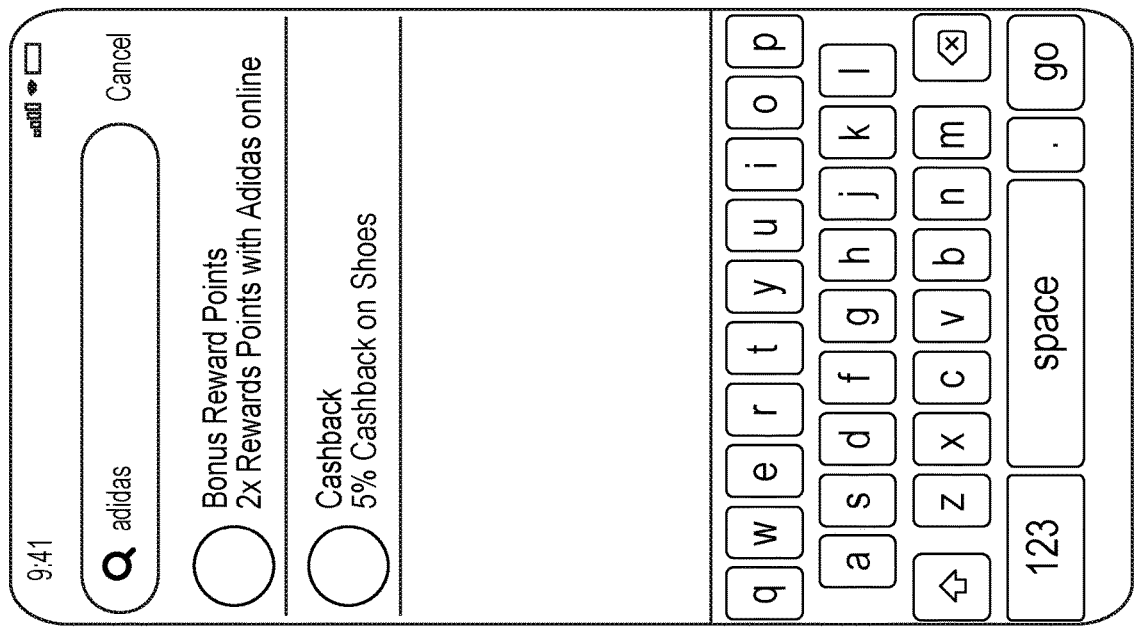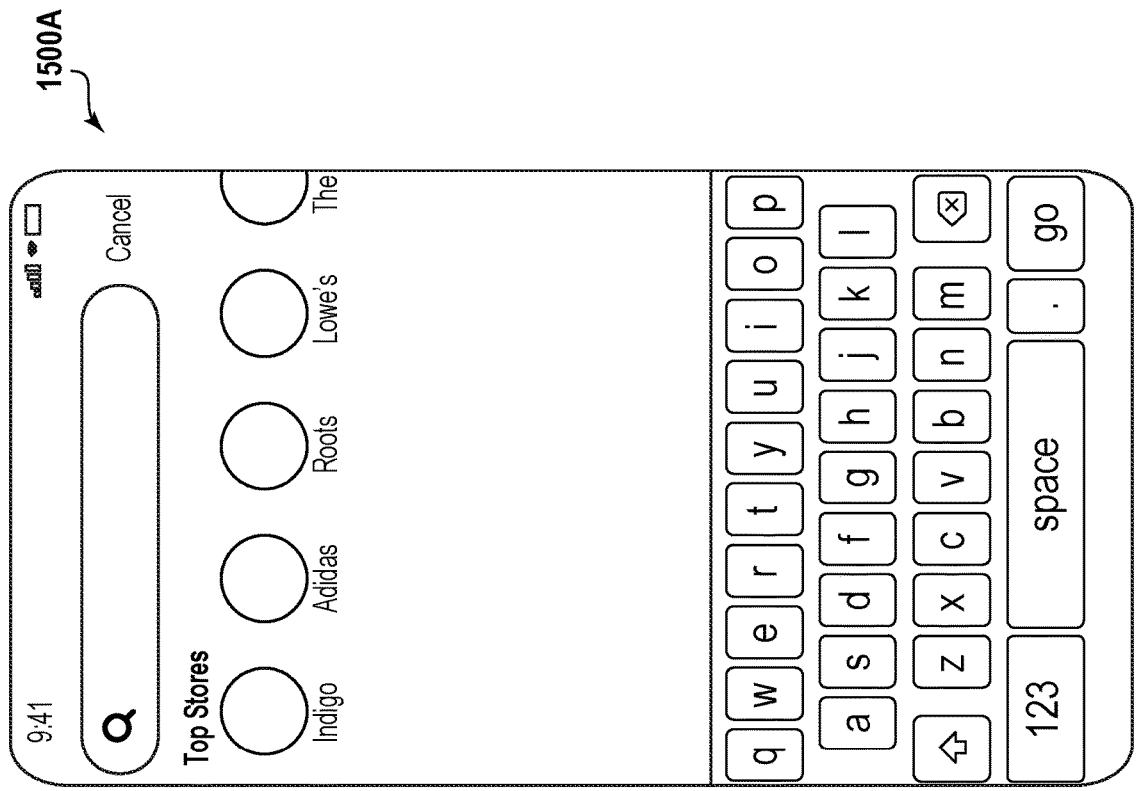
FIG. 15

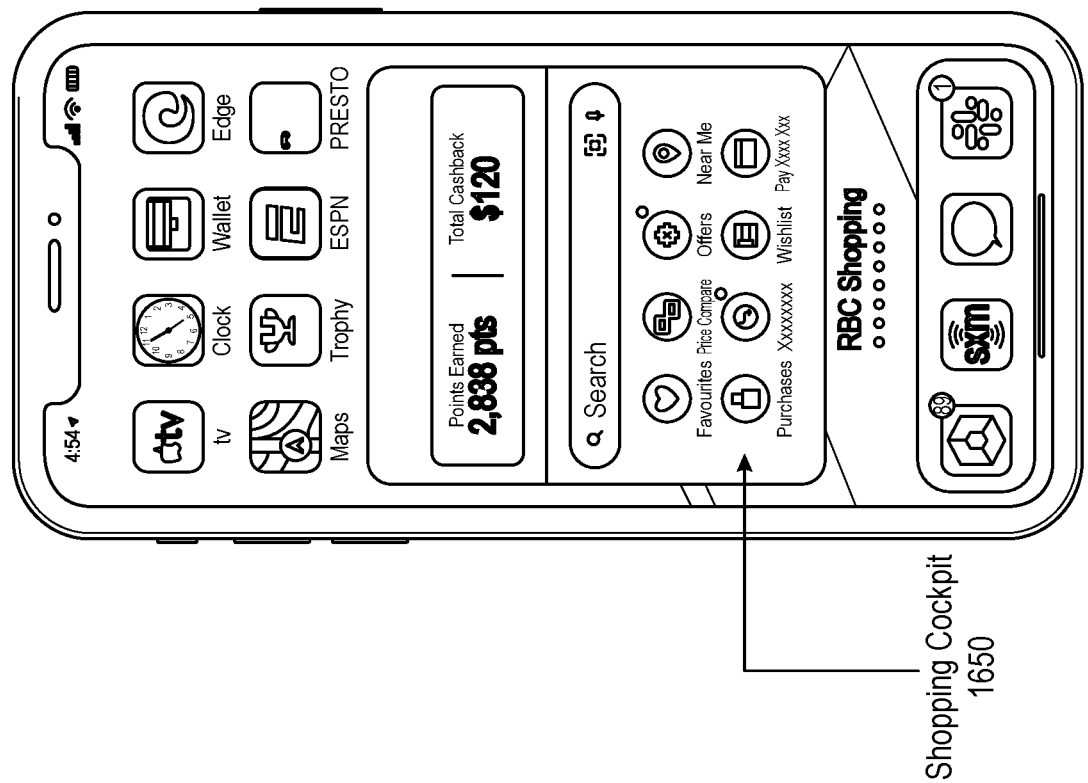
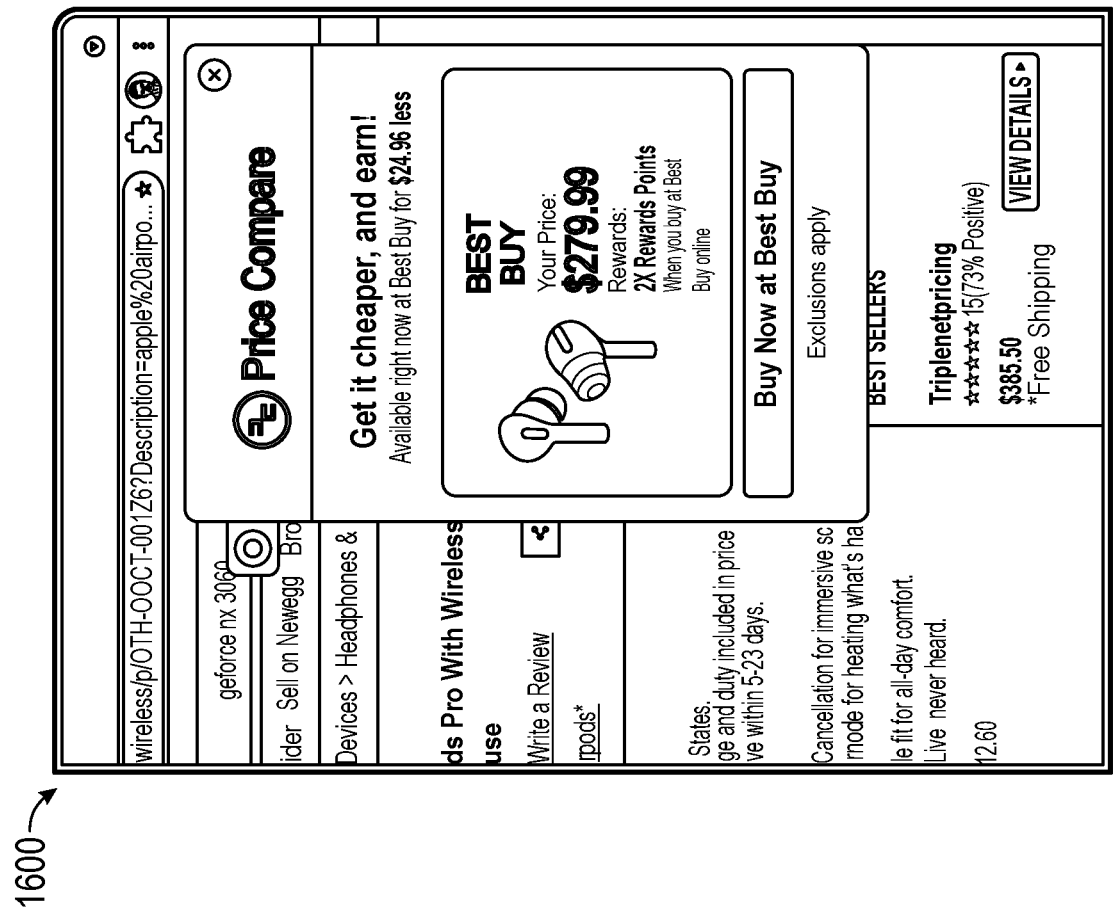
FIG. 16

SYSTEMS AND METHODS FOR USER INTERFACE ORCHESTRATION AND PRESENTATION

CROSS-REFERENCE TO RELATED APPLICATION

This application claims the benefit of and priority to U.S. provisional patent application No. 63/289,974 filed on Dec. 15, 2021, the entire content of which is herein incorporated by reference.

FIELD

Embodiments of the present disclosure generally relate to the field of computer-generated predictive recommendations, and more specifically, embodiments relate to devices, systems and methods for orchestrating and presenting user interface journeys using computer-generated predictive recommendations.

INTRODUCTION

User interface payment flows can be implemented using static logic such that the user interface provides a search bar and non-customized results and/or payment flows can be used to effect a payment.

As tracking cookies may no longer be a practical source of analytics information due to privacy concerns and enhanced privacy regulations, an improved approach for targeted and consent-based analytics, offers, product recommendations, and coupon delivery is desirable.

SUMMARY

An improved approach for orchestrating user interface journeys using computer-generated predictive recommendations is described in various embodiments. In particular, the computer-generated predictive recommendations are generated based on datasets representative of (1) the user's tracked behavior (such as search queries and browsing paths), (2) the user's profile data (prior user characteristic information gathered or provided in respect of a particular user), and/or (3), information relating to a cross-section or a population of users having similar characteristics as the user. The user profile data is only captured or stored for users that have explicitly consented to such capturing and storing.

The predictive recommendations can be computationally instantiated in the form of triggered data objects representing offers, coupons, product recommendations (e.g., product ratings, sustainability scores [e.g., ESG scores], metrics), among others, such that the user's experience is enhanced in-journey (e.g., additional information is provided to aid in the research journey or to provide various types of discounts or offers. The triggered data objects may be triggered based on one or more trigger conditions.

The approach can be enhanced with additional privacy-safeguarding mechanisms, such as the usage of a "virtual clean room" to operate as a privacy-enhancing data storage that can be used not only to enhance the privacy of the user, but to allow campaign targeting that can span across the loaded data sets of multiple parties who do not need to trust each other with access to potentially sensitive or proprietary data sets.

The user interface journeys are adapted to provide a "companion" shopping experience, providing search & discovery capabilities, that, for example, can be combined with different types of offer surfacing (e.g., Best Value Offers) or payment option surfacing (e.g., Pay your Way flexibility), using computer-generated predictive recommendations to selectively deliver the options (e.g., all delivered naturally "in a shoppers' path").

These in-path injections can be activated by trigger conditions, and can also include aspects such as offers, coupons, product recommendations, etc., having specific trigger conditions for generating and surfacing of corresponding visual interactive user interface elements. For product recommendations, these can be ratings or scores obtained from third party sources, or in some embodiments, the system estimates these for certain merchants or offers based on select features (e.g., location, hydro bills, number of transactions, industry type).

The approach is adapted to enhance the user experience (and user value) through, for example, selectively causing various types of user interface control elements (e.g., visual interactive user interface elements) to be surfaced or otherwise rendered during particular set points within an eCommerce search/payment flow. For example, the shopping behavior can be captured at an initiation of a search, and this information can be coupled to the user such that, for example, SKU-level data can be obtained in respect of particular types or specific products that the user is seeking to purchase.

The shopping behavior information, in an optional embodiment, can be extended with additional user profile information or population-level profile information to enrich the data set. The user profile information is only captured or stored for users that have explicitly consented to such capturing and storing.

The shopping journey, from a computational perspective, is comprised of a series of state transitions between different user interface interaction points and/or in person interaction points (which can be tracked through in-person payment devices). In particular, the approach is adapted to intercept shoppers on their natural journeys, for example, by injecting computer-generated prompts into search results (e.g., up to 5% cashback), browsing results, payment flows, among others.

In an example embodiment, a user interface is coupled or otherwise adapted to interoperate with computational elements of a UI journey orchestration system.

The UI journey orchestration system in some embodiments, includes a front-end specialized mobile application having a customized user interface that provides an ability for a user to conduct searches, browse merchant user interfaces, and conduct payments. In another embodiment, the UI journey orchestration system includes a front-end browser extension that interoperates with an existing browser to inject or otherwise modify the rendering of information on the existing browser.

The UI journey orchestration system front-end, in some embodiments, is configured to intercept webpage (e.g., HTML, PHP) or mobile application information (e.g., Javascript object notation (JSON) data objects), and inject additional user interface control elements into the page to modify how the user interface is ultimately rendered for the user (e.g., new prompts, or information modal windows are provided to the user, showing offers, coupons). In another embodiment, the UI journey orchestration system front-end operates through generating overlays that are positioned on or relative to the existing user interface that, for example, can be interacted with by the user (e.g., using a hover, a touch input) to show various offers and coupons that can be utilized as part of the research or payment process.

The UI journey orchestration system back-end can include one or more computer servers that are configured to interoperate with user data to generate predictive recommendations while respecting privacy options and considerations of the user. The UI journey orchestration system back-end can, generate predictive recommendations that are used to modify which, when, and/or how offers or coupons are presented in-journey to the user. For example, the UI journey orchestration system back-end, in some embodiments, can modify eligibility of the audience of a particular offer, the timing in which the offer is presented in respect of a user's flow (that may, for example, be customized for the particular user), and even the specific order, user interface rendering characteristics (color, shape, special effects) for a particular user.

The predictive recommendations can, in some embodiments, be tailored through the usage of machine learning and feedback loops to optimize various characteristics of interactions with the orchestrated user interface elements. In some embodiments, the usage of machine learning and feedback loops can be used to train and/or refine a maintained set of data objects that represent, in a data model architecture, tunable parameters associated with various features of the orchestrated user interface elements.

The data model architecture can be optimized (through supervised training using prior tracked results, or reinforcement learning using real-world results) in relation to various metrics of offer engagement, such as a number of interactions with offers, or a number of consummated offers. The tunable parameters, for example, can be configured to control predictive outputs in respect of, for example, selecting between different options for rendering or surfacing of the user interface elements, such as when in a payment or research process the offers should be presented, in what type of user interface control element (e.g., text box, badge), and other characteristics of the user interface control element (e.g., size, color). From a selection perspective, the data model architecture can also be used to generate a "next most likely to be used offer" and/or rank display of offers or coupons accordingly, customized for the specific user.

Upon detection of an outcome (e.g., payment was made) or after the lapse of time, the UI journey orchestration system back-end can update the user profile and/or effect the discounts or other benefits provided by the offer or coupon by, for example, updating a user's account or transaction data with cashback information or an offer redemption.

In some aspect, there is provided a computer system for orchestrating user interface modifications, the system may include: a processor; a communication interface; a non-transitory computer readable memory in communication with the processor, the memory storing software code, when executed, cause the system to: obtain through the communication interface, a first data set representative of intercepted data communication messages between a user interface of a user and a merchant hosting server, the first data set representing queries or navigation inputs entered by the user on the user interface; obtain through the communication interface, a second data set representing an instruction set for loading visual elements on the user interface provided from the merchant hosting server; analyze the first data set to obtain one or more user-specific characteristics; determine if the user-specific characteristics associated with the user satisfy one or more trigger conditions associated with a current resource offering; and responsive to a determination that the user-specific characteristics associated with the user satisfy the one or more sets of trigger conditions: inject, into the instruction set for loading the visual elements on the user interface provided from the merchant hosting server, code corresponding to an interactive visual element corresponding to the current resource offering such that the user interface renders the interactive visual element; receive a navigation input from the user indicating, through the interactive visual element, that the current resource offering is executed by the user; and execute a set of machine codes associated with the current resource offering to cause the user interface to render a shopping interface for the user.

In some embodiments, the trigger condition is associated with at least one of an in-journey offer, an in-journey coupon, and an in-journey product recommendation.

In some embodiments, at least one of the first data set and the second data set are provided to a database corresponding to the user stored on a protected data storage to update a user profile of the user. The user profile data is only captured or stored for users that have explicitly consented to such capturing and storing.

In some embodiments, the software code, when executed, further cause the system to: process one or both of the first data set and the second data set to estimate a state position of a browsing journey of the user for browsing a product or a service; and inject the code into the instruction set for loading visual elements on the user interface based on at least on the estimated state position of the browsing journey of the user.

In some embodiments, the trigger condition is associated with a target set of one or more target state positions, and the injection of the instruction set for loading visual elements on the user interface provided from the merchant hosting server occurs at a visual position corresponding to a visual frame associated with one of the one or more target state positions associated with the trigger condition.

In some embodiments, a machine learning model architecture representative of user preferences is maintained on the protected data storage, and the machine learning model architecture representative of user preferences is periodically trained based on action value pairs representing rendering characteristics of triggers associated with the navigation input from the user indicating, through the interactive visual element, that the trigger condition has positively interacted to optimize a loss function to tune the rendering characteristics to automatically improve a probability of a positive interaction; and the machine learning model architecture representative of user preferences is utilized to determine the rendering characteristics associated with a interactive visual element associated with the trigger condition.

In some embodiments, the rendering characteristics include a selection of a target state position from the target set of the one or more target state positions, the selection of the target state position determining when in the browsing journey of the user the interactive visual element will be rendered.

In some embodiments, the one or more target state positions include one or more of: a research state, a browsing state, a purchasing state, a payment selection state, and a purchased state.

In some embodiments, the data sets representative of intercepted data communication messages between a user interface of a user and a merchant hosting server are intercepted from communications between at least one of a mobile application, a customized browser having interfaces for communicating the data communication messages, or a browser extension coupled to a browser, the browser extension having the interfaces for communicating the data communication messages.

In some embodiments, the rendering characteristics include at least one of a size, a position, a color, or an opacity of the interactive visual element.

In accordance with another aspect, there is provided a computer-implemented method for orchestrating user interface modifications, the method include: obtaining, through a communication interface, a first data set representative of intercepted data communication messages between a user interface of a user and a merchant hosting server, the first data set representing queries or navigation inputs entered by the user on the user interface; obtaining, through the communication interface, a second data set representing an instruction set for loading visual elements on the user interface provided from the merchant hosting server; analyzing the first data set to obtain one or more user-specific characteristics; determining if the user-specific characteristics associated with the user satisfy one or more trigger conditions associated with a current resource offering; and responsive to a determination that the user-specific characteristics associated with the user satisfy the one or more sets of trigger conditions: injecting, into the instruction set for loading the visual elements on the user interface provided from the merchant hosting server, code corresponding to an interactive visual element corresponding to the current resource offering such that the user interface renders the interactive visual element; receiving a navigation input from the user indicating, through the interactive visual element, that the current resource offering is executed by the user; and executing a set of machine codes associated with the current resource offering to cause the user interface to render a shopping interface for the user.

In some embodiments, the trigger condition is associated with at least one of an in-journey offer, an in-journey coupon, and an in-journey product recommendation.

In some embodiments, at least one of the first data set and the second data set are provided to a database corresponding to the user stored on a protected data storage to update a user profile of the user.

In some embodiments, the method may include: processing one or both of the first data set and the second data set to estimate a state position of a browsing journey of the user for browsing a product or a service; and injecting the code into the instruction set for loading visual elements on the user interface based on at least on the estimated state position of the browsing journey of the user.

In some embodiments, the trigger condition is associated with a target set of one or more target state positions, and the injection of the instruction set for loading visual elements on the user interface provided from the merchant hosting server occurs at a visual position corresponding to a visual frame associated with one of the one or more target state positions associated with the trigger condition.

In some embodiments, a machine learning model architecture representative of user preferences is maintained on the protected data storage, and the machine learning model architecture representative of user preferences is periodically trained based on action value pairs representing rendering characteristics of triggers associated with the navigation input from the user indicating, through the interactive visual element, that the trigger condition has positively interacted to optimize a loss function to tune the rendering characteristics to automatically improve a probability of a positive interaction; and the machine learning model architecture representative of user preferences is utilized to determine the rendering characteristics associated with a interactive visual element associated with the trigger condition.

In some embodiments, the rendering characteristics include a selection of a target state position from the target set of the one or more target state positions, the selection of the target state position determining when in the browsing journey of the user the interactive visual element will be rendered.

In some embodiments, the one or more target state positions include one or more of: a research state, a browsing state, a purchasing state, a payment selection state, and a purchased state.

In some embodiments, the data sets representative of intercepted data communication messages between a user interface of a user and a merchant hosting server are intercepted from communications between at least one of a mobile application, a customized browser having interfaces for communicating the data communication messages, or a browser extension coupled to a browser, the browser extension having the interfaces for communicating the data communication messages.

In some embodiments, the rendering characteristics include at least one of a size, a position, a color, or an opacity of the interactive visual element.

In accordance with yet another aspect, there is provided a non-transitory computer-readable storage medium storing instructions which when executed adapt at least one computing device to: obtain through a communication interface, a first data set representative of intercepted data communication messages between a user interface of a user and a merchant hosting server, the first data set representing queries or navigation inputs entered by the user on the user interface; obtain through the communication interface, a second data set representing an instruction set for loading visual elements on the user interface provided from the merchant hosting server; analyze the first data set to obtain one or more user-specific characteristics; determine if the user-specific characteristics associated with the user satisfy one or more trigger conditions associated with a current resource offering; and responsive to a determination that the user-specific characteristics associated with the user satisfy the one or more sets of trigger conditions: inject, into the instruction set for loading the visual elements on the user interface provided from the merchant hosting server, code corresponding to an interactive visual element corresponding to the current resource offering such that the user interface renders the interactive visual element; receive a navigation input from the user indicating, through the interactive visual element, that the current resource offering is executed by the user; and execute a set of machine codes associated with the current resource offering to cause the user interface to render a shopping interface for the user.

BRIEF DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, where in the figures:

FIG. 15 is a rendering showing a set of example screenshot renderings where available offers can be searched and interacted with by the user, according to some embodiments.

FIG. 16 is a rendering showing an example screenshot rendering where the system is adapted as a browser extension and an example screenshot rendering where the system is adapted as a home screen widget, according to some embodiments.

DETAILED DESCRIPTION

Figure 1A:
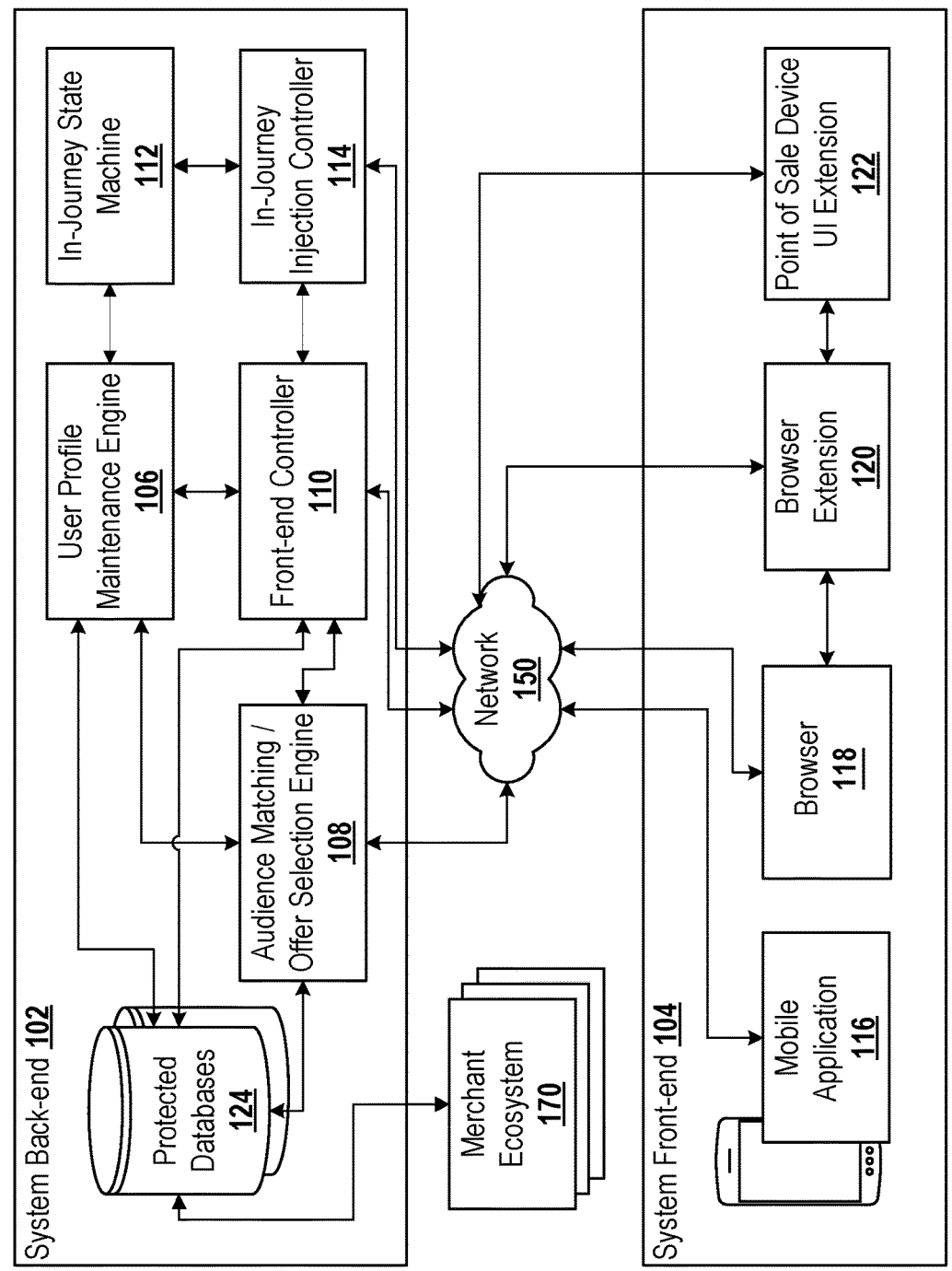
FIG. 1A is a block schematic diagram of an example UI journey orchestration system, according to some embodiments.

An improved approach for orchestrating and presenting visual elements for improving an user interface using computer-generated predictive recommendations is described in various embodiments.

The user interface journeys are adapted to provide a "companion" shopping experience, providing search & discovery capabilities, that, for example, can be combined with different types of offer surfacing (e.g., Best Value Offers) or payment option surfacing (e.g., Pay your Way flexibility), using computer-generated predictive recommendations to selectively deliver the options (e.g., all delivered naturally "in shoppers' path").

The approach is adapted to enhance the user experience (and user value) through, for example, selectively causing various types of user interface control elements to be surfaced or otherwise rendered during particular set points within an eCommerce search/payment flow. For example, the shopping behavior can be captured at an initiation of a search, and this information can be coupled to the user such that, for example, SKU-level data can be obtained in respect of particular types or specific products that the user is seeking to purchase.

The shopping behavior information, in an optional embodiment, can be extended with additional user profile information or population-level profile information to enrich the data set.

The shopping journey, from a computational perspective, is comprised of a series of state transitions between different user interface interaction points and/or in person interaction points (which can be tracked through in-person payment devices). In particular, the approach is adapted to intercept shoppers on their natural journeys, for example, by injecting computer-generated prompts into search results (e.g., up to 5% cashback), browsing results, payment flows, among others.

The user interface is coupled or otherwise adapted to interoperate with computational elements of a UI journey orchestration system through injection either directly into rendering code, or through the positioning of an graphical overlay overtop a user interface. The injection, in some embodiments, can include the selective surfacing, re-ordering or re-positioning of visual elements corresponding to various injected offers, coupons, product recommendations, among others.

In another embodiment, additional machine-learning features are implemented and utilized to augment the ability of the system to automatically adapt and optimize activities through refinement over a period of iterations or time. Machine-learning features can be utilized, for example, to test different perturbations of selective surfacing, re-ordering, or re-positioning of the visual elements, or characteristics themselves of the visual elements, such as a size, a height, a color, an opacity, among others, and the machine-learning features can be maintained on one or more different trained machine learning model architectures, such as on a local model architecture maintained for a specific user, a group-level model architecture maintained for a specific demographic group (e.g., age range, education level, estimated level of technology familiarity) of a user, or a population-level model architecture maintained for all users.

FIG. 1A is a block schematic diagram 100 of an example UI journey orchestration system, according to some embodiments.

The UI journey orchestration system 100 is a computer system that includes both a system back-end 102 configured for updating and/or maintaining user profile information, generating predictive recommendations data objects, and then controlling a front-end 104 to surface or present the predictive recommendations through a front-end user interface. The front-end 104 can be coupled to the back-end 102 through a network 150, such as a local area network, or a wide area network, such as an intranet, or the Internet.

The system front-end 104 is configured for interoperation with the system back-end 102, and the system front-end 104 controls the presentment of predictive recommendations through a front-end user interface through the provisioning of signals and control instructions to a coupled user interface to render interactive visual control elements that can be interacted with, for example, through a touch interface or another type of input to indicate acceptance or to request more information in respect of a particular in-journey offer or coupon.

The system front-end 104 can include different types of front-end clients, such as mobile applications 116 having an embedded user interface for shopping, a browser 118 that includes native functionality and interface calls for interoperating with the system backend 102, a browser extension 120 (e.g., mobile browser extension) that includes extended functionality and interface calls for transforming a standard browser to one that can interoperate with system back-end 102, as well as user interfaces that are provided as a point of sale (PoS) device extension 112, surfacing offers and coupons as part of the selections on a PoS device during a physical checkout process (e.g., when the user enters a debit card directly into the PoS device, the injection could occur during the selection between payment using a chequing or a savings account).

The system back-end 102 includes a user profile maintenance engine 106, an audience matching/offer selection engine 108, a front-end controller 110, an in-journey state machine 112, and an in-journey injection controller 114.

User profile maintenance engine 106 is configured for periodically or continuously updating a corresponding user profile as new data objects are obtained from one or more system front-end 104 devices. These new data objects can be provided, for example, in the form of intent-type data objects, such as search queries, browsing navigation selections, among others, and also in the form of outcome-type data objects, such as payment fulfillment, a shopping cart checkout, etc.

Audience matching/offer selection engine 108 is configured for determining eligibility of a user and/or selection by the system of specific offers or coupons data objects for presentment to the user.

Front-end controller 110 interoperates with the front-end client devices 104, such as mobile application 116, a browser 118, a browser extension 120, and/or a point of sale device user interface extension 112 to both obtain inputs relating to the user journey for processing by the in-journey state machine 112, and to provide inputs to control the rendering of user interface elements by the in-journey injection controller 114.

The system front-end 104 provides, for example a specialized mobile application 116 having a customized user interface that provides an ability for a user to conduct searches, browse merchant user interfaces, and conduct payments. In another embodiment, the UI journey orchestration system includes a front-end browser extension 120 that interoperates with an existing browser to inject or otherwise modify the rendering of information on the existing browser.

The UI journey orchestration system front-end controller 110, in some embodiments, is configured to intercept webpage (e.g., HTML, PHP) or mobile application information (e.g., Javascript object notation (JSON) data objects). The intercepted information can be obtained in different ways, such as using an HTTPS proxy for routing interaction information directly from the mobile application 116 or a browser 118, selectively transmitting information extracted by a browser extension 120, or through the use of an inspect element tool to allow the accessing of a source code of a web page or a merchant interface.

User input information can also be tracked, such as specific clicks, keyboard entries, touch inputs, etc., especially those that relate to the navigation through or queries using the user interface.

The UI journey orchestration system front-end controller 110 operates with the in-journey state machine 112 that is configured to track or estimate a current position of the user's progress through a defined series. The in-journey state machine 112 can track one or more defined shopping journeys that are explicitly identified by the user (e.g., home renovation project information gathering, summer vacation planning), or in some embodiments, one or more freeform shopping journeys that are identified heuristically by the system (e.g., the user is conducting searches on backpacks and outdoor accessories, so the system estimates that the user is going to go on an outdoor excursion).

Freeform shopping journeys can be identified through clustering approaches or various unsupervised learning based classification approaches such that a number of similar searches can be mapped to a constellation, and a critical mass of similar searches having a similar search space or search distance can be utilized to determine a new bucket for a freeform shopping journey. This is useful because sometimes a user's search may be a bit scattered in their thinking as decisions are organically made and conceptions are tested and discarded (e.g., started searching one thing that ultimately led to something else—this can be reflected in the search patterns).

The in-journey state machine 112 can be configured to track, in a state representation generated for each defined or freeform shopping journey a progress level of the browsing journey. The state representation, for example, can be represented in the form of linked data objects having relationships between one another that control state transitions either forward, parallel, or backwards between different states.

Example states, for example, could include an initial broad information gathering/search state, followed by a narrower comparison state, a confirmed decision/purchasing in progress state, and a final purchased state. These representations and their logical flows could utilize aspects such as linked lists, dynamic objects, etc., to represent various characteristics and automatic transition mechanisms that allow for transitions between different states.

In some embodiments, the system continually or periodically estimates an existing state based on known information, recognizing that not all information is tracked by system 100, and that the user may also be jumping between states (e.g., the user has already made up the user's mind on what item and is simply seeking the lowest price among various merchants).

At different points in the journey, different offers, coupons, and product recommendations are surfaced through the injection of additional user interface control elements by in-journey injection controller 114 into the page to modify how the user interface is ultimately rendered for the user (e.g., new prompts, or information modal windows are provided to the user, showing offers, coupons).

The in-journey injection controller 114 may, in some embodiments, identify the structure of a webpage or a response message (e.g., through interrogating a document object model (DOM) structure), and directly modify the rendered user interface through the identification of sections in the DOM structure and then modifying or transforming visually neighboring (as defined in the hierarchy of the DOM structure) code to add in or call a function to add in a new window, a new visual element, a badge, text, etc.

In another embodiment, the UI journey orchestration system front-end controller 110 operates through controlling the in-journey injection controller 114 for the generation of overlays that are positioned on or relative to the existing user interface that, for example, can be interacted with by the user (e.g., using a hover, a touch input) to show various offers and coupons that can be utilized as part of the research or payment process. The overlays can be, for example, rendered as interactive buttons, badges, etc., that can be overlaid overtop an existing user interface. The overlays can also be positioned or identified through interrogation of the DOM structure, and suitable coordinate positions can be used as anchor points for generating the overlays (e.g., where to place a badge, where to place a textbox).

Accordingly, in-journey injection controller 114 is configured to inject code snippets for rendering either into the user interface or to be overlaid overtop the user interface, and these are utilized to modify how the user interacts with and observes the browsing journey through the user interface.

The UI journey orchestration system back-end 102 can include one or more computer servers that are configured to interoperate with user data to generate predictive recommendations while respecting privacy options and considerations of the user. The UI journey orchestration system back-end 102, through audience matching/offer selection engine 108, generates predictive recommendations that are used to modify which, when, and/or how offers or coupons are presented in-journey to the user.

The audience matching/offer selection engine 108, in some embodiments, interoperates with one or more protected databases 124 (as shown further in the example of FIG. 2) that can house user information, merchant information, and other sensitive data sets, and in some embodiments, can also be utilized to orchestrate campaigns and offers through audience characteristic identification as obtained through merchant campaign controllers in a merchant ecosystem 170. The one or more protected databases 124 are loaded with data sets from parties that do not necessarily trust one another such that the data sets on the one or more protected databases 124 have specific privacy and access restrictions built-in such that access to the underlying or portions thereof data sets may be severely limited or not available, but only queries can be conducted or run against certain values in the data sets. The one or more protected databases 124 can associate specific data tables, columns, rows, values, fields, to specific controls and restrictions, etc.

For example, a bank, several insurance companies, a national electronics retailer, etc., can also load customer data into the one or more protected databases 124, and the customer data can include a primary key field that can be used to identify a particular user (without directly sharing the identity of the user). In an extended embodiment, the one or more protected databases 124 may also have a table recording information for each user where the user is able to control a level of access or availability for campaigns (e.g., logging in an opt-out or opt-in by the user, and different levels thereof, as reflected in the privacy settings of the one or more protected databases 124), and the user profile may also be, but not necessarily, stored in one or more protected databases 124.

The UI journey orchestration system back-end 102, in some embodiments, through audience matching/offer selection engine 108 can modify and eligibility of the audience of a particular offer, the timing in which the offer is presented in respect of a user's flow (that may, for example, be customized for the particular user), and even the specific order, user interface rendering characteristics (color, shape, special effects) for a particular user.

The one or more protected databases 124 can be queried to determine which users or whether a particular user falls within the bounds of characteristics of users who fall in a particular audience (e.g., students who live in particular area codes where there is substandard public transit coverage might be more predisposed to becoming good, long term customers of a subscription scooter service).

The audience generation can be used as a basis for establishing predictive recommendations in respect of offers, coupons, and product recommendations for surfacing for the user.

The predictive recommendations can, in some embodiments, be tailored through the usage of machine learning and feedback loops to optimize various characteristics of interactions with the orchestrated user interface elements. In some embodiments, the usage of machine learning and feedback loops can be used to train and/or refine a maintained set of data objects that represent, in a data model architecture, tunable parameters associated with various features of the orchestrated user interface elements.

The data model architecture can be optimized (through supervised training using prior tracked results, or reinforcement learning using real-world results) in relation to various metrics of offer engagement, such as a number of interactions with offers, or a number of consummated offers. The tunable parameters, for example, can be configured to control predictive outputs in respect of, for example, selecting between different options for rendering or surfacing of the user interface elements, such as when in a payment or research process the offers should be presented, in what type of user interface control element (e.g., text box, badge), and other characteristics of the user interface control element (e.g., size, color). From a selection perspective, the data model architecture can also be used to generate a "next most likely to be used offer" and/or rank display of offers accordingly, customized for the specific user.

Upon detection of an outcome (e.g., payment was made) or after the lapse of time, the UI journey orchestration system back-end can update the user profile and/or effect the discounts or other benefits provided by the offer by, for example, updating a user's account or transaction data with cashback information or an offer redemption.

Figure 1B:
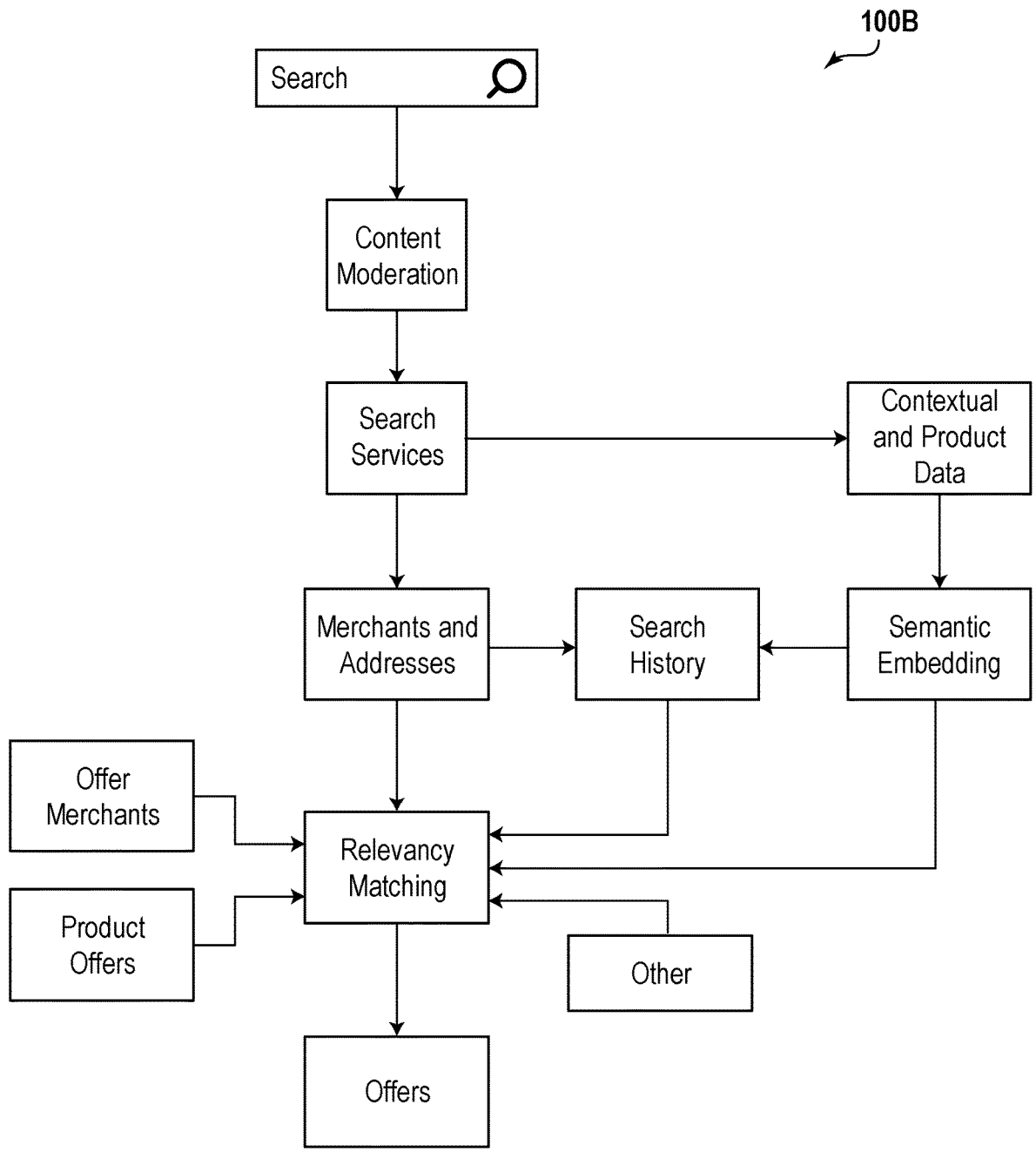
FIG. 1B is a workflow chart showing a computational method where relevancy matching is used to establish the surfacing of various offers, according to some embodiments.

FIG. 1B is a workflow chart 100B showing a computational method where relevancy matching is used to establish the surfacing of various offers, according to some embodiments.

Safe search and content moderation capabilities may be needed in certain situations. Natural language processing classifications (if only on text) can, for example, be introduced either through third party providers or in house model development, and search services could also have safe search features turned on where available.

Search services such as search engine APIs can be used as mature data sources to address product specific searches. (e.g., searching for 'px7' which is a headphones model). The search results typically include ranked merchant and non merchant websites. Additional information can be found on the product or merchant place type as an example with search engine services.

Any information on product, merchant, or site descriptions can be received by the system for downstream processing.

Merchant domains and subdomain information can be extracted from the web addresses returned and from offer merchant databases, and Custom NERs (Named Entity Recognition) can be used for this purpose as it could be more effective than applying regex or rule based approach to parsing merchant sites. This is useful as some merchants may not have their own domains but rather websites under social media platforms (e.g., Instagram™), and potentially, some merchants may have one domain serving multiple entities (e.g., related companies, such as the Gap, Banana Republic and Old Navy.

The returned results can be enhanced with a semantic understanding of returned searches, and returned results can include descriptions of products, sites need to be further processed to help improve on relevancy. If a user is searching for headphones and the only offers are merchant sites returned in the search for non audio or technology related products, that can definitely lead to a poor user experience.

Entity recognition and semantic embeddings alongside other NLP capabilities are potentially utilized to help for a better understanding of intents.

Search history inputs can be received by the system as processed results to also help with relevancy, as the user might be looking for book jackets in previous searches, and thus the system should not show offers or rather rank first offers on clothing.

Additional inputs from other predictive services, descriptive information (trending, popular) can also be also be aggregated as needed and used as additional weighted inputs to help for better offer ranking.

Figure 2:
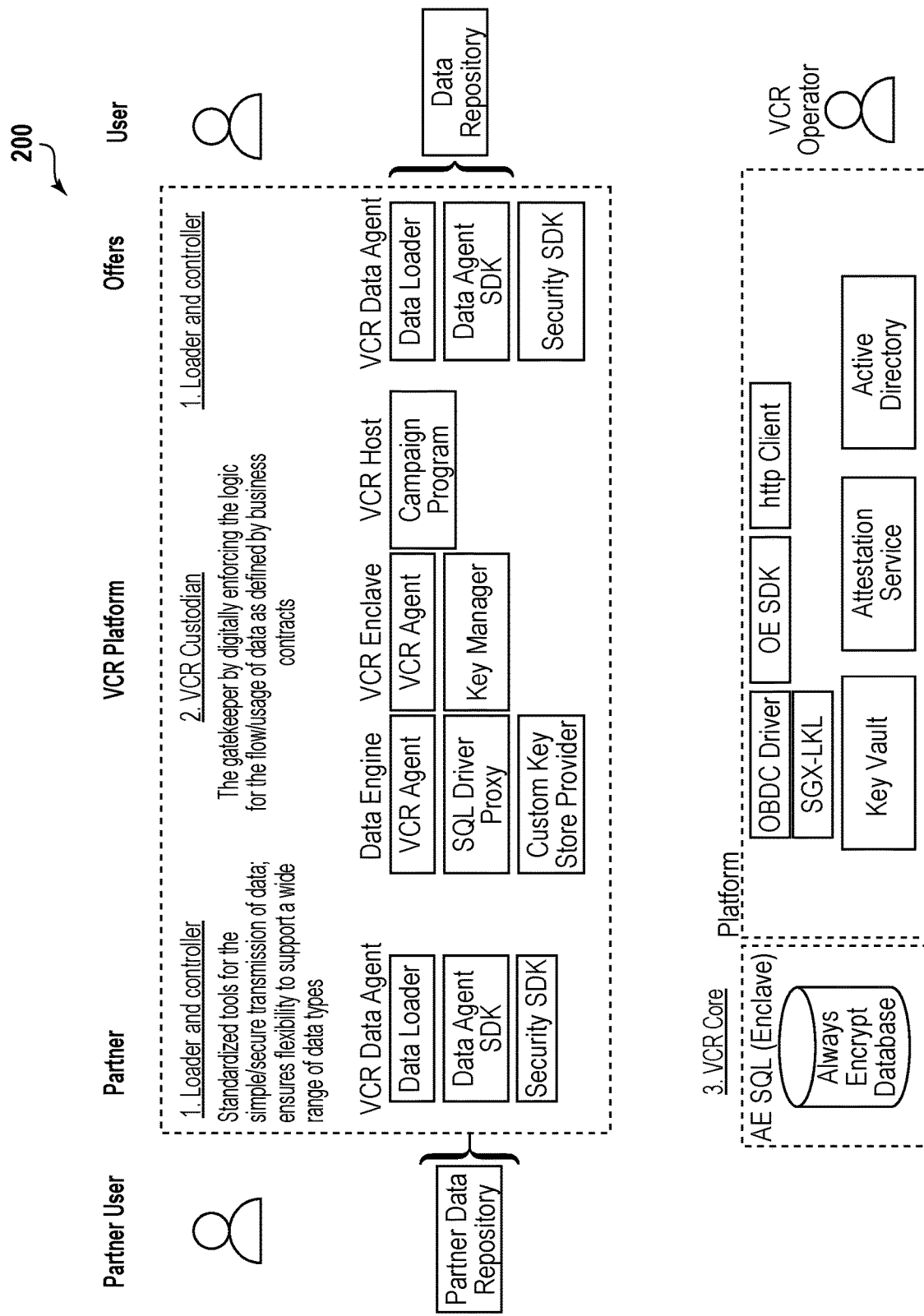
FIG. 2 is a block schematic system of an encrypted backend that can be used to support the UI journey orchestration system, according to some embodiments.

FIG. 2 is a block schematic 200 of an encrypted backend that can be used to support the UI journey orchestration system, according to some embodiments.

The encrypted backend provides an "always encrypted" computational infrastructure that utilizes encryption keys and protected memory areas along with trusted execution processors to establish a "virtual clean room" (VCR) whereby sensitive information, such as user information or merchant data tables can be stored securely. The backend in FIG. 2 can be used to support the protected databases 124 to provide a mechanism for handling data from a set of merchant or other type of data source partners. The data is provided and handled through an automated loader and controller process, and queries are handled using a custodian data process to restrict and otherwise control the types of outputs that are generated. A core backend is utilized to support the always encrypted database, which could include the protected databases 124, which utilize encryption keys and/or attestation services to secure access and to protect data stored thereon.

The secure analytics engine ensures confidential proprietary data is not visible, or accessible to other participating parties, while enabling insights generation.

Figure 3A:
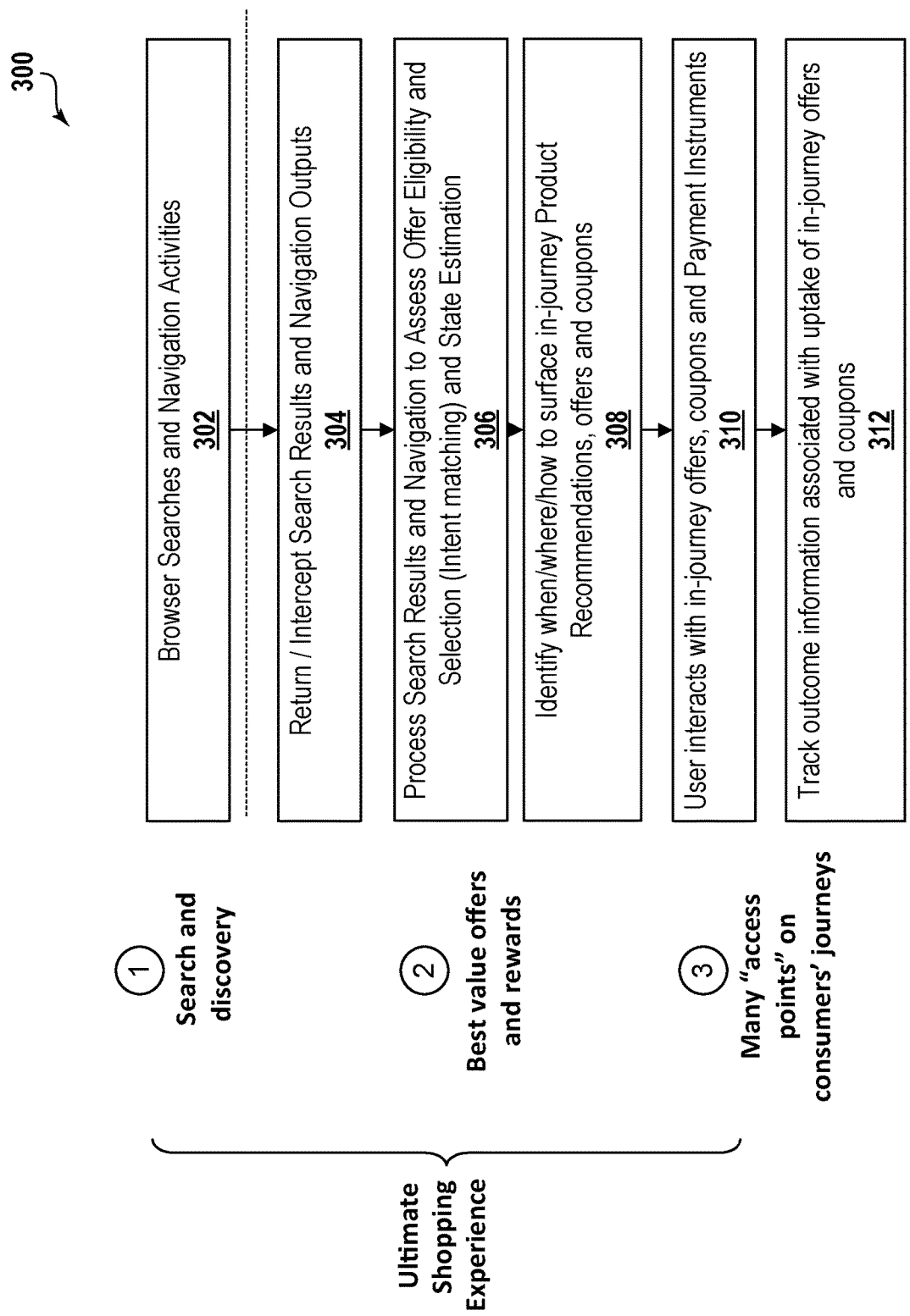
FIG. 3A is an illustration of an example process/workflow for a shopping experience, according to some embodiments.

FIG. 3A is an illustration of an example workflow 300 for a shopping experience, according to some embodiments.

From a user experience perspective, there are three major components to a shopping experience, and these include a search and discovery phase characterized by an information gathering process whereby a user seeks information to help begin a browsing journey (e.g., where from a homepage search, a user is able to search or take a photo of an item to buy), a value offers and rewards connection phase (e.g., user-specific or tailored offers and rewards can be appended on a merchant level, or a SKU-level basis), and the consummation of an offer or reward process through the user interacting with the offer or reward (e.g., in-path intercepts are utilized to show value to users on natural journeys, such as prompts injected into search results on browser, desktop and mobile).

From a computational perspective, the shopping journey, is comprised of a series of state transitions between different user interface interaction points and/or in person interaction points (which can be tracked through in-person payment devices). In particular, the approach is adapted to intercept shoppers on their natural journeys, for example, by injecting computer-generated prompts into search results (e.g., up to 5% cashback), browsing results, payment flows, among others.

The shopping aspects are captured at the initiation of a search, and personalization aspects are utilized to support discovery. Offers/coupons are aggregated for density and frequency, and proprietary or exclusive offers can be provided that help steer shoppers with merchant recommenders and SKU-level price recommenders (e.g., to drive demand for partner merchants).

The access points on the consumer journeys can extend from different platforms, such as from a mobile application to desktop, online eCommerce, and offline point of sale devices.

At step 302, browser searches and navigation activities are undertaken by the user. These can include, for example, keyword searches, such as for women's shoes, women's shoes sale, women's shoes 2021, etc., as shown in several examples described in further figures, or navigation activities, such as utilizing filters, interacting with different webpage navigation links (e.g., home page→outdoor sports→snowboard equipment→snowboard bindings, as reflected upon or extracted, for example, from cascaded URLs, dynamic HTML elements, captured webpage object information).

These browser searches and navigation activities are represented in the form of captured interaction elements from the front-end client to interact with a merchant back-end, and represent a data feed that can be provided to the system back-end 102 through the front-end controller 110, and stored, for example, in a user space within a protected database of the one or more protected databases 124.

At step 304, the merchant backend user interface transmits user interface information back to the user's device that can be captured through the system front-end 104, for example, through a customer browser, a mobile application, a browser extension, etc., and these results and corresponding response structure can be utilized to assess, for example, potential candidate positions for injection of in-journey visual elements by the in-journey injection controller 114, or to determine or estimate a state associated with the level of progression of a user's journey or journeys, as tracked by the in-journey state machine 112.

At step 306, the obtained information from the front-end 104 is processed by the audience matching/offer selection engine 108 to assess eligibility (e.g., if the user or the user's interaction falls into a defined scope). The obtained information from the front-end 104 effectively establishes an intent of the user, and the level of intent (as represented by a estimated state) and the type of user can then be used to establish specific computer-match-able criteria that can then be used against defined campaign characteristics for eligibility for a particular offer, coupon, or product recommendation. If multiple campaigns are on-going, there may be eligibility for multiple offer, coupon, or product recommendations, and in a further embodiment, the offer, coupon, or product recommendations can then be ranked relative to one another to determine an order position, size, or other visual characteristics reflecting the prominence or a rank of the particular offer, coupon, or product recommendation.

At step 308, upon determining what offers, coupons, or product recommendations are available, the system 100 then determines specifically how, when, and where to surface specific in-journey visual elements, including, at what states tracked in a state machine, and where in a user interface visual hierarchy or tree to insert a visual interactive object (e.g., an input box, a badge, a modal window, a selection radio box) indicative of the offers (e.g., the user appears to be purchasing a large amount of provisions for a camping trip, so a buy three get one free offer is provided for purchasing freeze dried food), coupons (e.g., a 5% discount is provided for front-line emergency workers), or product recommendations (e.g., this product is a highly rated set of value fireproof matches).

At step 310, once the visual interactive object is directly injected or overlaid, interactions thereof can be tracked to assess whether users are "redeeming" or otherwise interacting with the offers, coupons, or product recommendations. Product recommendation interactions can include expanding a window with a short recommendation video or analysis, or a star rating, etc. Upon an interaction with an offer or coupon, this can be used to modify in-process activities, such as modifying a shopping cart, or tracking a cashback promotion to be paid out later.

At step 312, a purchase may be consummated, for example, during the actual payment process, and any associated or interacted with product recommendations, offers, and coupons can both be tracked for required outcomes, and also to indicate a successful interaction in respect of a particular campaign or approach for injection or overlay. The purchase information may be loaded into the one or more protected databases 124 as another data point for the merchant, for a store, and/or for a user, and in some embodiments, the purchase information (or an indication of an abandonment or deviation from a journey) can also be used as part of a computational feedback loop to modify various model or parameter weightings to modify how and/or when the visual elements are surfaced. This can be used by the system 100 to automatically tune the system towards approaches that provide for good user uptake, and to automatically start avoiding approaches that provide for bad user uptake.

Figure 3B:
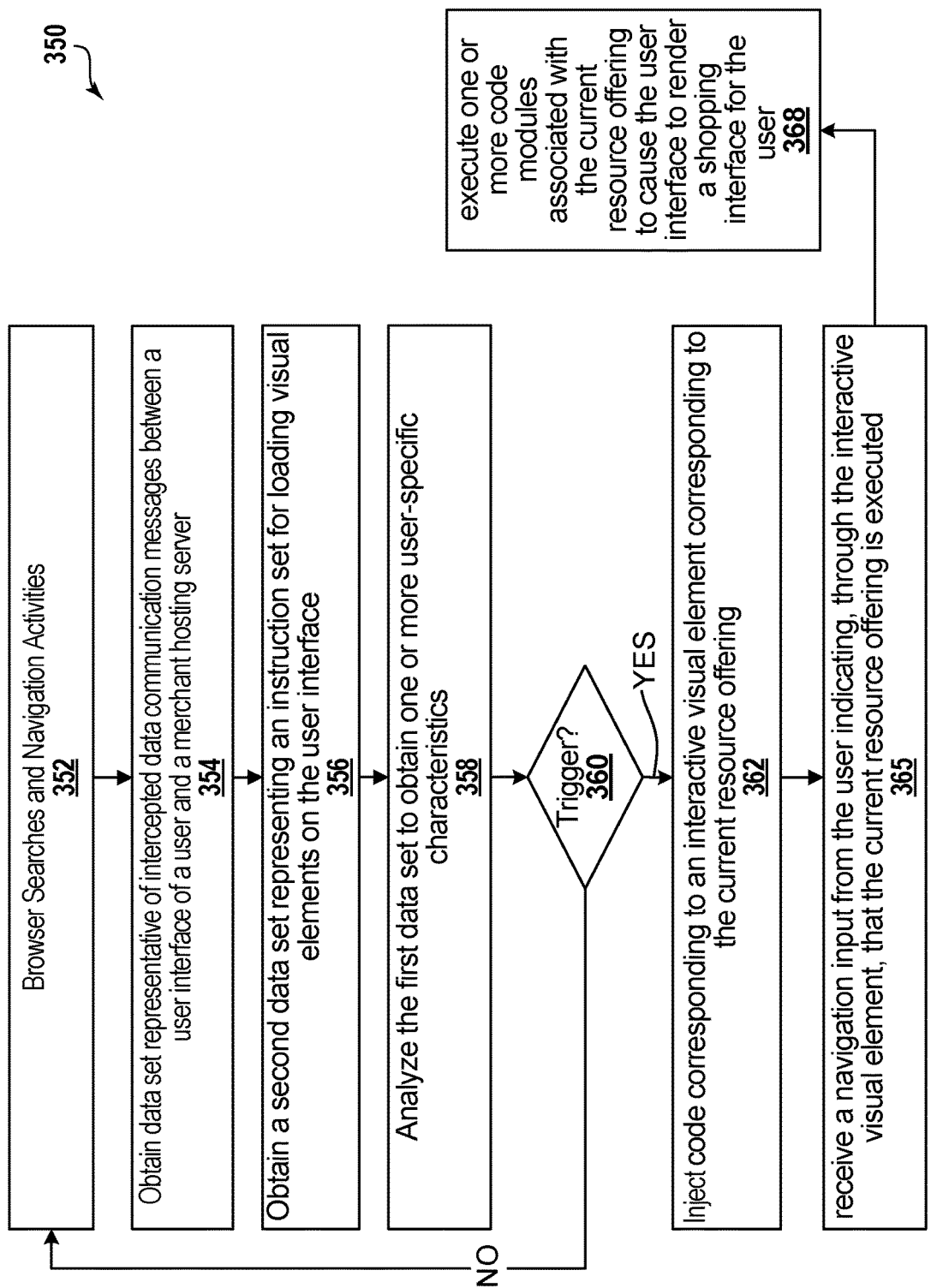
FIG. 3B is an illustration of another example process/workflow for a shopping experience, according to some embodiments.

FIG. 3B is an illustration of another example process/workflow 350 for a shopping experience, according to some embodiments.

At step 352, browser searches and navigation activities are undertaken by the user, through user input performed on the user interface. These can include, for example, keyword searches, such as for women's shoes, women's shoes sale, women's shoes 2021, etc., as shown in several examples described in further figures, or navigation activities, such as utilizing filters, interacting with different webpage navigation links (e.g., home page→outdoor sports→snowboard equipment→snowboard bindings, as reflected upon or extracted, for example, from cascaded URLs, dynamic HTML elements, captured webpage object information).

These browser searches and navigation activities are represented in the form of captured interaction elements from the front-end client to interact with a merchant back-end, and represent a data feed that can be provided to the system back-end 102 through the front-end controller 110, and stored, for example, in a user space within a protected database of the one or more protected databases 124.

The system 100 may monitor user activities and obtain data sets representative of intercepted data communication messages between the user interface and the merchant hosting server on the merchant backend.

At step 354, the system 100 obtains, through a communication interface connected to the front-end controller 110, a first data set representative of intercepted data communication messages between the user interface of the user and the merchant hosting server, the first data set representing queries or navigation inputs entered by the user on the user interface.

For example, the front-end controller 110, in some embodiments, is configured to intercept webpage (e.g., HTML, PHP) or mobile application information (e.g., Javascript object notation (JSON) data objects) by using an HTTPS proxy for routing interaction information directly from the mobile application 116 or a browser 118, selectively transmitting information extracted by a browser extension 120, or through the use of an inspect element tool to allow the accessing of a source code of a web page or a merchant interface.

In some embodiments, the browser 118 is a mobile browser 118. A mobile browser 118 may be launched by a call from the mobile application 116, or may be launched by the user outside of the mobile application 116.

User input information such as specific clicks, keyboard entries, touch inputs, etc., especially those that relate to the navigation through or queries using the user interface, can be obtained and stored accordingly.

In some embodiments, the data sets representative of intercepted data communication messages between a user interface of a user and a merchant hosting server are intercepted from communications between at least one of a mobile application, a customized browser having interfaces for communicating the data communication messages, or a browser extension coupled to a browser, the browser extension having the interfaces for communicating the data communication messages.

Figure 4:
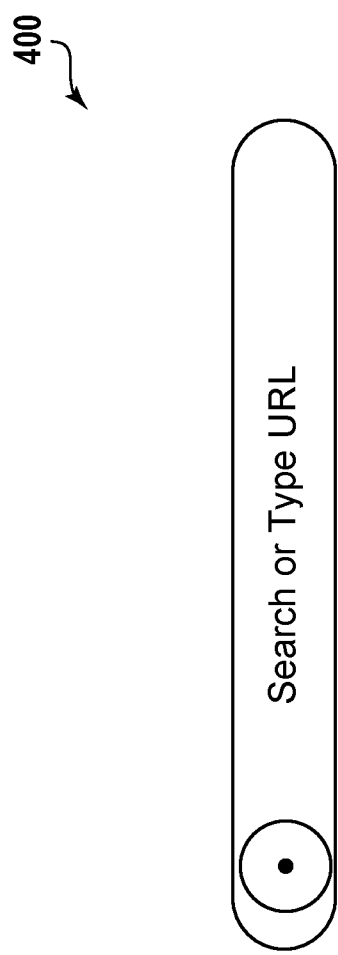
FIG. 4 is an illustration of an example search bar user interface element, according to some embodiments.

FIG. 4 is an illustration of an example search bar user interface element 400, according to some embodiments. In FIG. 4, a search bar is shown that can be provided as part of an interface in a browser 118, within the user interface of a mobile application 116, among others. The search bar receives a textual input, such as free text input, that can be encapsulated as part of a GET/POST HTTP message.

For example, the query string itself could be appended to the uniform resource locator (URL) that is sent to server controlling rendering of various elements of a merchant user interface. The merchant user interface could return, for example, various types of pages responding to the search result showing matches, relevant or potentially relevant content, etc., and the pages can be provided in the form of HTML code, JSON messages, XML messages, etc. Both of these message flows could be intercepted by system front-end 104 during transmission across network 150, for example, through a specialized API, a network proxy, among others.

For another example, the front-end controller 110 may operate with the in-journey state machine 112 to track or estimate a current position of the user's progress through a defined series. The in-journey state machine 112 can track one or more defined shopping journeys that are explicitly identified by the user (e.g., home renovation project information gathering, summer vacation planning), or in some embodiments, one or more freeform shopping journeys that are identified heuristically by the system (e.g., the user is conducting searches on backpacks and outdoor accessories, so the system estimates that the user is going to go on an outdoor excursion).

Freeform shopping journeys can be identified through clustering approaches or various unsupervised learning based classification approaches such that a number of similar searches can be mapped to a constellation, and a critical mass of similar searches having a similar search space or search distance can be utilized to determine a new bucket for a freeform shopping journey. This is useful because sometimes a user's search may be a bit scattered in their thinking as decisions are organically made and conceptions are tested and discarded (e.g., started searching one thing that ultimately led to something else—this can be reflected in the search patterns).

At step 356, the system 100 obtains, through the communication interface connected to the front-end controller 110, a second data set representing an instruction set for loading visual elements on the user interface provided from the merchant hosting server. In some embodiments, at least one of the first data set and the second data set are provided to a database corresponding to the user stored on a protected data storage to update a user profile of the user.

The system 100 may, through the front-end controller 110, identify the structure of a webpage (e.g., through interrogating the DOM structure of a HTML webpage loaded on the browser) as visual elements or visual objects, and retrieve the corresponding instruction set for loading the visual elements or visual objects on the user interface provided from the merchant hosting server. The instruction set may include identification of sections in the DOM structure, and can include code snippets for a frame, a window, a search bar, results rendered based on input into the search bar, a badge, and so on.

At step 358, the system 100 analyzes the first data set to obtain one or more user-specific characteristics. The user-specific characteristics may include, for example, data from an existing user profile including a user name, a user age, historical user data, a user address, a demographical group, a gender, an education level, one or more user preferences, the user's tracked behavior (such as search queries and browsing paths), and information relating to a cross-section or a population of users having similar characteristics as the user.

At step 360, the system 100 determines, when the user-specific characteristics associated with the user satisfy one or more trigger conditions associated with a current resource offering.

At different points in a browsing or shopping journey of the user, different offers, coupons, and product recommendations are surfaced through the injection of additional user interface control elements by in-journey injection controller 114 into the page to modify how the user interface is ultimately rendered for the user (e.g., new prompts, or information modal windows are provided to the user, showing offers, coupons).

If the user-specific characteristics associated with the user does not satisfy any of the one or more sets of trigger conditions, the system 100 continues to monitor the user activities and proceed to step 354.

Responsive to a determination that the user-specific characteristics associated with the user matches one of the one or more sets of trigger conditions, the system 100 performs steps 362, 365 and 386.

One or more predictive recommendations generated by the system 100 can be computationally instantiated in the form of triggered data objects representing offers, coupons, product recommendations (e.g., product ratings, sustainability scores [e.g., ESG scores], metrics), among others, such that the user's experience is enhanced in-journey (e.g., additional information is provided to aid in the research journey or to provide various types of discounts or offers. The triggered data objects may be triggered based on one or more trigger conditions.

In some embodiments, the trigger condition is associated with at least one of an in-journey offer, an in-journey coupon, and an in-journey product recommendation.

Example trigger conditions may include: a historical user purchase, a user preference, a demographical characteristic of the user matching a targeted offer or promotion, a product or offer matching one or more user search strings in the browsing journey, historical user searches, data from a previous browsing or shopping journey made by the same user or on the same browser, and so on.

In some embodiments, the system 100 is implemented with a machine learning model architecture configured to determine if one or more trigger conditions are satisfied based at least on one user-specific characteristics. A set of user preferences may be maintained on a protected data storage, and the machine learning model architecture representative of user preferences is periodically trained based on action value pairs representing rendering characteristics of triggers associated with the navigation input from the user indicating, through the interactive visual element, that the trigger condition has positively interacted to optimize a loss function to tune the rendering characteristics to automatically improve a probability of a positive interaction; and the machine learning model architecture representative of user preferences is utilized to determine the rendering characteristics associated with a interactive visual element associated with the trigger condition.

In some embodiments, the system 100 is configured to consider both group or global-level (e.g., across a group of products 5% off all products or 10% off all shoes) offers and product or SKU-level offers (e.g., 5% off a particular product with SKU 12345) in an intelligently manner to determine if a trigger condition is satisfied based on the user-specific characteristics. For instance, based on one or more user-specific characteristics, a user may be better served with an offer that is applicable to a group of products (e.g., all sporting goods), or with an offer that is applicable to just a single product (e.g., only the product searched by the user in the current browsing journey).

The user-specific characteristics from multiple users can be aggregated for input into the machine learning model architecture, and the recommendations can help steer shoppers with merchant recommenders, group-level, global-level and SKU-level price recommenders.

Since the size of the browser, especially on a mobile browser, is limited, it is important not to overwhelm the user with too many offers or promotions, which may lead to negative interaction results. In some embodiments, only a limited number of offers (e.g., one or two) may be surfaced even if multiple offers are identified based on the trigger conditions being satisfied. A metric may be used by the machine learning model architecture to evaluate and determine the most optimal offer (e.g., the offer most likely eliciting a positive interaction from the user) when multiple offers are identified based on the trigger conditions being satisfied.

In some embodiments, the machine learning model architecture may be implemented as part of the audience matching/offer selection engine 108.

At step 362, the system 100 injects, into the instruction set for loading the visual elements on the user interface provided from the merchant hosting server, code corresponding to an interactive visual element corresponding to the current resource offering such that the user interface renders the interactive visual element.

The in-journey injection controller 114 may, in some embodiments, identify the structure of a webpage or a response message (e.g., through interrogating a document object model (DOM) structure), and directly modify the rendered user interface through the identification of sections in the DOM structure and then modifying or transforming visually neighboring (as defined in the hierarchy of the DOM structure) code to add in or call a function to add in a new window, a new visual element, a badge, text, etc.

In another embodiment, the front-end controller 110 operates through controlling the in-journey injection controller 114 for the generation of overlays that are positioned on or relative to the existing user interface that, for example, can be interacted with by the user (e.g., using a hover, a touch input) to show various offers and coupons that can be utilized as part of the research or payment process. The overlays can be, for example, rendered as interactive buttons, badges, etc., that can be overlaid overtop an existing user interface. The overlays can also be positioned or identified through interrogation of the DOM structure, and suitable coordinate positions can be used as anchor points for generating the overlays (e.g., where to place a badge, where to place a textbox).

Accordingly, the in-journey injection controller 114 is configured to inject code snippets for rendering either into the user interface or to be overlaid overtop the user interface, and these are utilized to modify how the user interacts with and observes the browsing journey through the user interface.

For example a current resource offering may be for a product the user has just searched or browsed.

Figure 8:
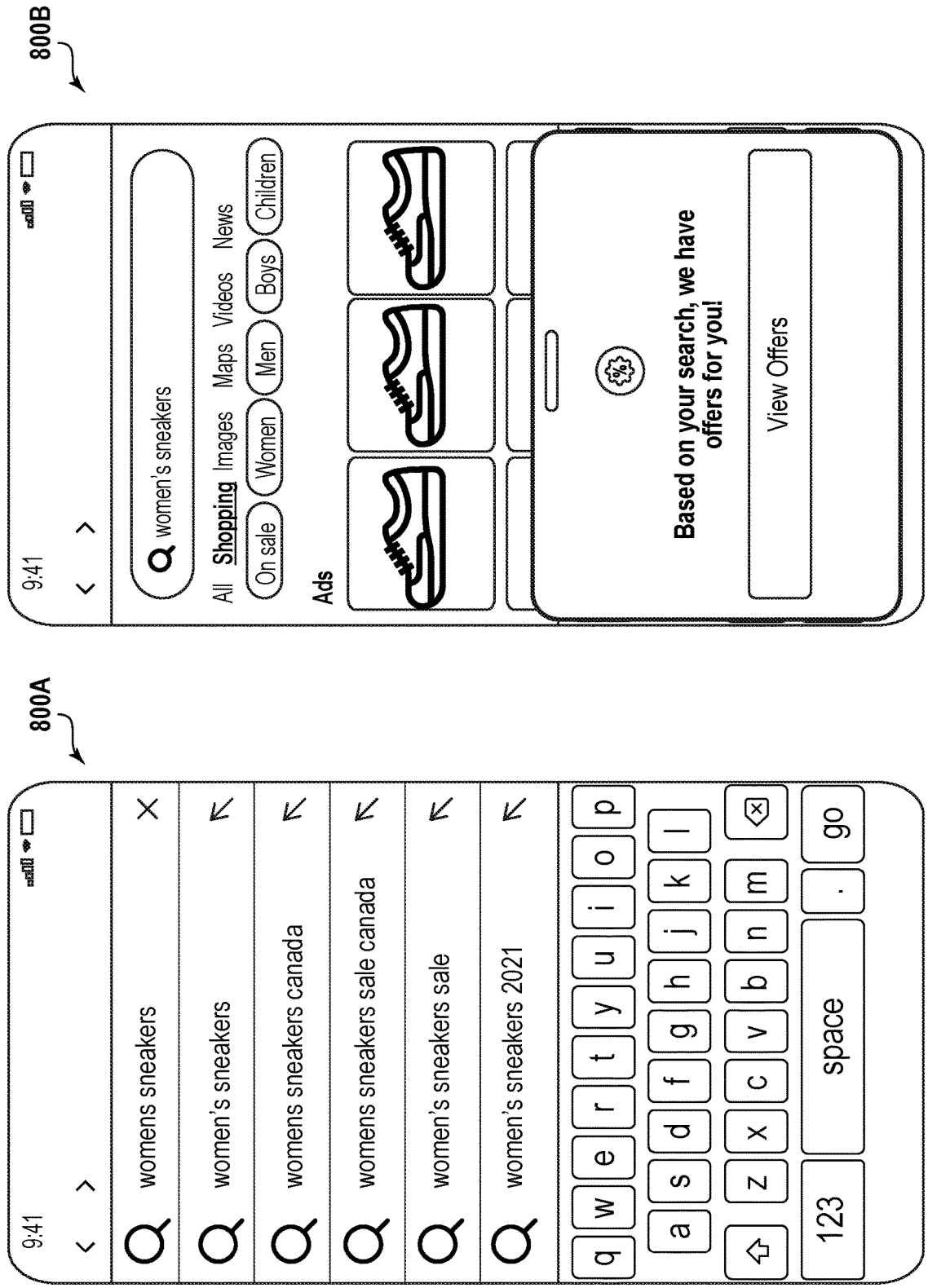
FIG. 8 is a rendering showing a set of example screenshot renderings showing an example search for women's sneakers, according to some embodiments.

FIG. 8 shows a set of example screenshot renderings 800A and 800B showing an example search for women's sneakers, according to some embodiments. In 800A, a set of search results and prior search result tooltips are shown. In some embodiments, the front-end 104 is configured to track and monitor even temporarily shown information, such as autocomplete or predictive outputs from the merchant interface or a search provider. In 800B, a set of results are provided, and in this example, instead of loading the visual element in-line with an image, the visual element instead is provided as an overlay over the bottom of the screen. This approach is computationally more simple as there is no need to parse and identify injection locations visually into specific spots of the user interface rendering, relative to attempting to inject visual elements in-line or in frame, which could be lead to various visual aberrations or bugs if the system injects incorrectly.

Figure 9:
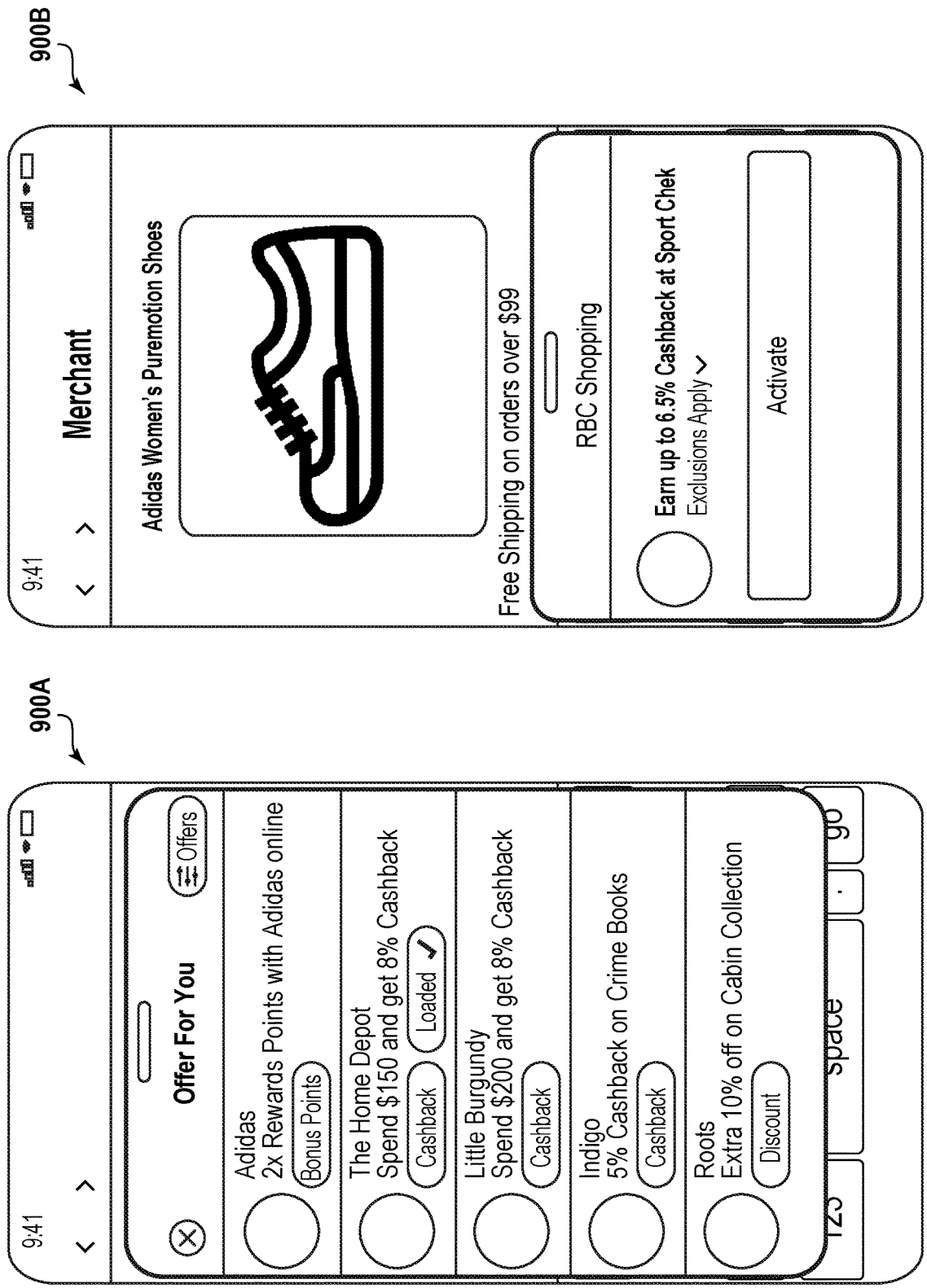
FIG. 9 is a rendering showing a set of example screenshot renderings showing a set of offers selected for a particular user, and an example surfaced user interface element, according to some embodiments.

FIG. 9 shows a set of example screenshot renderings 900A and 900B showing a set of offers selected for a particular user, and an example surfaced user interface element, according to some embodiments. In this example, 900A is an interface screen that provides a visual list of all offers that may be available for a user based on the current output from the audience matching/offer selection engine 108, which, for example, can dynamically or periodically obtain lists of offers where characteristics of the user match particular automatically established criterion in various marketing or audience identification campaigns.

In some embodiments, the workflow 350 may further: process one or both of the first data set and the second data set to estimate a state position of a browsing journey of the user for browsing a product or a service; and inject the code into the instruction set for loading visual elements on the user interface based on at least on the estimated state position of the browsing journey of the user.

In some embodiments, the trigger condition is associated with a target set of one or more target state positions, and the injection of the instruction set for loading visual elements on the user interface provided from the merchant hosting server occurs at a visual position corresponding to a visual frame associated with one of the one or more target state positions associated with the trigger condition.

In some embodiments, the rendering characteristics include a selection of a target state position from the target set of the one or more target state positions, the selection of the target state position determining when in the browsing journey of the user the interactive visual element will be rendered.

In some embodiments, the rendering characteristics include at least one of a size, a position, a color, or an opacity of the interactive visual element.

In some embodiments, the one or more target state positions include one of more of: a research state, a browsing state, a purchasing state, a payment selection state, and a purchased state.

At step 365, the system 100 receives a navigation input from the user indicating, through the interactive visual element, that the current resource offering is executed by the user.

For example, the front-end controller 110 may receive an indication that the user has clicked at a visual element presenting the current resource offering, and proceeded to add the product in the offering into the shopping cart.

At this point, the machine learning model architecture may be re-trained based on the indication that a positive result of the current resource offering is obtained (e.g., executed by the user).

Figure 10:
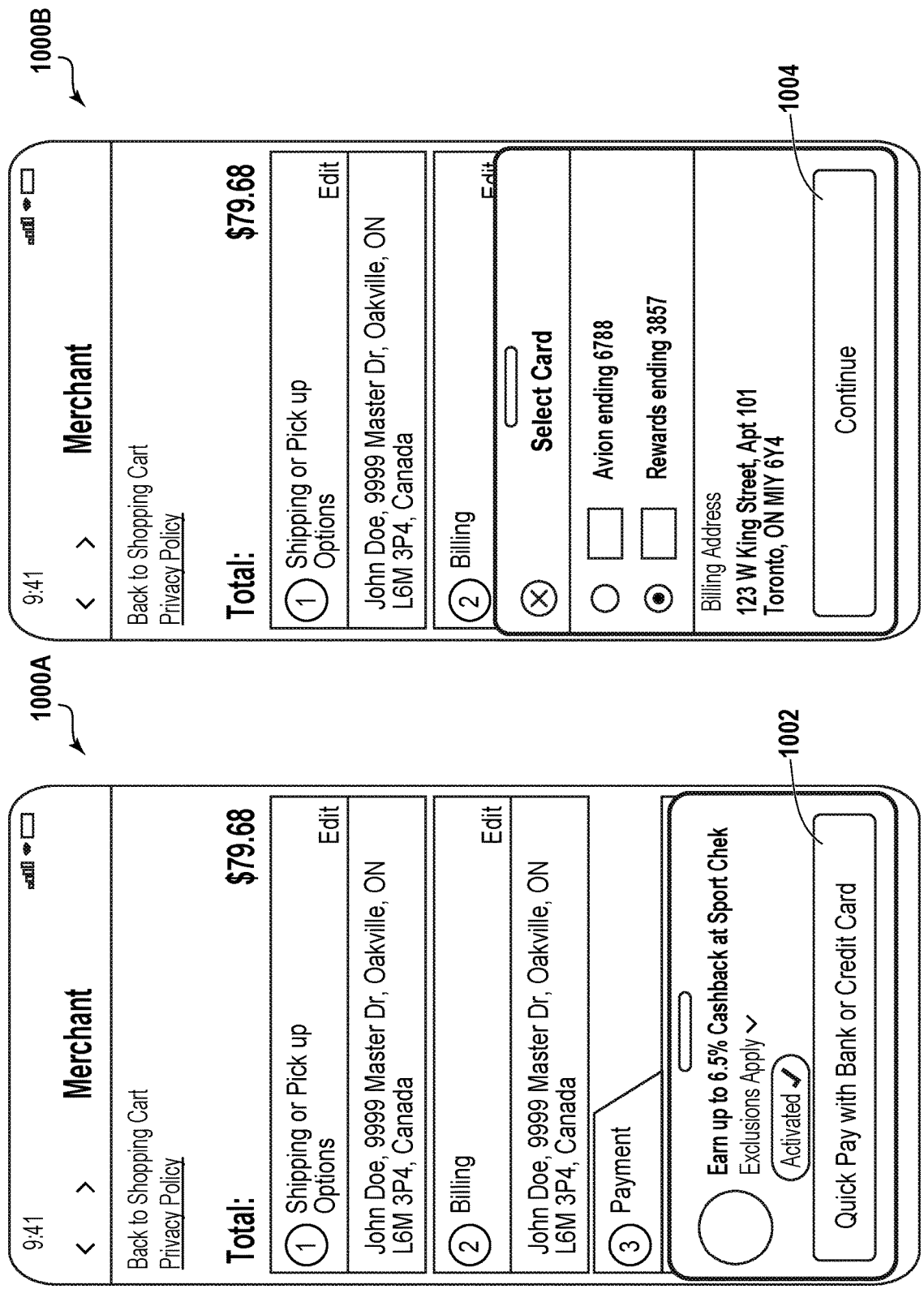
FIG. 10 is a rendering showing a set of example screenshot renderings showing a offer flow injected into a shopping cart checkout process, according to some embodiments.

At step 368, the system 100 execute a set of machine codes associated with the current resource offering to cause the user interface to render a shopping interface for the user. For instance, the a set of machine codes may be executed to generate a shopping cart interface for the user as shown in FIG. 10.

Different levels of positive engagement may be tracked by the front-end controller 110, including for example, browsing the product offered (in the resource offering), adding the product offered, and purchasing the product offered, or purchasing a related product.

Figure 5:
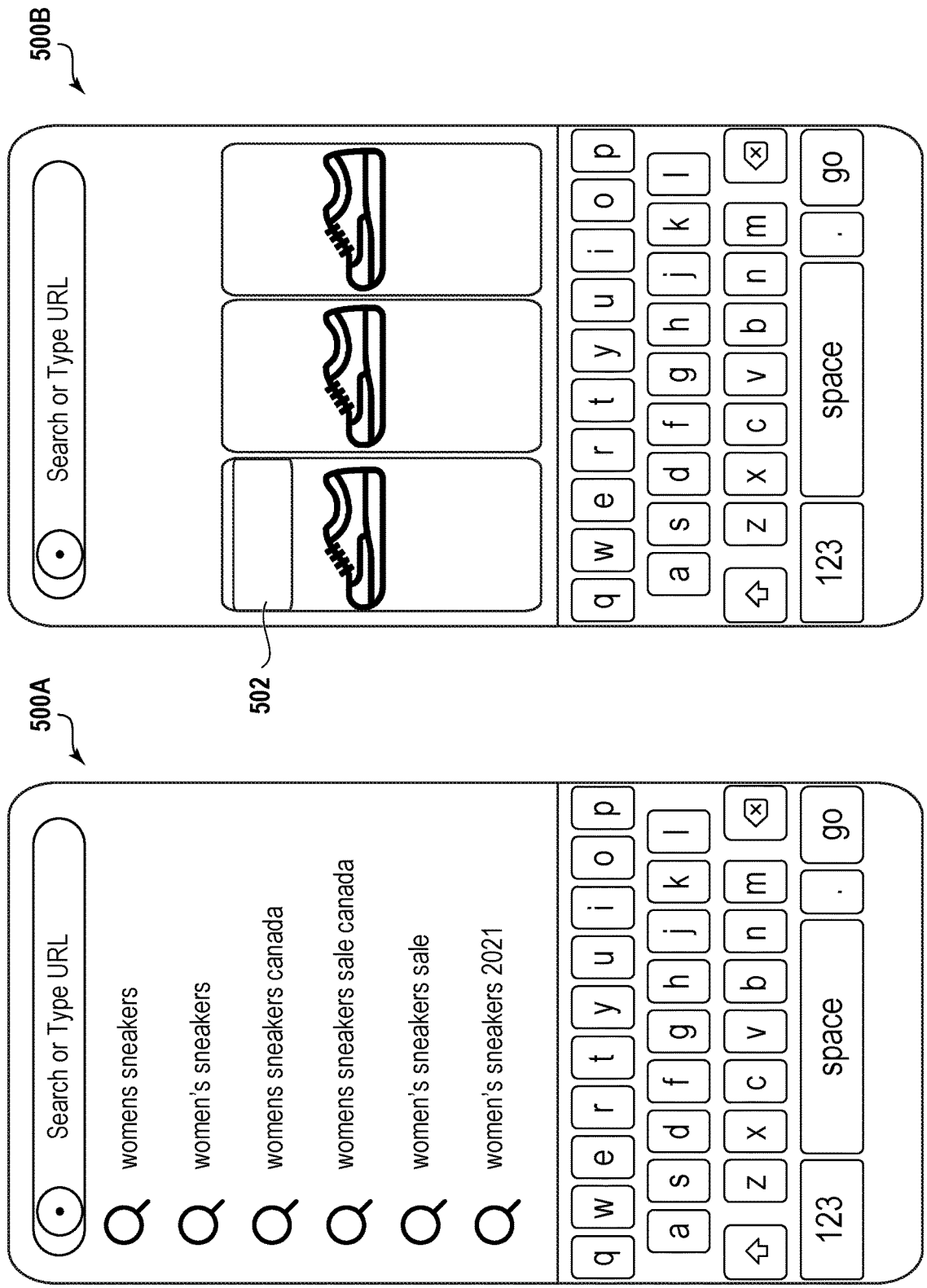
FIG. 5 is a rendering showing a set of example screenshot renderings showing example search results, according to some embodiments.

FIG. 5 shows a set of example screenshot renderings 500A and 500B showing example search results, according to some embodiments.

A set of historical search results are shown in 500A, where a person has searched various permutations of women's sneakers along with other keywords. In some embodiments, the in-journey state machine 112 is able to classify and/or cluster these searches to estimate that a shopping journey has begun relating to shoes (or a larger outfit, depending on the tightness of the search results), and a shopping journey state object can be instantiated. The differences in keywords may add context to characteristics of the shopping journey, such as indicating a location, an intent (e.g., wishes to only buy "on sale"), a type (e.g., only 2021 runway shoes), and this context may be extracted automatically by the system 100. In 500B, a set of image results is shown, and these results can be intercepted by the front-end 104 from the merchant interface and parsed to extract out the various user interface frames, and identify locations and areas for potential injections. In this specific example, a new frame 502 is either injected to be rendered in-line with the frame returned from merchant interface, or overlaid over top of the merchant interface, in various embodiments. The new frame 502 includes a visual interface control element that can be interacted with or providing information relating to a particular offer, coupon, or product recommendation.

Figure 6:
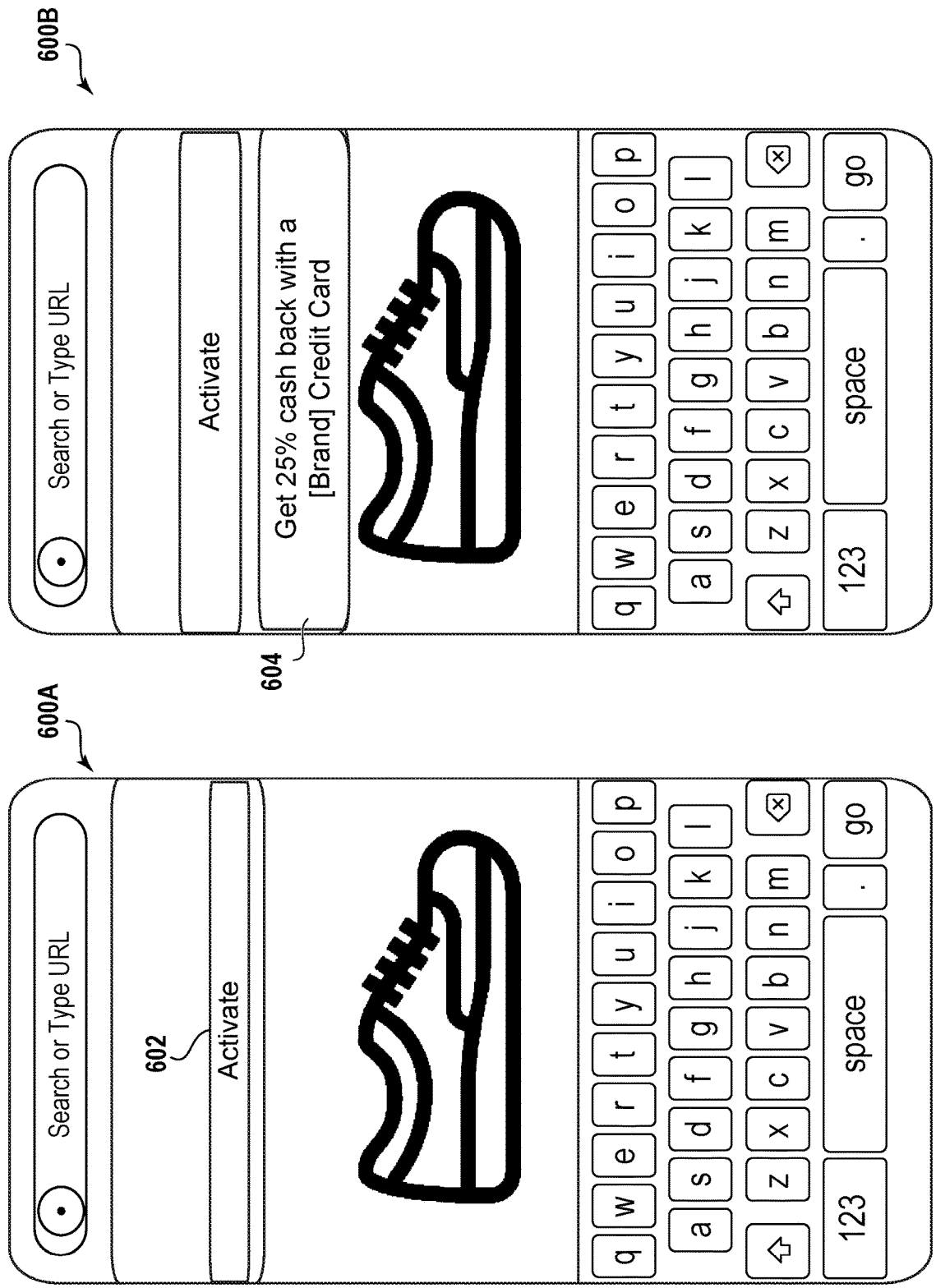
FIG. 6 is a rendering showing a set of example screenshot renderings showing example search results, according to some embodiments.

FIG. 6 shows a set of example screenshot renderings 600A and 600B showing example search results, according to some embodiments. The example search results have the additional frame 502, with an additional interactive element 602 which a user may click or otherwise interact with using a touch input to indicate acceptance of an offer, a coupon, etc. For a product recommendation, the interactive element 602 may be a link to expand and receive more information about a particular item to aid in a search. For example, a trusted review site recommendation or ranking can be provided. A corresponding informational window 604 may be rendered to indicate a cashback amount, etc. Similar to the new frame 502, the visual characteristics of the informational window 604 can be controlled by a user interface orchestration engine to control code injection characteristics.

Figure 7:
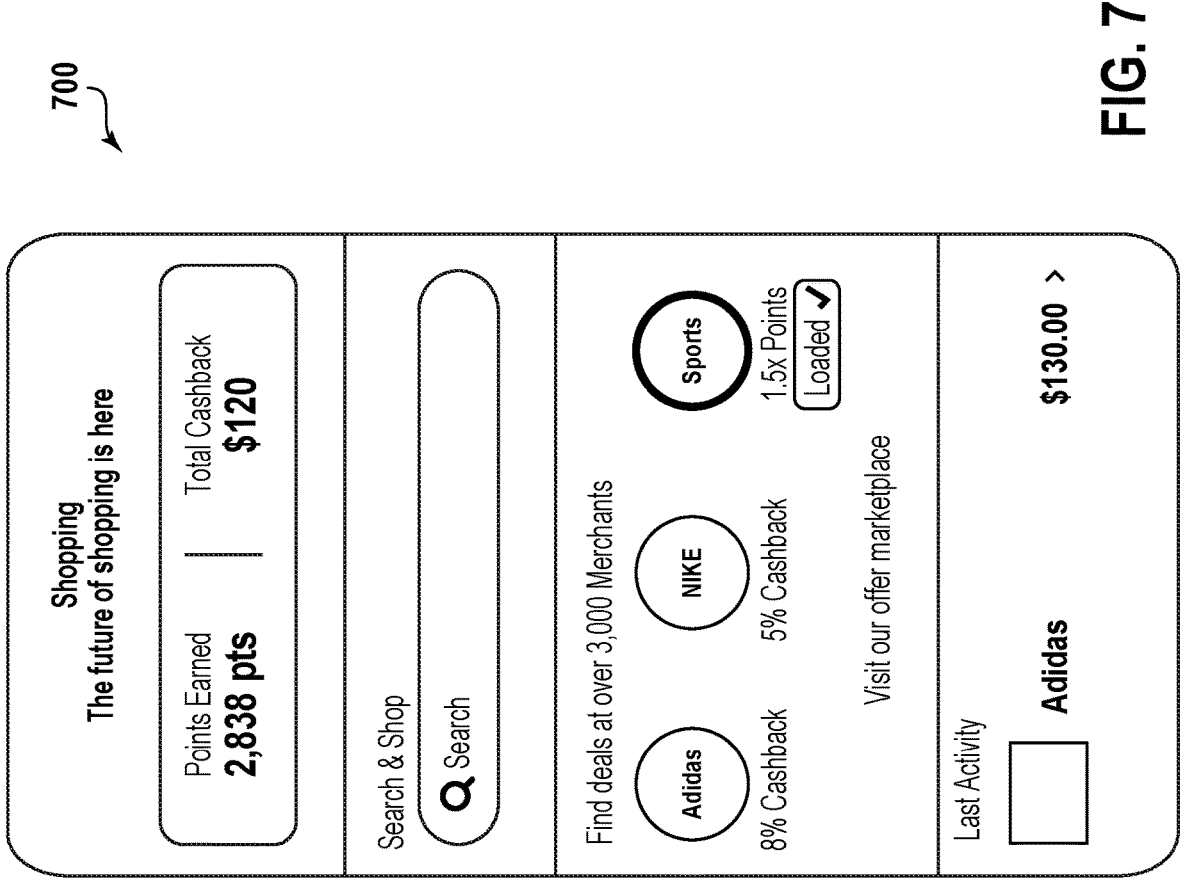
FIG. 7 show a set of example screenshot rendering showing a user interface home page customized for a particular user, according to some embodiments.

FIG. 7 show a set of example screenshot rendering showing a user interface home page 700 customized for a particular user, according to some embodiments. In the user interface home page 700, a loading page with various visual widgets can be shown, providing a summary of points earned, total offer rewards cumulatively, provide a new search bar from the home, as well as a list of automatically presented offers, coupons, activity, etc. The specific order and positioning of automatically presented offers, coupons, activity, etc., may be automatically configured by the system through a combination of various types of back-end and front-end tracked information.

FIG. 8 shows a set of example screenshot renderings 800A and 800B showing an example search for women's sneakers, according to some embodiments. In 800A, a set of search results and prior search result tooltips are shown. In some embodiments, the front-end 104 is configured to track and monitor even temporarily shown information, such as autocomplete or predictive outputs from the merchant interface or a search provider. In 800B, a set of results are provided, and in this example, instead of loading the visual element in-line with an image, the visual element instead is provided as an overlay over the bottom of the screen. This approach is computationally more simple as there is no need to parse and identify injection locations visually into specific spots of the user interface rendering, relative to attempting to inject visual elements in-line or in frame, which could be lead to various visual aberrations or bugs if the system injects incorrectly.

FIG. 9 shows a set of example screenshot renderings 900A and 900B showing a set of offers selected for a particular user, and an example surfaced user interface element, according to some embodiments. In this example, 900A is an interface screen that provides a visual list of all offers that may be available for a user based on the current output from the audience matching/offer selection engine 108, which, for example, can dynamically or periodically obtain lists of offers where characteristics of the user match particular automatically established criterion in various marketing or audience identification campaigns.

FIG. 10 shows a set of example screenshot renderings 1000A and 1000B showing a offer flow injected into a shopping cart checkout process, according to some embodiments. In this example, the offer is identified for being injected at a checkout state, and the user is able to selectively engage the various offers through interacting with an input visual control elements 1002 and 1004. In 1000A, the offer is a cashback offer that is used to establish a quickpay option. In this example, the cashback offer is provided as an incentive for users to start to become more comfortable with a type of electronic payment using a specific type of rewards redemption that is a new process flow, and this is shown at the subsequent rendering 1000B where the user is given the cashback if one of two payment types is selected (e.g., paying with a rewards card).

Figure 11:
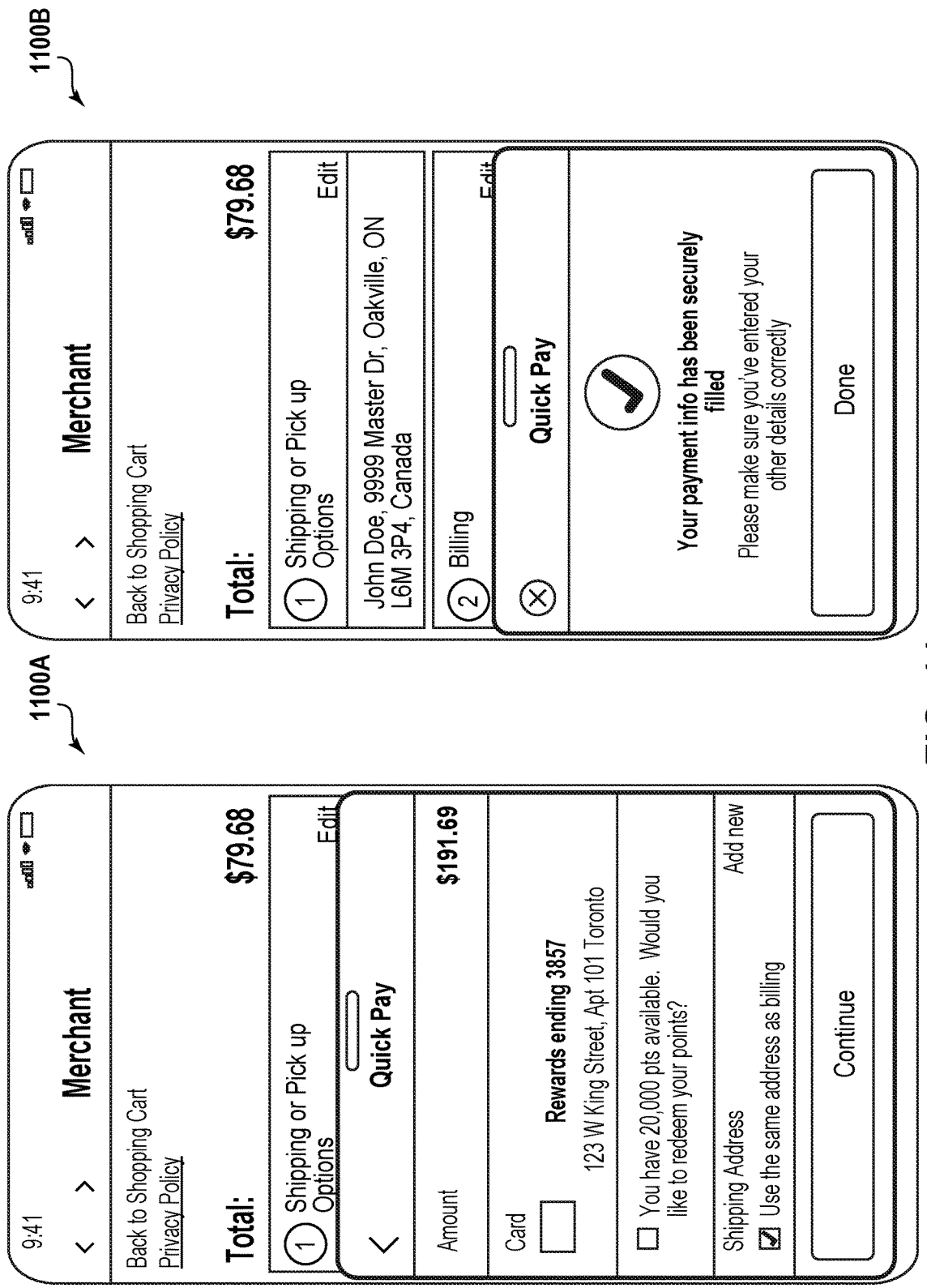
FIG. 11 is a rendering showing a set of example screenshot renderings showing the offer being acted upon by the user as part of the payment, according to some embodiments.

FIG. 11 show a set of example screenshot renderings 1100A and 1100B showing the offer being acted upon by the user as part of the payment, according to some embodiments. In 1100A, when the user interacts with the element, the browser, mobile application, or mobile application, auto-fills payment information as an injection into the payment flow, and the injection is confirmed in a visual display to the user at 1100B.

Figure 12:
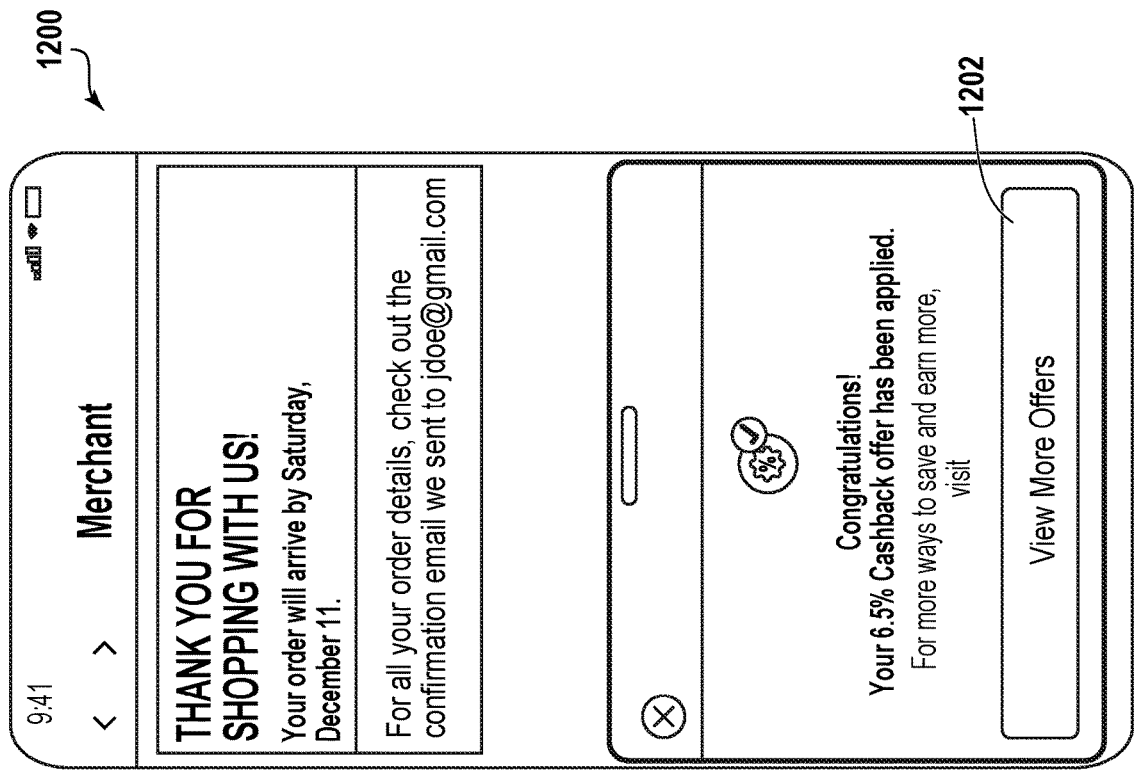
FIG. 12 is a rendering showing an example screenshot rendering where the offer application is confirmed, according to some embodiments.

FIG. 12 shows an example screenshot rendering 1200 where the offer application is confirmed, according to some embodiments. In 1200, similarly, a confirmation is shown in respect of the application of a cashback offer, and a visual interface button 1202 can be interacted with for the user to observe other offers.

Figure 13:
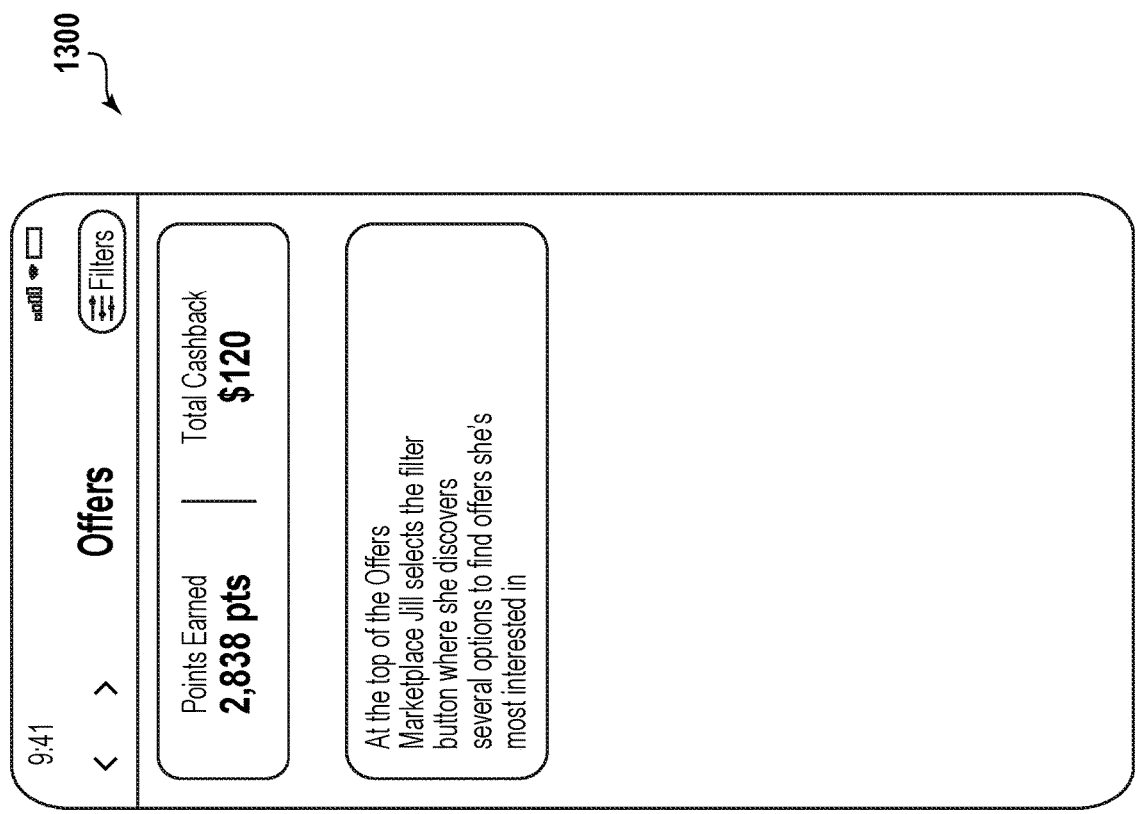
FIG. 13 is a rendering showing an example screenshot rendering where a homepage is shown to provide a summary of redeemed offers, according to some embodiments.

FIG. 13 shows an example screenshot rendering 1300 where a homepage is shown to provide a summary of redeemed offers, according to some embodiments. In the example rendering 1300, an additional filter button 1302 is shown that is adapted that can be interacted with to obtain options to find offers that the user is interested in.

Figure 14:
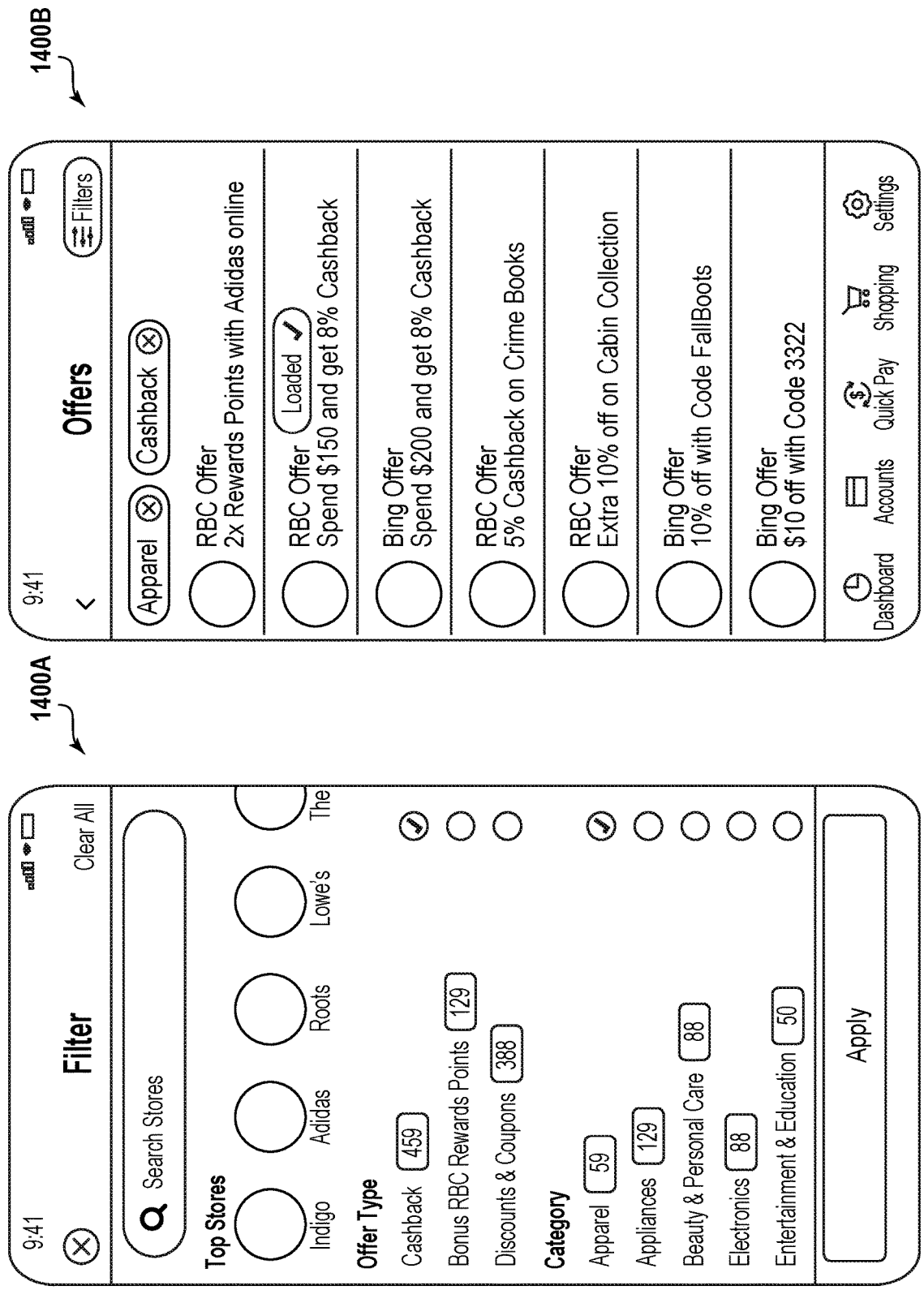
FIG. 14 is a rendering showing a set of example screenshot renderings where available offers can be filtered and interacted with by the user, according to some embodiments.

FIG. 14 shows a set of example screenshot renderings 1400A and 1400B where available offers can be filtered and interacted with by the user, according to some embodiments. In 1400A, the user may be able to filter by offer type, category, etc., and in some embodiments, the system 100 may also track the types of filters applied by the user and the interactions with the interface itself in establishing interests to add additional information to the user's profile to help tune the available offers and user profile for audience matching. In 1400B, a list of offers is shown.

FIG. 15 shows a set of example screenshot renderings 1500A and 1500B where available offers can be searched and interacted with by the user, according to some embodiments. In 1500A the user submits a search query in respect of various types of offers that are available, and in 1500B, a partial set of results are shown in respect of a particular search substring that is being presently entered into the search bar.

FIG. 16 shows an example screenshot rendering 1600A and 1600B where the system is adapted as a browser extension, according to some embodiments. In this example, in 1600A, a price comparison feature is surfaced as a widget on a browser either natively or as an extension, and in 1600B, a "shopping cockpit" is shown as an example home screen widget, giving one click access to a mobile application. Shopping Cockpit 1650 may be displayed as a home screen widget, giving the user one-click access to all shopping tools without entering the mobile application.

In some embodiments, the system is configured to operate across different channels and platforms, keeping track of browsing journeys and surfaced offers, coupons, and product recommendations. This is a useful feature as it is becoming more prevalent that users are using multiple devices simultaneously or consecutively in their browsing journeys, and it may be important to be able to track state transitions as between different platforms and devices to obtain a more holistic and complete computational estimation of a particular state of a browsing journey.

Figure 17:
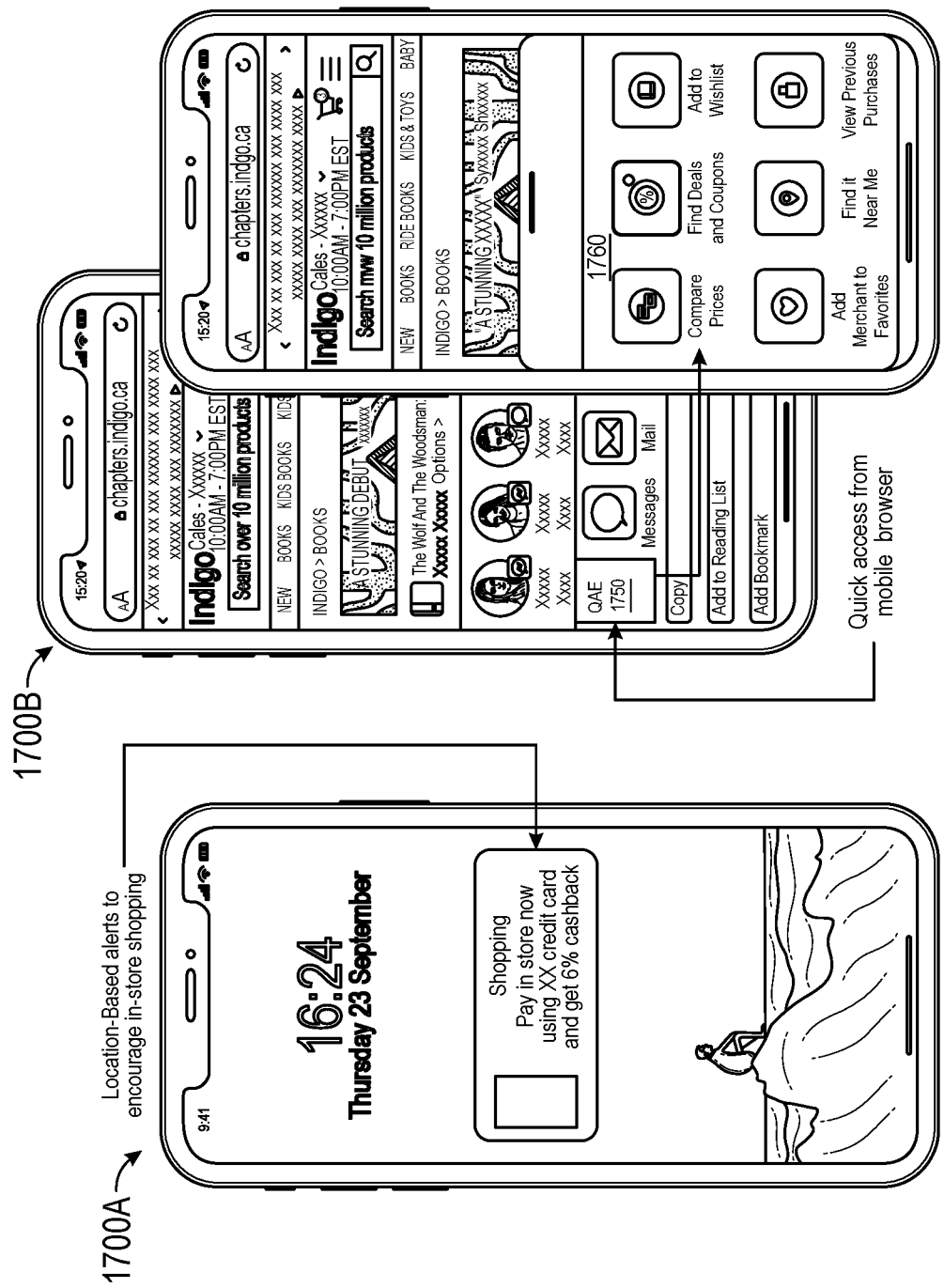
FIG. 17 is a rendering showing an example screenshot rendering of a location based alert, and an example screenshot rendering of a quick access extension for a browser on a mobile application, according to some embodiments.

FIG. 17 shows an example screenshot rendering 1700A of a location based alert and an example screenshot 1700B rendering of a quick access extension for a browser on a mobile application, according to some embodiments. The location-based alert can utilize, in some embodiments, a location based understanding or context of where the user is to trigger a state transition. For example, if a person is searching for a network router and their location based alert is being triggered when their coordinate information indicates that they have momentum towards or are nearing a major electronics retailer, it could estimate that the customer's journey is nearing the transition to another state (e.g., from research to purchasing). A quick access extension (QAE) tool 1750 for a browser on a mobile application may be implemented, according to some embodiments. The QAE tool 1750 provides quick access from a user's mobile phone browser 118 to find deals or price compare while shopping, through a friendly user interface 1760.

The location-based alert can be linked to a quick access extension that can then be used to find deals or price compare when shopping, such that interacting with the location-based alert triggers the browser opening or a mobile application opening. This feature, for example, could utilize deep-linking to cause linkages between different widgets and applications to open with various parameters. As part of the deep linking, in an embodiment, the system could surface a coupon or offer based on an interaction with the location based alert itself, injecting the coupon or offer code directly into the deep linking process (e.g., by adding in a promo code variable into the message).

Figure 18A:
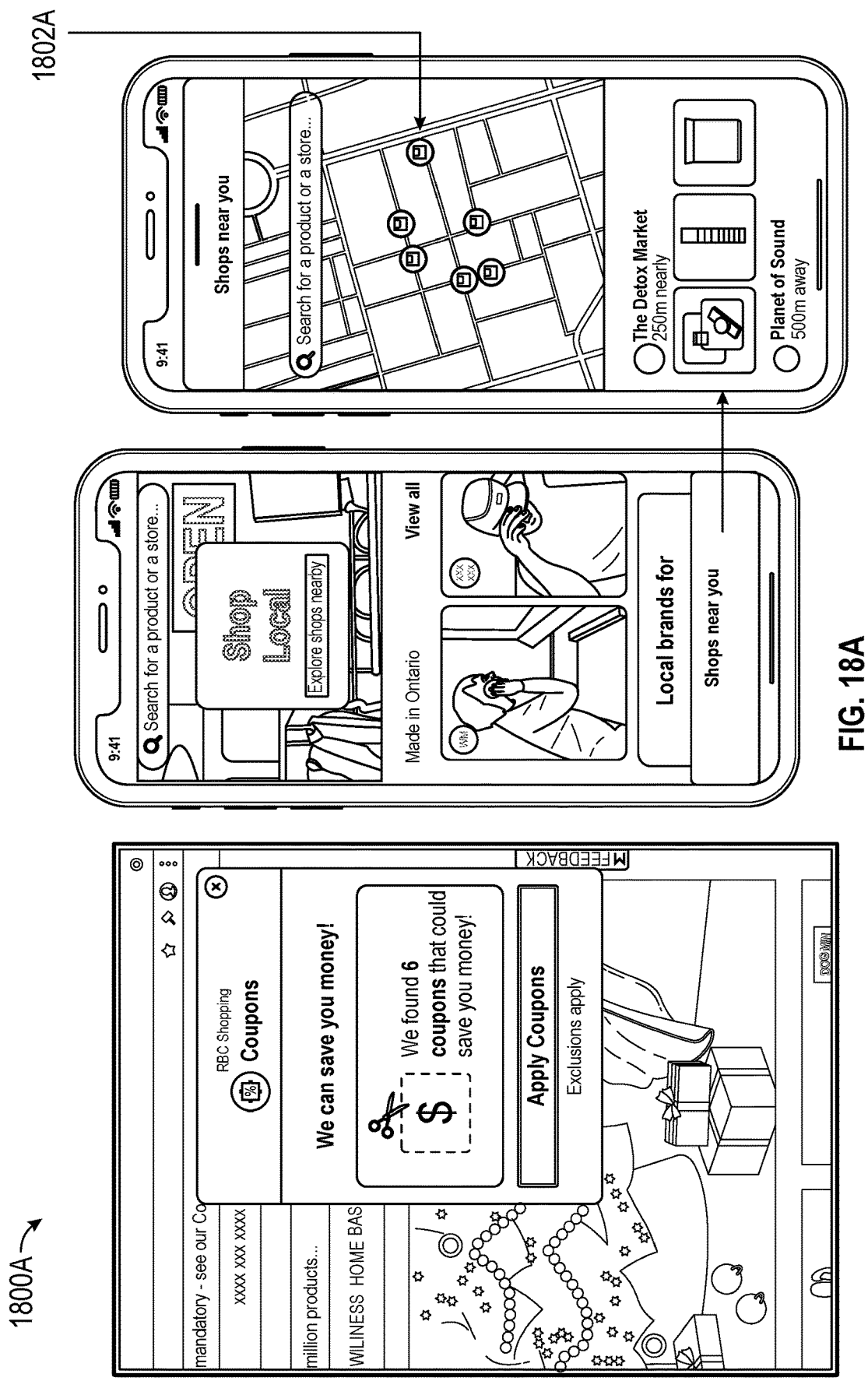
FIG. 18A is a rendering showing an example screenshot rendering of a coupon finder widget, and an example screenshot rendering of a local shopping widget, according to some embodiments.

FIG. 18A shows an example screenshot rendering of a coupon finder widget 1800A, and a local shopping widget 1802A. Local shopping experience is integrated into the mobile user interface for 'buying local' and leverage geolocation to share stores and deals near the user. The coupon finder widget 1800A may give another in-path opportunity to engage shoppers on a desktop device.

Figure 18B:
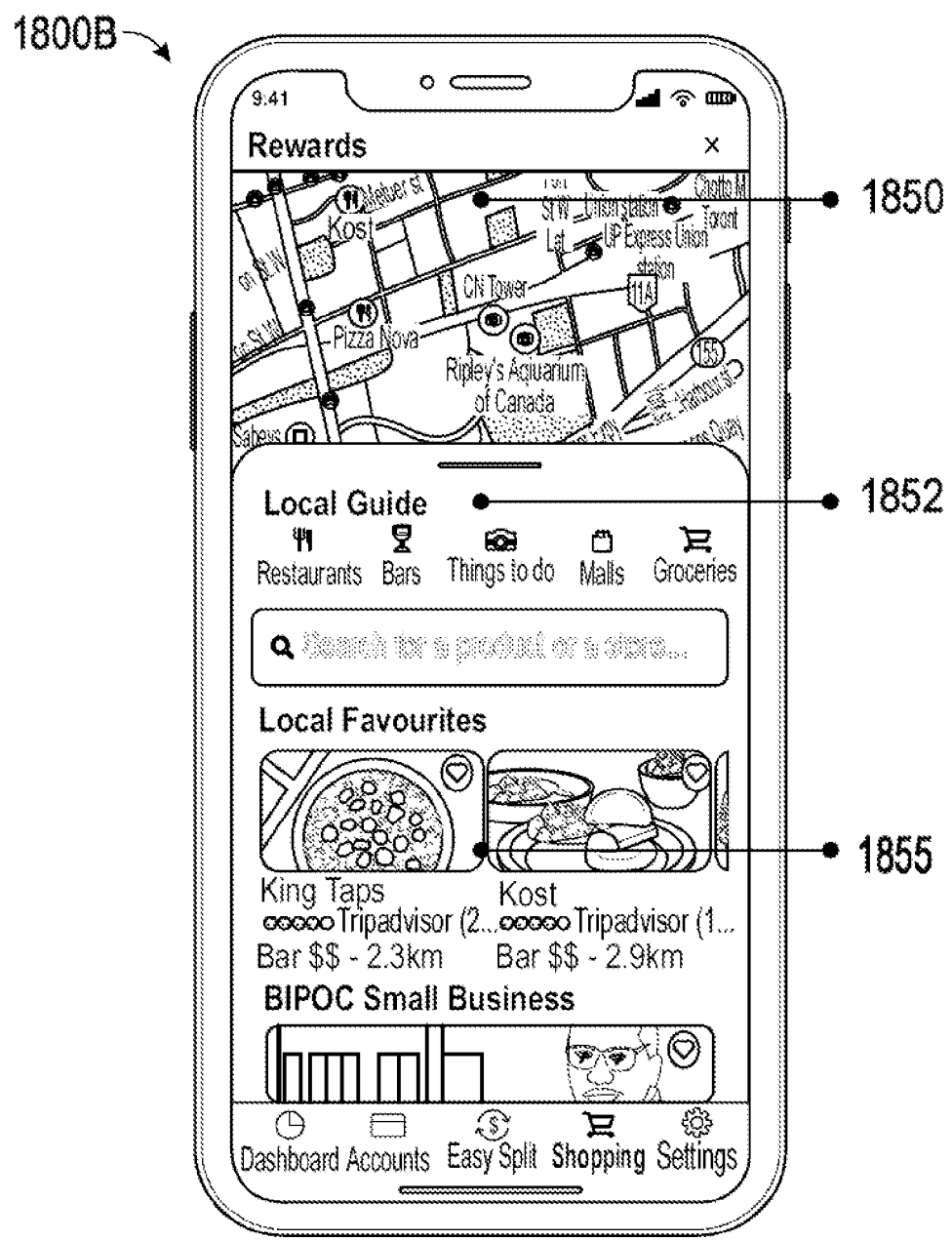
FIG. 18B shows another example screenshot.

FIG. 18B shows an example user interface 1800B for a shop local feature, according to some embodiments. As part of the shop local feature, offers and coupons are surfaced based on address, among other features, to promote shopping options based on categories of spend, including payment data, and can be used to surface a map showing nearby merchants, that can be tied to loyalty and local loyalty programs. The local loyalty programs can be split into various categories and users can also search for deals for a specific offer based on where they are. In a local guide feature, the user interface 1800B provides users the ability to support neighborhood merchants, and users may be rewarded for shopping local from their favorite merchants. A map view feature 1850 can let users see on a map local offers based on a user's location. A local guide feature 1852 can split merchant offers into categories. Users can also search for deals of a specific offer based on where they are—e.g. if they are at a Best Buy store and want to see if somewhere close offers the same product at a better price. Personalized feature 1855 can show relevant offers based on past history, intent, interest and location.

Shop local features are based on addresses, can promote local shopping options based on category spend, incl. payment data. Merchants near the user can be visualized on a map view 1850. This can also be tied in to loyalty and create a path for "local loyalty" programs. Local merchant offers can be split into categories. Users can also search for deals of a specific offer based on where they are—e.g. if they are at a particular store, and want to see if somewhere close offers the same product at a better price. Offers can be relevant based on past history, intent, interest and location. This provides users the ability to support neighborhood merchants. In addition, users may be rewarded for shopping local from their preferred merchants.

Figure 18C:
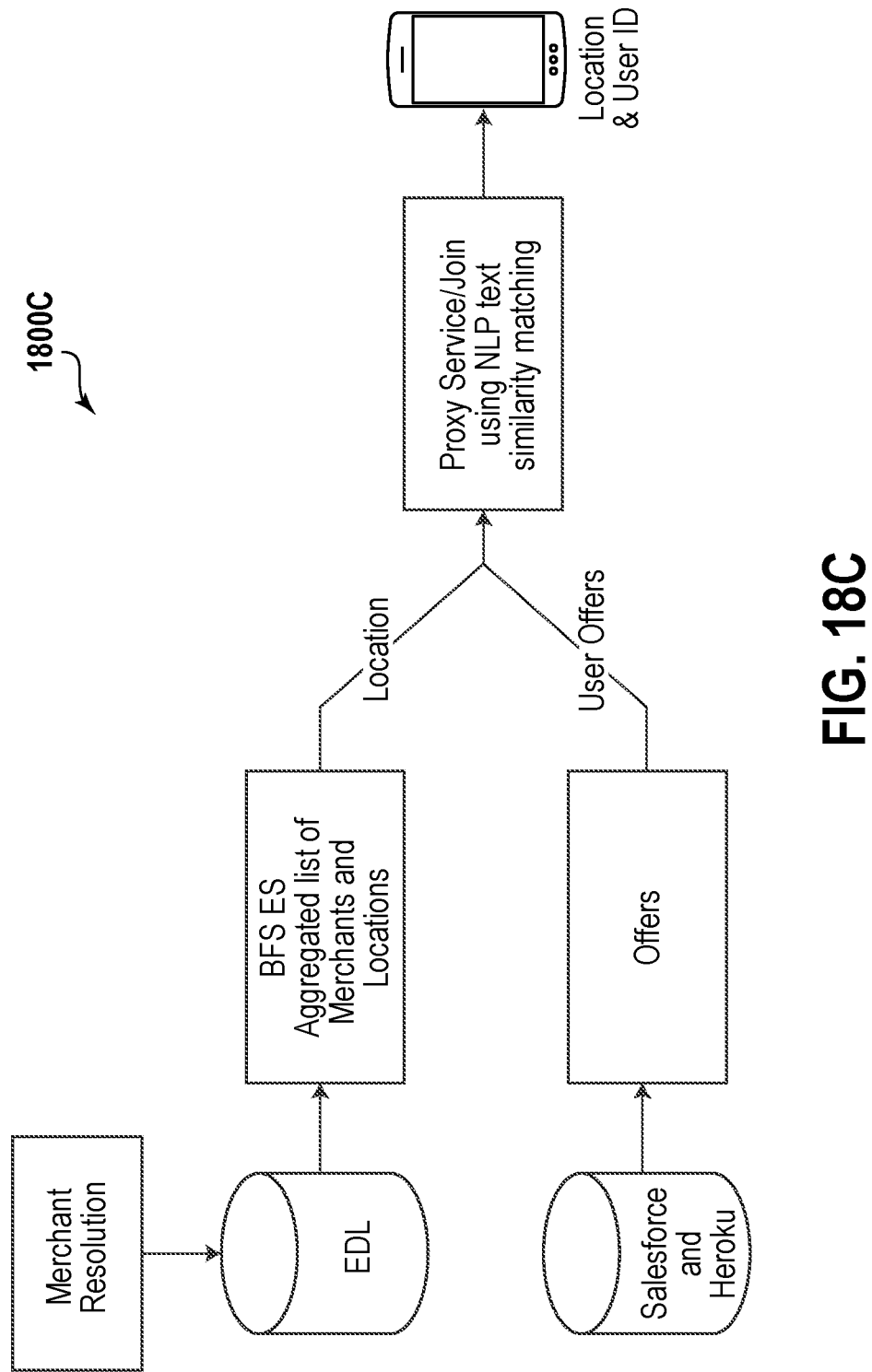
FIG. 18C shows an example block schematic.

FIG. 18C shows an example system flow 1800C for generating shop local-based recommendations. Transactional data enrichments can be used to conduct various encodings, context, augmentations, and computations, and can be used to establish indexed and/or consolidated merchant store information made consumable through reusable data services. Offer data can be used, for example, based on similarity searching between different merchants, domain names, etc. Location-based offer can be generated using natural language processing (NPL) text matching. The generated offers from nearby merchants may be presented to the user on his or her mobile device.

Figure 18D:
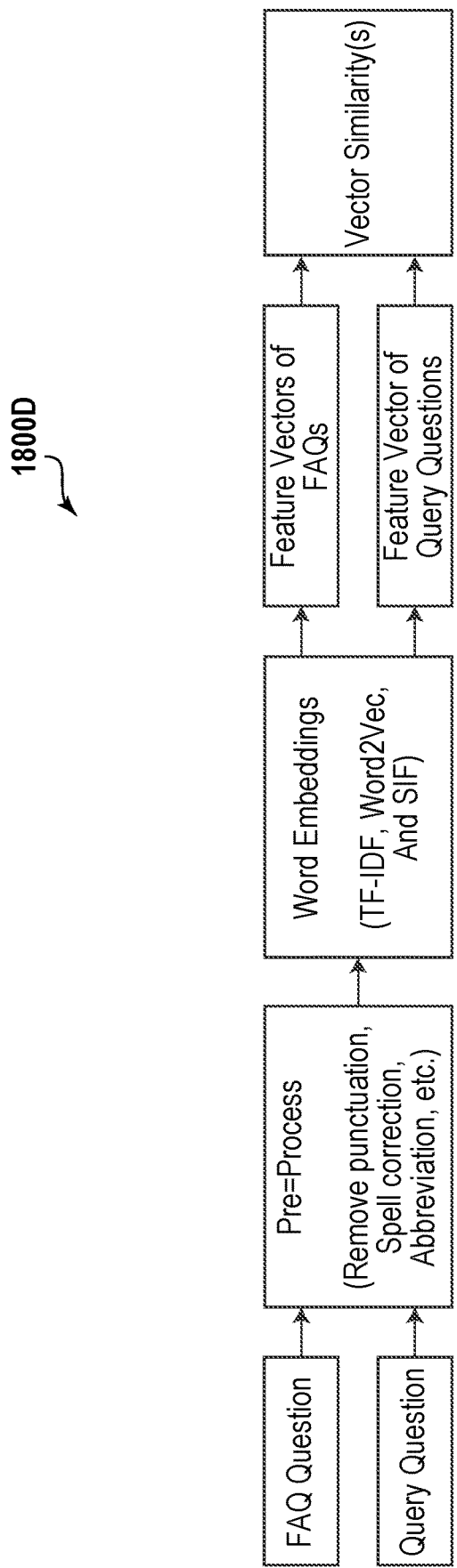
FIG. 18D shows an example process flow.

FIG. 18D shows an example flow 1800D for processing query searches, according to some embodiments. The flow shows an example approach for natural language processing for merchant matching where distances or similarities, for example, can be established using cosine similarity.

Figure 18E:
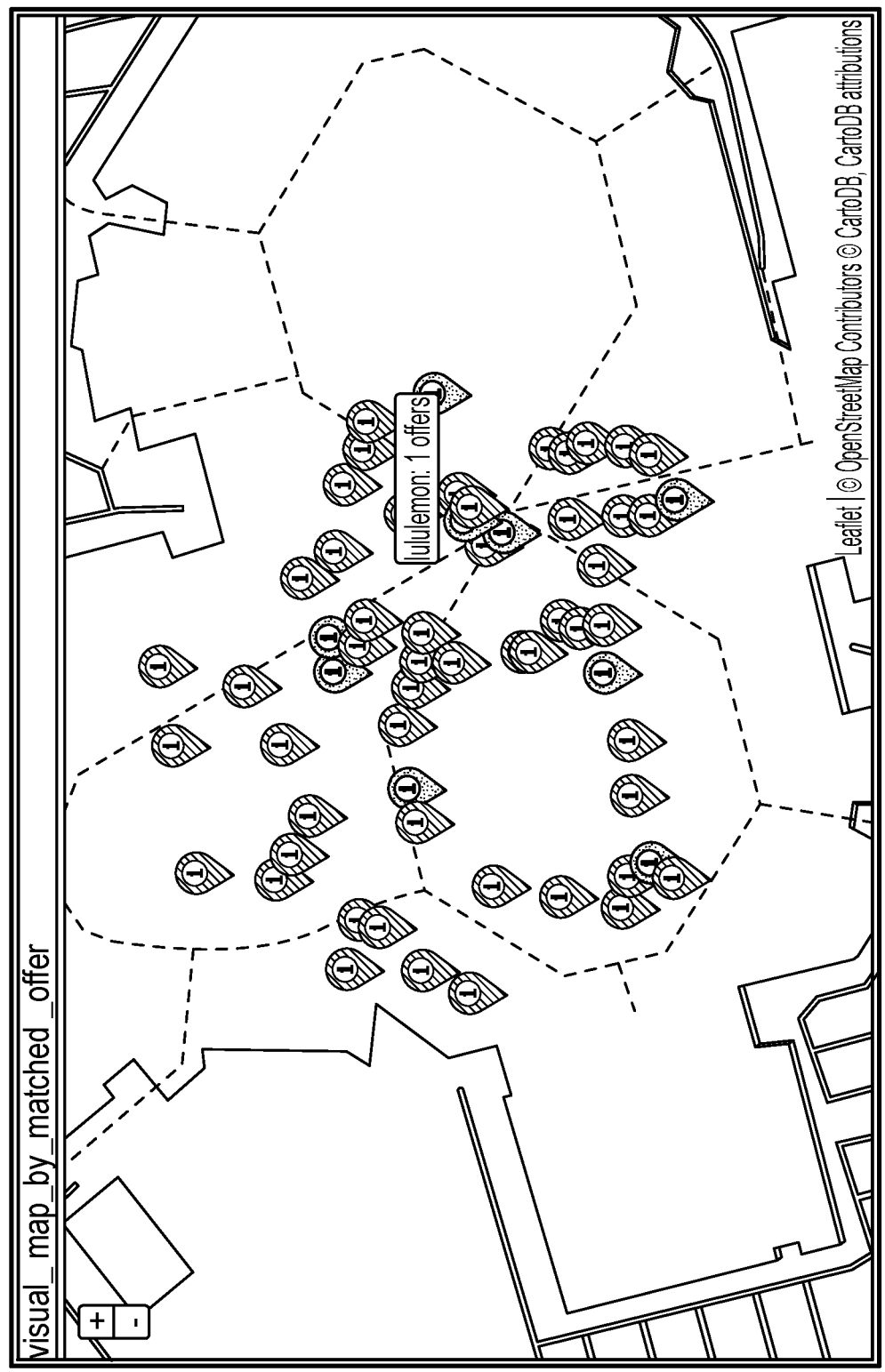
FIG. 18E shows an example map with sample pins indicative of local offers.

FIG. 18E shows an example user interface map rendering 1800E of local offers, according to some embodiments. The map can be based on information such as geo-coordinates and physical proximity, including various types of geolocation information such as userIDs and their corresponding centroids, radii of a search, a maximum number of offers, confidence score thresholds, etc.

Figure 19:
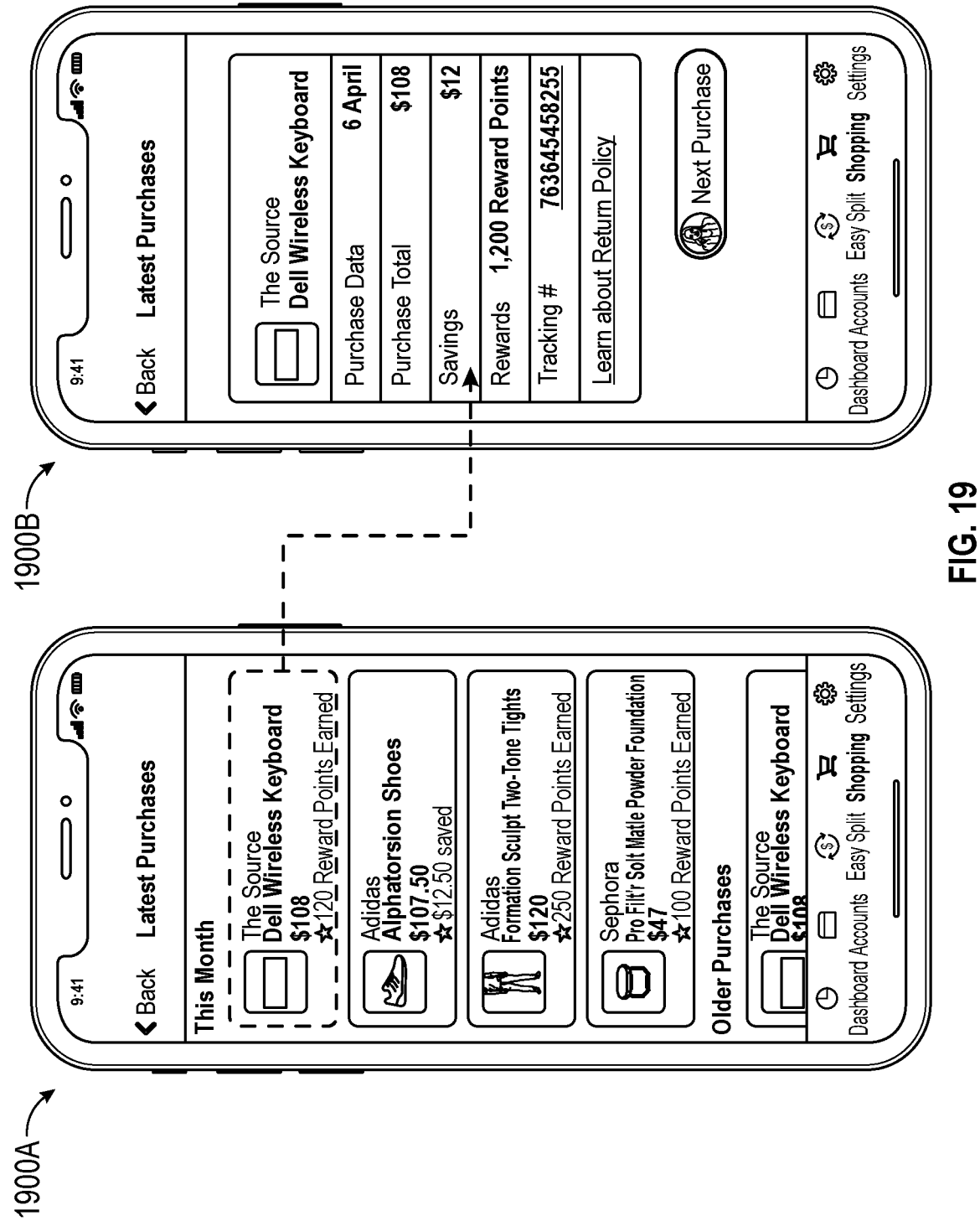
FIG. 19 is a rendering showing a set of example screenshot renderings where previous purchases and their applied offers can be searched and interacted with by the user, according to some embodiments.

FIG. 19 shows a set of example screenshot renderings 1900A and 1900B where previous purchases and their applied offers can be searched and interacted with by the user, according to some embodiments.

Figure 20:
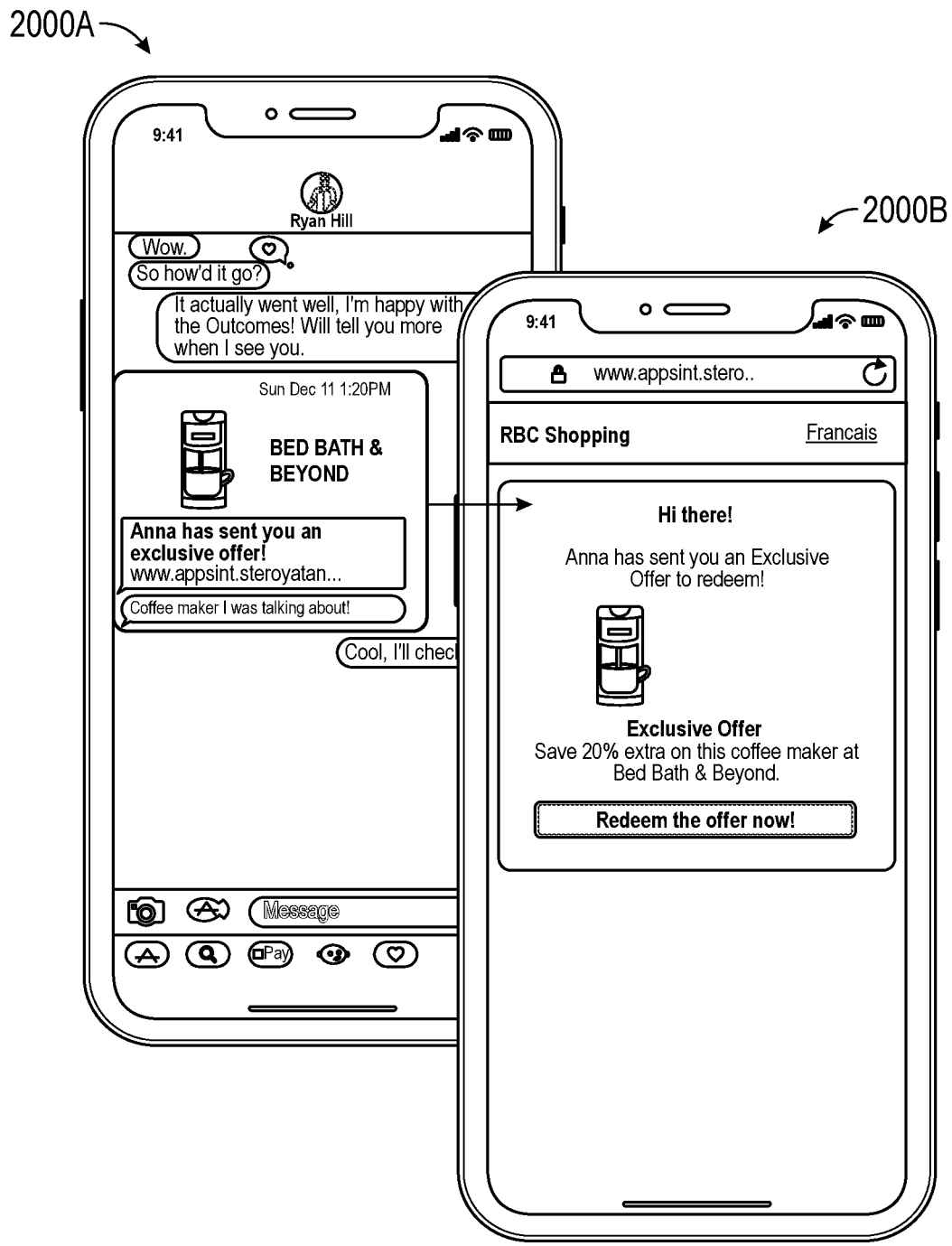
FIG. 20 is a rendering showing a set of example screenshot renderings where an offer is shared from one user to another user, according to some embodiments.

FIG. 20 shows a set of example screenshot renderings 2000A and 2000B where an offer is shared from one user to another user, according to some embodiments.

Figure 21:
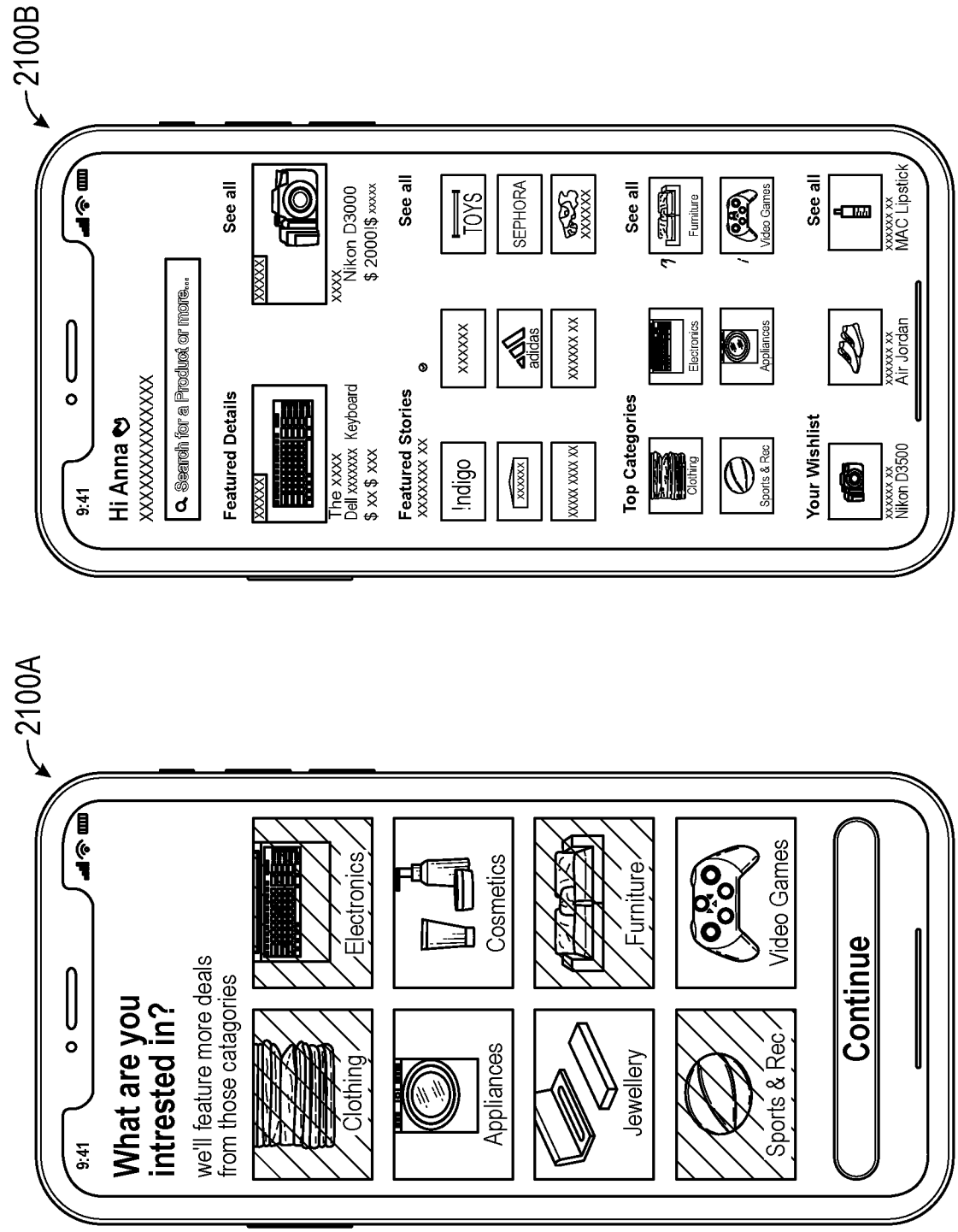
FIG. 21 is a rendering showing a set of example screenshot renderings where a user is able to provide additional information that can be used to tailor the types of offers selected or shown to the user, according to some embodiments.

FIG. 21 shows a set of example screenshot renderings 2100A and 2100B where a user is able to provide additional information that can be used to tailor the types of offers selected or shown to the user, according to some embodiments. This additional information, for example, can be used to tailor the user's profile data objects stored on the protected databases 124, such that merchant ecosystem 170 marketing campaigns, through interoperating with a virtual clean room custodian data process for queries, can use the user profile data object for targeting the user for provisioning of an offer, a coupon, or a product recommendation.

A benefit of such an approach is that the usage of the protected databases 124 having privacy-adhering functionality automatically enforced is that different merchants, users, or parties can provide information for the protected databases 124 that do not necessarily trust one another (e.g., as the custodian data process automatically controls the level of access to underlying information stored thereon and only restricted queries can be run to obtain results without receiving access to the underlying information), can coordinate with one another to determine, for example, a target audience for a particular campaign.

In the electric scooter subscription service example described earlier, for example, an offer to join a shared scooter service can be surfaced to users between the ages of 18 to 80 who reside within areas that are only partially serviced by public transit, do not currently have a vehicle, and whose user profiles show an interest in new technologies or environmental issues. These characteristics of the user can be obtained, for example, through a query of multiple data sets from different parties that do not trust each other to identify a set of userIDs or profiles that are eligible.

Figure 22:
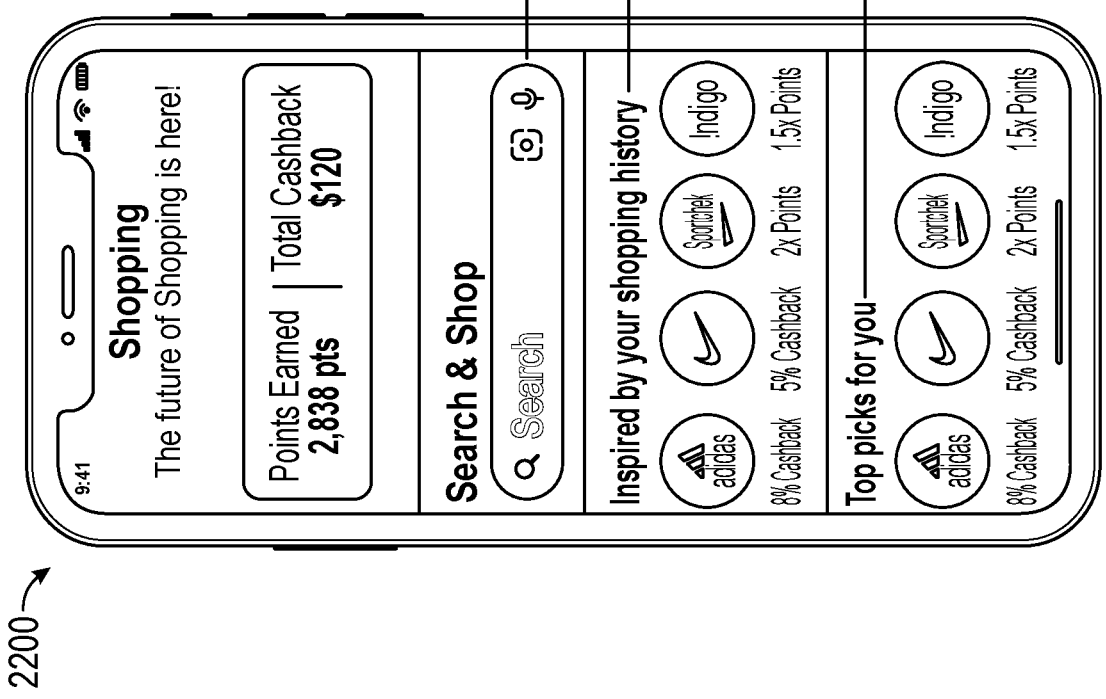
FIG. 22, FIG. 23, and FIG. 24 are example renderings of an interface having multiple offers shown that can be presented in various orders, according to some embodiments.

FIG. 22 is an example user interface rendering 2200 for a mobile shopping application. User can search for sellers or item offers. Semantic similarity capabilities also used for improved relevancy and ranking. Offers can be based on descriptive information available on recent, frequent, or monetary significant interactions with merchants.

Figure 23:

FIG. 23 shows example rendering 2300 of a mobile browser interface having multiple local deals based on device location and nearby merchants. Selected offers may be based on form geo-data on frequent, recent shopping location, context and augmentation features from the implicit user transactional data.

Figure 24:
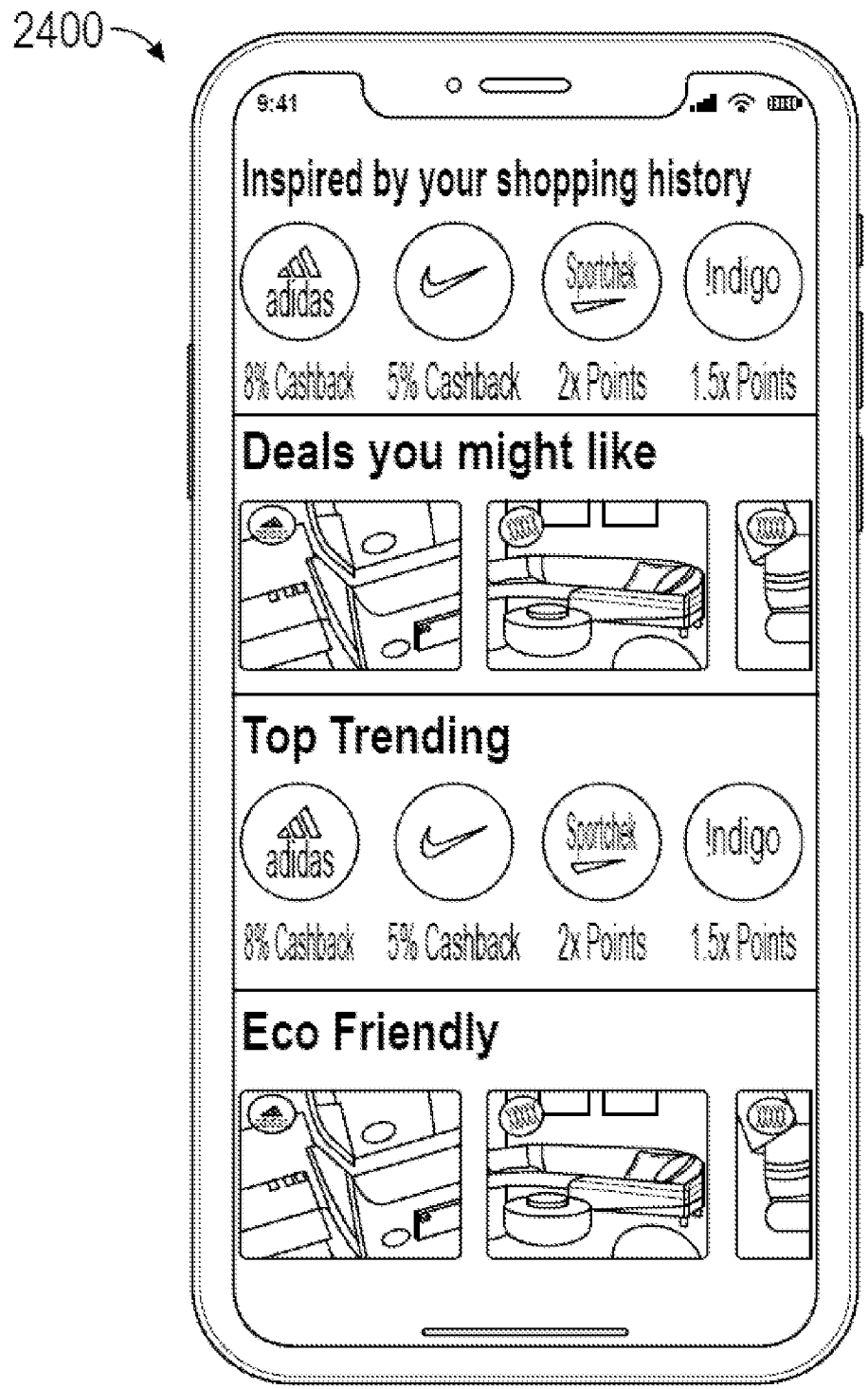

FIG. 24 shows example rendering 2400 of an interface having multiple offers shown that can be presented in various orders, according to some embodiments. For example, coupon recommender uses multi-armed bandits, a reinforcement learning technique which can be applied at the actual coupon level and not just merchant. Merchants may be displayed based on captured user searches and clicks, and intent data. Trending merchants may be displayed from click data collected on popular and trending coupons. Eco-friendly options may be determined based on sustainability and ESG scores.

In terms of the offers being shown in this section, and the listing and ranking thereof, the interface may be adapted to customize the rankings and listings of offers and/or merchants based on a prediction on the most likely merchants the user will interact with.

For example, FIG. 23 shows local deals based on a device location, which is around CN Tower, a landmark in Toronto, Canada. There are a number of merchants close to the CN Tower that may have existing promotions. The device location may be obtained from a current geo-data, or may be from a historical geo-data, or both.

Such predictions can be shared with internal and external partners as 'signals' to improve on product and offer recommendations.

Figure 25:
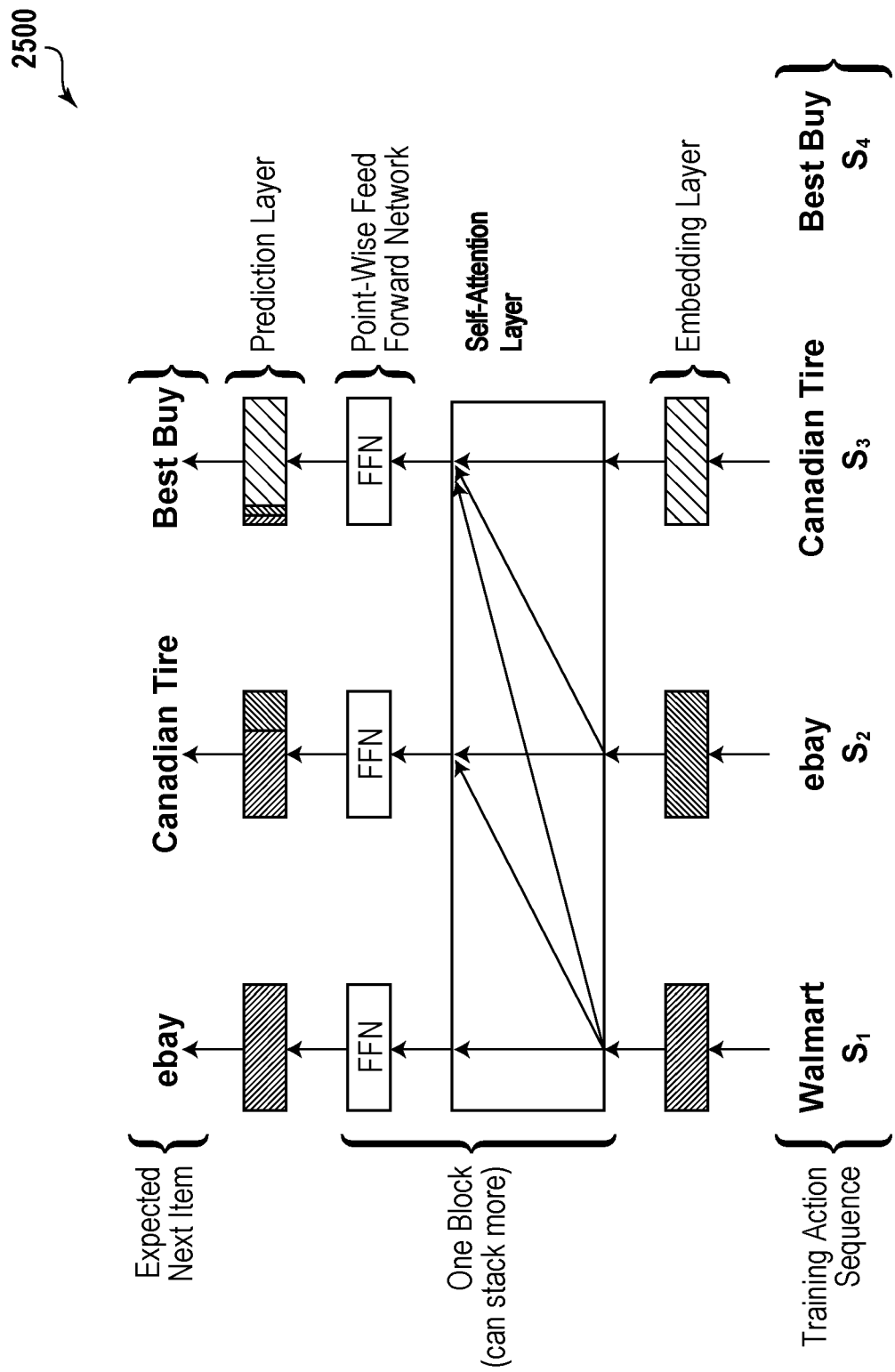
FIG. 25 shows an example machine learning model architecture for estimating an expected next item, according to some embodiments. This expected next item can be used to determine an order of offers that are being shown in the user interface.

FIG. 25 shows an example machine learning model architecture 2500 for estimating an expected next item, according to some embodiments. This expected next item can be used to determine an order of offers that are being shown in the user interface.

The new model can be used to initially leverage implicit events from already available transactional data. The model can be extended to later also leverage new intent events (searches and logs) to be captured from user sessions.

Interactions between users and merchants through financial transactions and payment data, alongside additional contextual data obtained on user and merchant can be tracked and processed.

The model can be used to predict, per user or rather active user, the most likely merchants they will next interact with. The recommender output is expected as a sequence or a list of merchants alongside confidence scores.

Hyperparameters were used in the training. They are:

| Hyperparameters | Value | Default or Set |
|---|---|---|
| max length of sequence | 200 | Set |
| Droupout rate | 0.2 | Set |
| Batch size | 128 | Default |
| Learning rate | 0.001 | Default |
| hidden units | 50 | Default |
| number of blocks | 2 | Default |
| number of epochs | 201 | Default |
| number of heads | 1 | Default |
| l2_emb | 0.0 | Default |

Example training data can be observed below:

| Client No | Merchant Name | Transaction Time |
|---|---|---|
| 100170 | Tim Hortons | 2021 Jun. 21 08:34:09 |
| 100170 | Mcdonald's | 2021 Jun. 21 10:30:21 |
| 100170 | Canadian Tire | 2021 Jun. 23 12:13:32 |
| 920040 | Canadian Tire | 2021 Jun. 23 18:11:11 |
| 920040 | Dollarama | 2021 Jun. 25 00:02:19 |

| Client Index | Merchant Index |
|---|---|
| 1 | 123 |
| 1 | 3454 |

-continued

| | |
|---|---|
| 1 | 567 |
| 2 | 567 |
| 2 | 789 |

Figure 26:
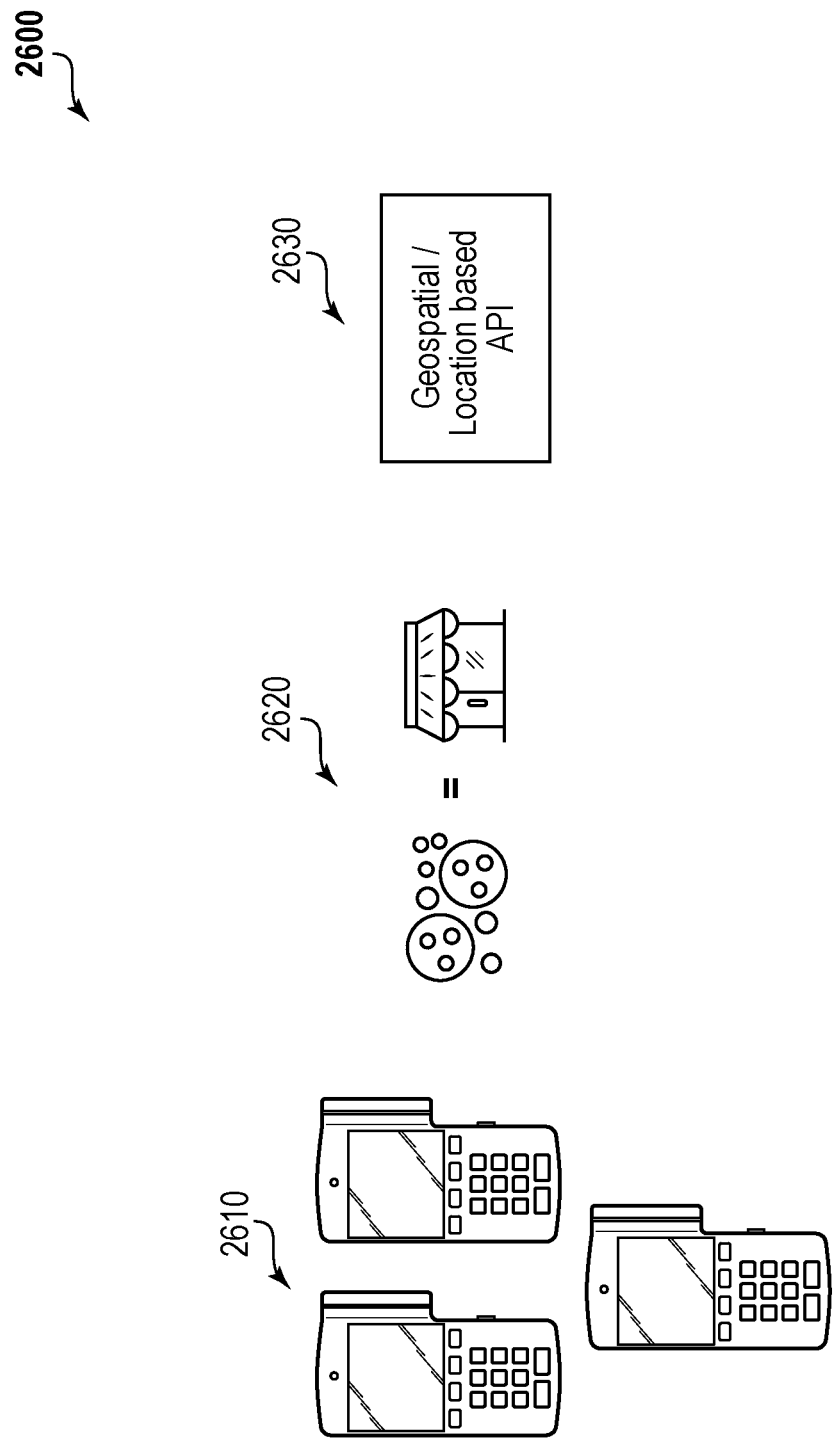
FIG. 26 is an example clustering approach for point of sale devices, according to some embodiments.

FIG. 26 is an illustration 2600 showing an example clustering approach for point-of-sale (POS) devices, according to some embodiments. For example, when it is detected that a user has shopped at multiple POS devices 2610 in a predetermined time frame (e.g., 6 or 12 hours), the location of each POS devices may be clustered to represent a physical merchant location. The merchant location may include one or more merchants. Multiple point-of-sale terminals may be clustered together to represent one physical merchant location 2620. Nearby merchant offers may be populated, and presented to the user on an user interface on a mobile device. Detection of user transactions at multiple POS devices may be in real time or near real time, when a credit card or bank card has been used at said POS devices. Enrichment of physical locations with third party data 2630 may provide cleaner merchant names and geo-locations.

Figure 27:
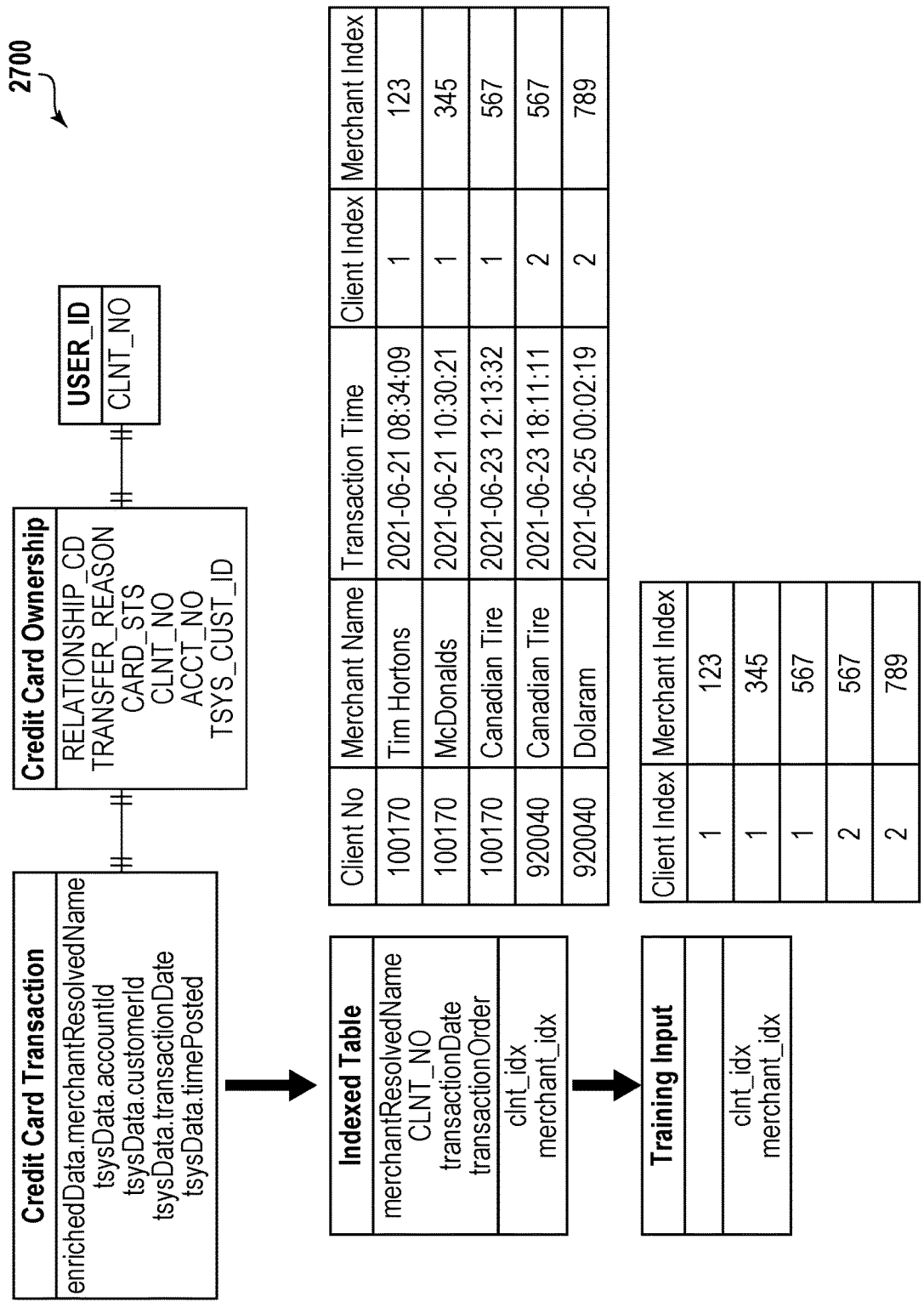
FIG. 27 is an example data transformation table, according to some embodiments.

FIG. 27 is an example data transformation table 2700, according to some embodiments. The credit card information is only captured and used with user's consent, which may be previously given. When a credit card is swiped or otherwise used to conduct a transaction at a POS device, the credit card transaction may be analyzed to obtain transaction data, including for example merchant name, account name, user ID, transaction time, client index, merchant index, and so on. The transaction data may be used to train a machine learning model for making prediction for one or more recommendations that should be surfaced to the user.

Figure 28:
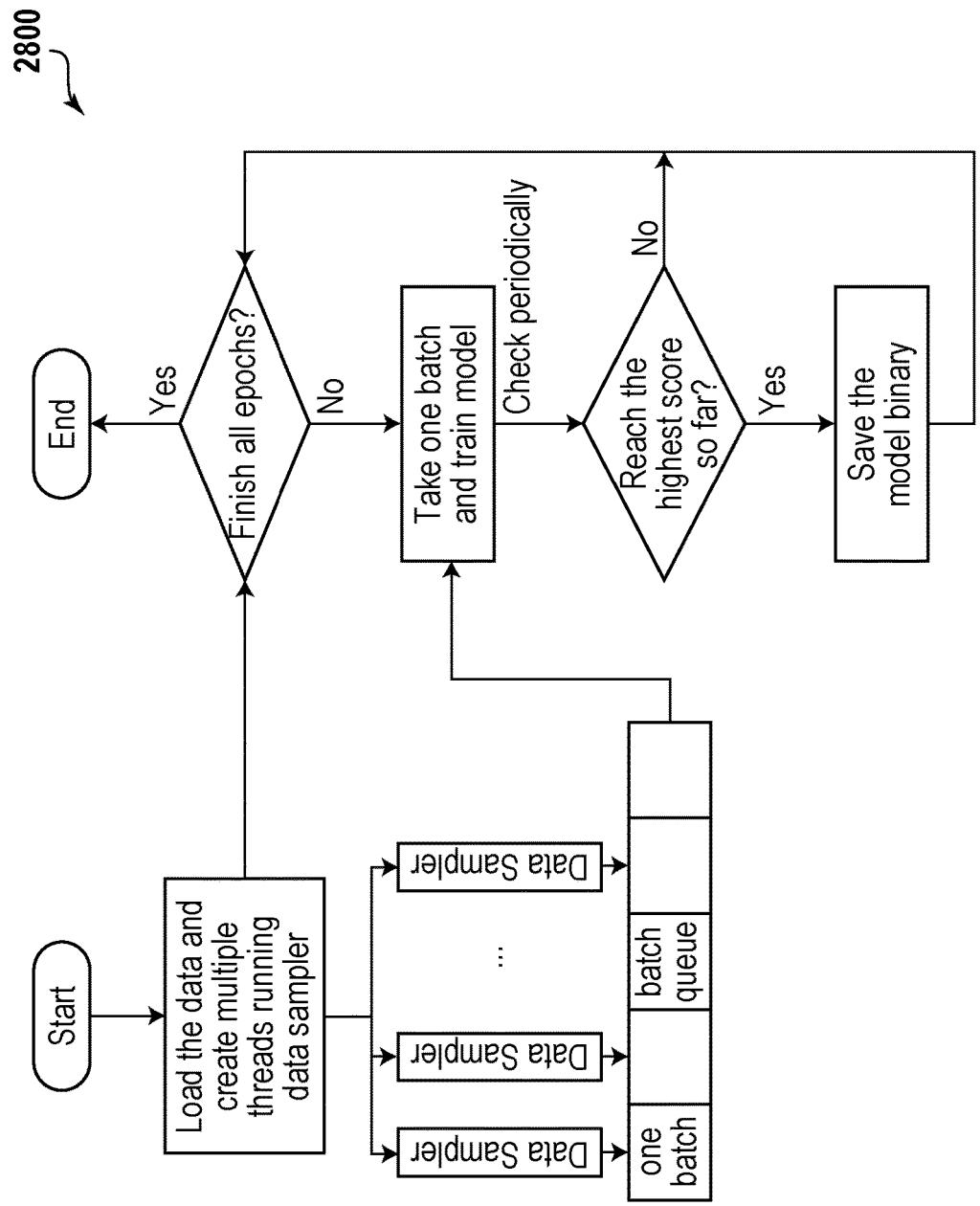
FIG. 28 is a block schematic of an computational approach for training a model using multiple threads, according to some embodiments.

FIG. 28 is a block schematic of an computational process 2800 for training a machine learning model using multiple threads, according to some embodiments. Data, such as transaction data from multiple credit card transactions for the same user may be used for training in multiple threads running a multiple data samplers.

Figure 29:
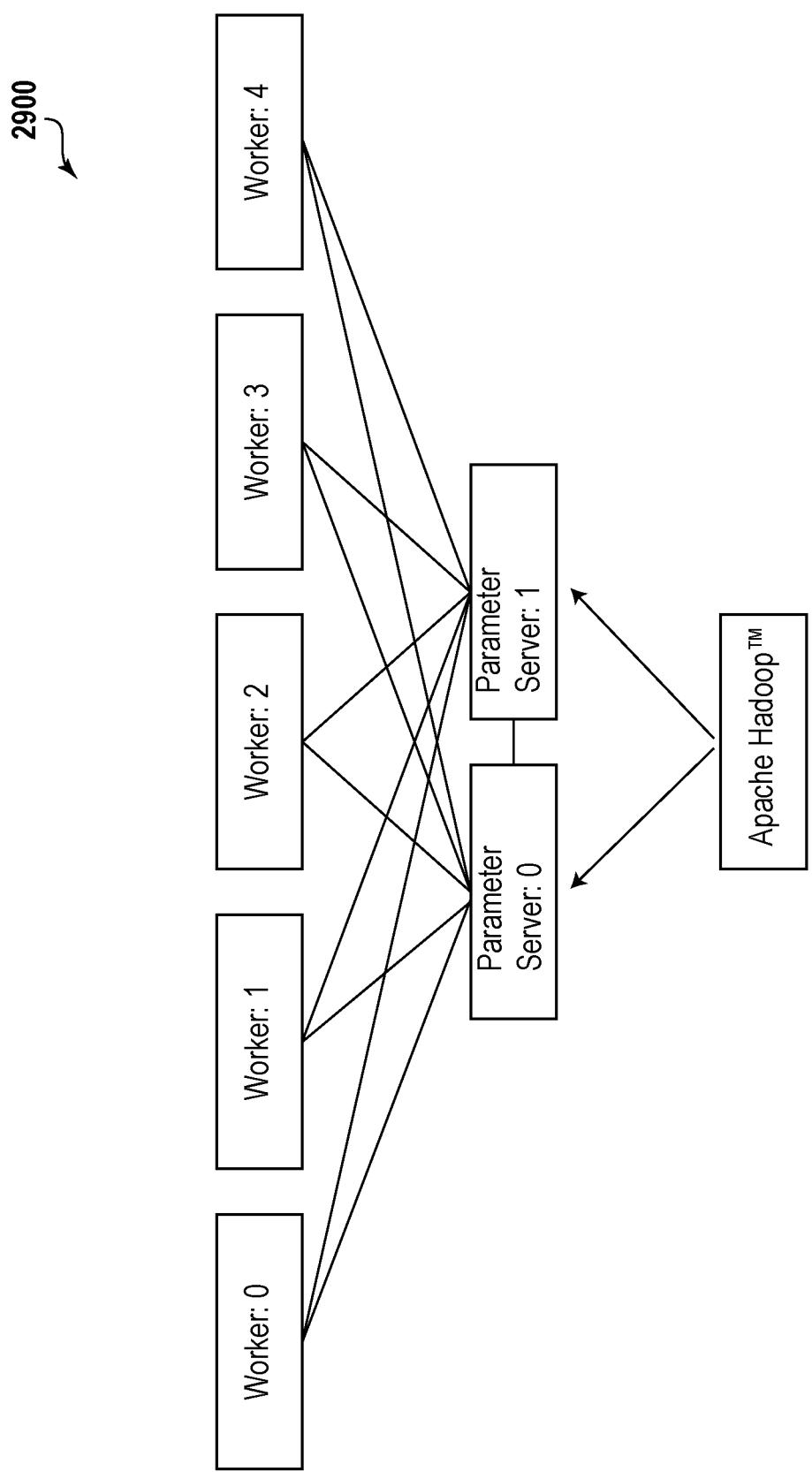
FIG. 29 is a block schematic of a computational structure for using multiple workers for training a model using multiple threads, according to some embodiments.

FIG. 29 is a block schematic of a computational structure 2900 for using multiple workers for training a machine learning model using multiple threads, according to some embodiments.

Each worker has a copy of the training data, calculates the gradient, and sends the weight update to the parameter server (ps). The parameter server receives weight updates from all workers, update the model, and send the latest model parameters to each worker upon request. In some embodiments, Each worker may perform the process 2800 in FIG. 28.

Instead of manually create worker or parameter server nodes, the approach can leverage the open source framework Tensorflow™ on Yarn (TonY) to natively run deep learning jobs on Apache Hadoop™. TonY enables running either single node or distributed training as a Hadoop™ application.

Figure 30:
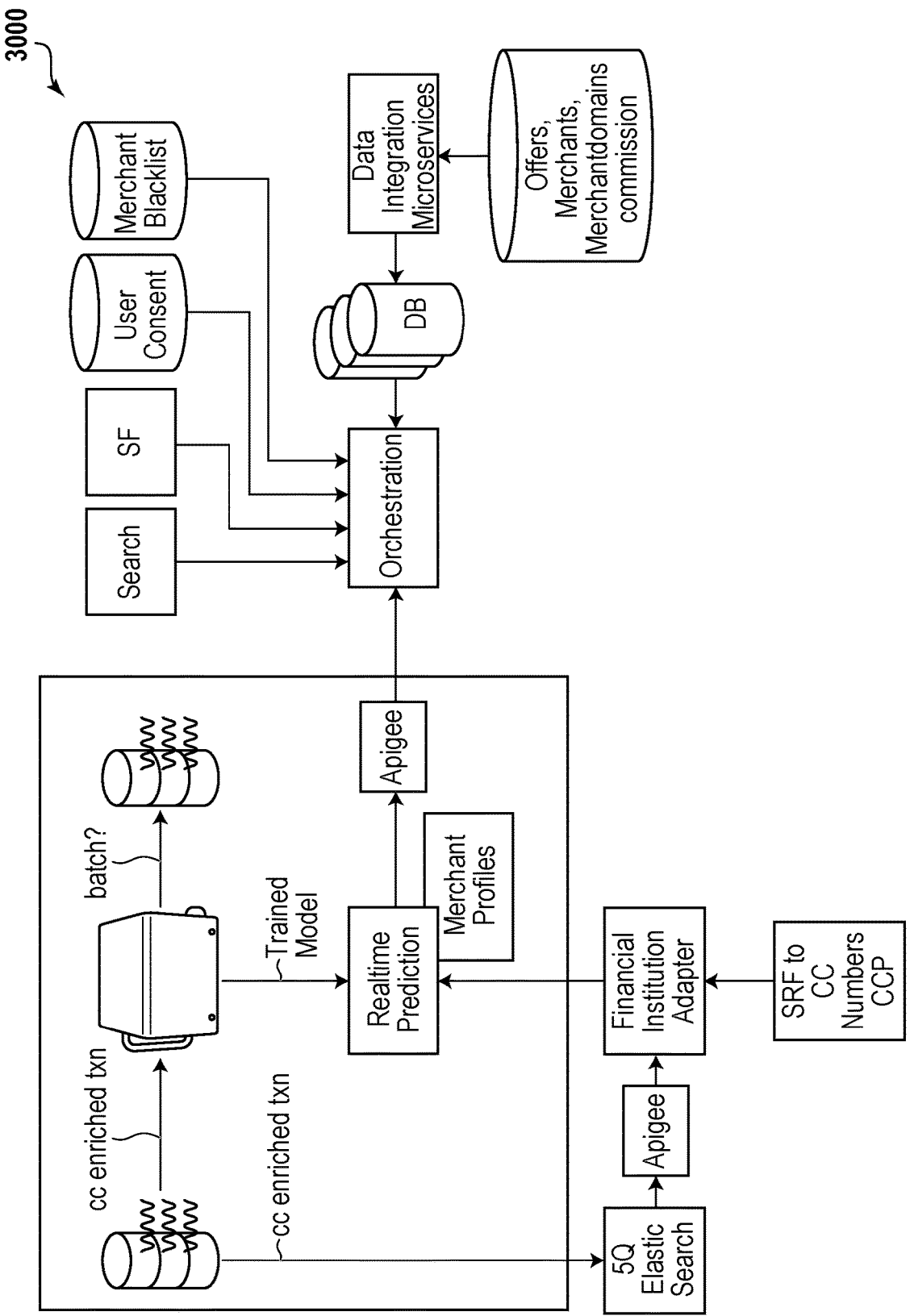
FIG. 30 is a block schematic of a system for real-time predictions for training a model using multiple threads, according to some embodiments.

FIG. 30 is a block schematic of a system 3000 for real-time predictions for training a model using multiple threads, according to some embodiments.

The prediction outputs from a machine learning model trained can include data elements, such as a top ranking, a user identifier (SRF), next merchant(s) a user is likely to interact with, next merchant categories—MCC codes, next merchant URLs the user is likely to interact with, next merchant categories such as industry types, tracking IDs, prediction dates, and other included metadata. A user consent database is queried by the orchestration engine prior to making any predictions or recommendations to the user using the user's profile data or transaction data.

Figure 31:
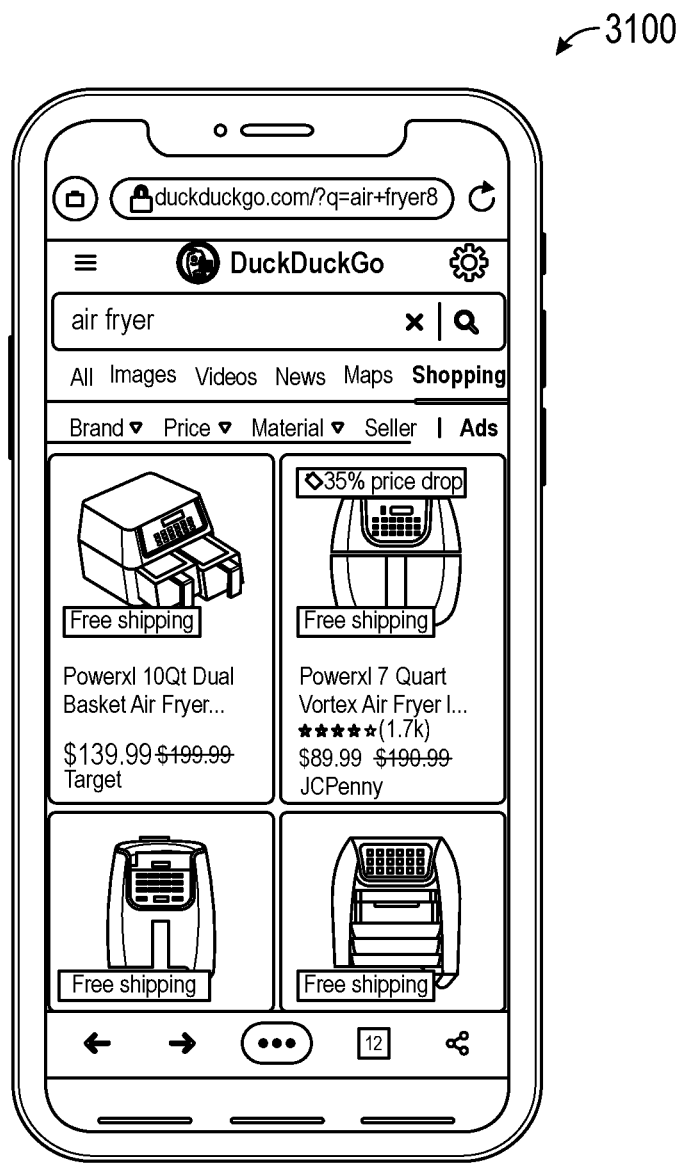
FIG. 31 is an example user interface, according to some embodiments.

FIG. 31 is an example user interface 3100, according to some embodiments.

In this approach, a backend system consumes information from a Shopping API and generates own presentation layer for experience, including Offer Module and badging. Product search results can be used in an application presentation layer, and the user interface can be configured to provide the user with the ability to filter results.

An offers module and badging can be established, and the payment experience and cash-back process with merchants can be controlled, whereby the backend system also offer content and display.

Figure 32:
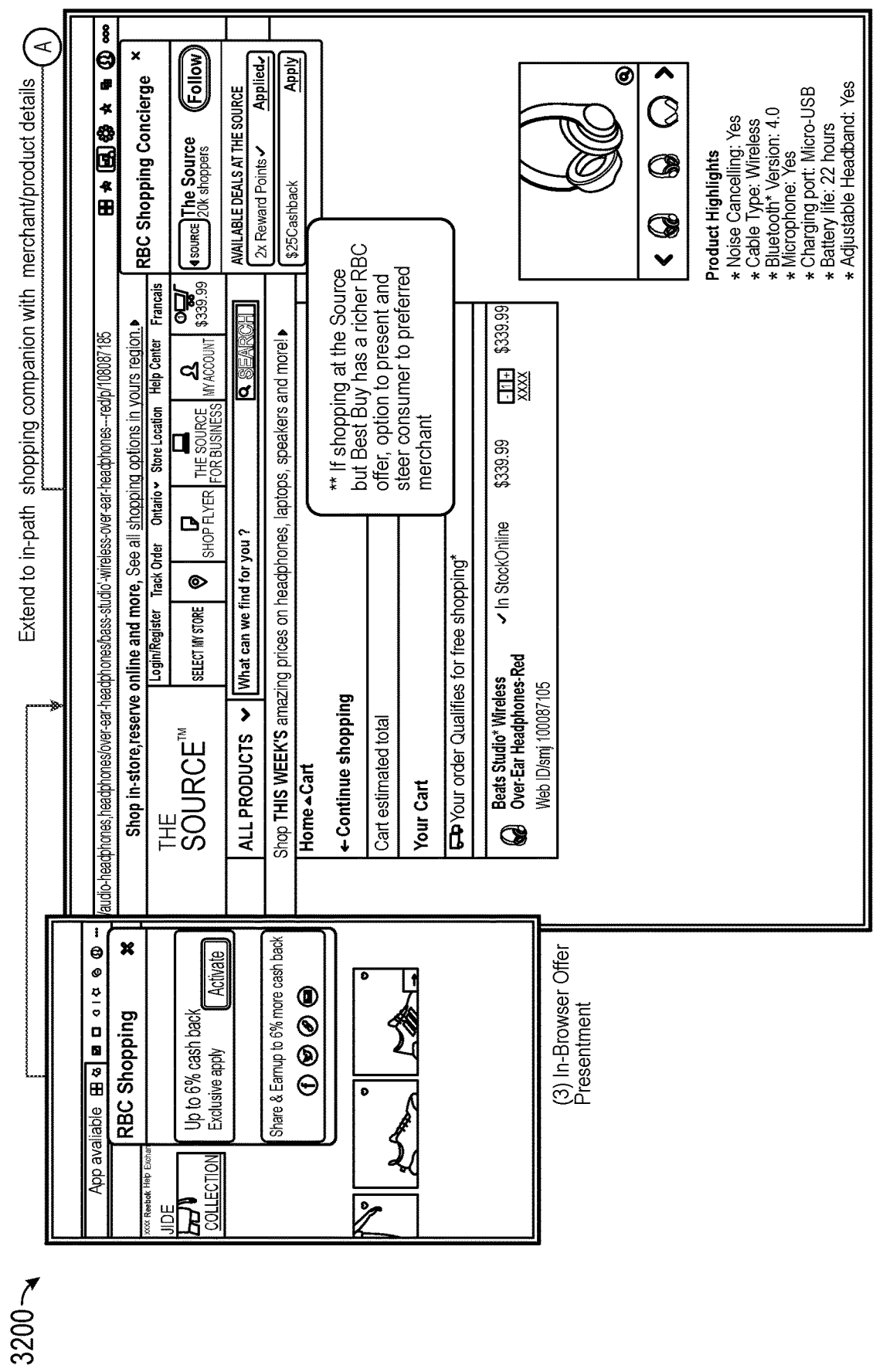
FIG. 32 shows an example extension of an in-path shopping comparison.
Figure 32:

FIG. 32 shows an example extension 3200 of an in-path shopping comparison. A user may be browsing various products a merchant website (e.g., "The Source™", and a Shopping Concierge floating window may be generated and updated to show one or more offers presented to the user as she is browsing. The Shopping Concierge floating window may be within a HTML frame, or maybe a pop-up window. The Shopping Concierge floating window may be sized appropriately depending on the type of browser the user is currently using. For example, if the user is on a browser that is on a desktop or laptop, the Shopping Concierge floating window may be sized to occupy one fifth or less of the screen available to the user. For another example, if the user is on a browser that is on a mobile device such as a phone or a tablet device, the Shopping Concierge floating window may be sized to occupy one third of the screen available to the user.

As FIG. 32 shows, the Shopping Concierge floating window may display a range of information that may be of interest to the user, including for example historical price for the item currently displayed in the browser, price comparison chart from different vendors or merchants, offers available from each of the vendor or merchant, and any applicable credit or points that may be applied for purchasing the item.

Figure 33:
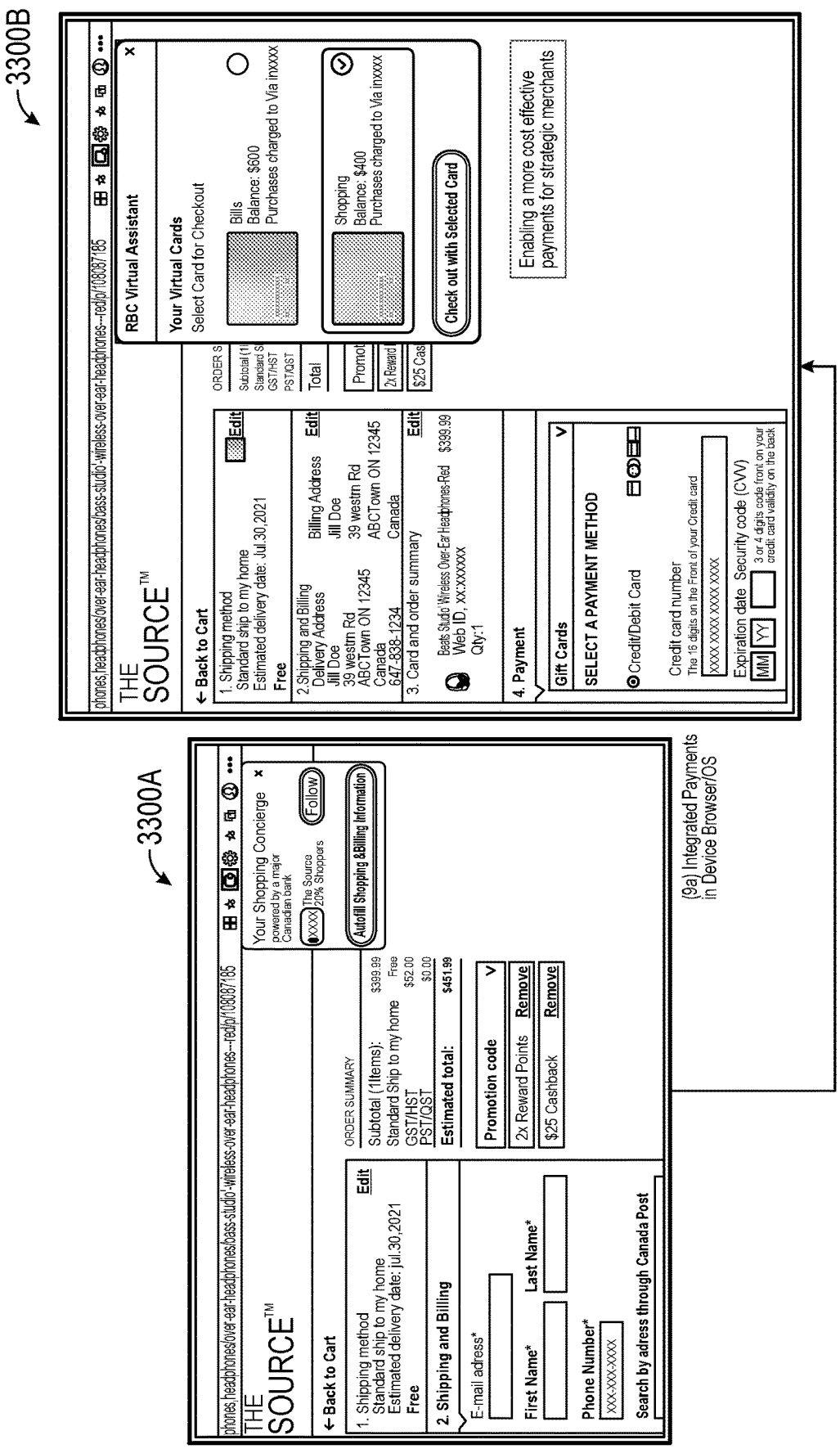
FIG. 33 is a set of renderings showing an example integrated payment in a device browser or operating system, according to some embodiments.

FIG. 33 is a set of renderings 3300A and 3300B showing an example integrated payment in a device browser or operating system, according to some embodiments. For example, the system back-end 102 is able to successfully autofill shipping, billing and payment card details in a variety of checkout scenarios and into any iframe-supported checkout process.

The front-end controller 110 can monitor for changes of the Document Object Model (DOM), and cause, when appropriate, an injection (e.g., iframe injection) once a checkout button is clicked. The front-end controller 110 may, in some embodiments, identify the structure of a webpage or a response message (e.g., through interrogating a DOM structure), and directly modify the rendered user interface through the identification of sections in the DOM structure, and further cause to modify, add, or transform one or more web elements or code snippets to perform autofill of values in one or more fields of the user interface rendered at browser 118 or mobile application 116.

For example, during the checkout process, the front-end controller 110 can, collect web forms and data such as shipping address, contact information, and payment information (e.g., credit card details), and fill each of the input fields in a given form, as shown in FIG. 33.

Figure 34:
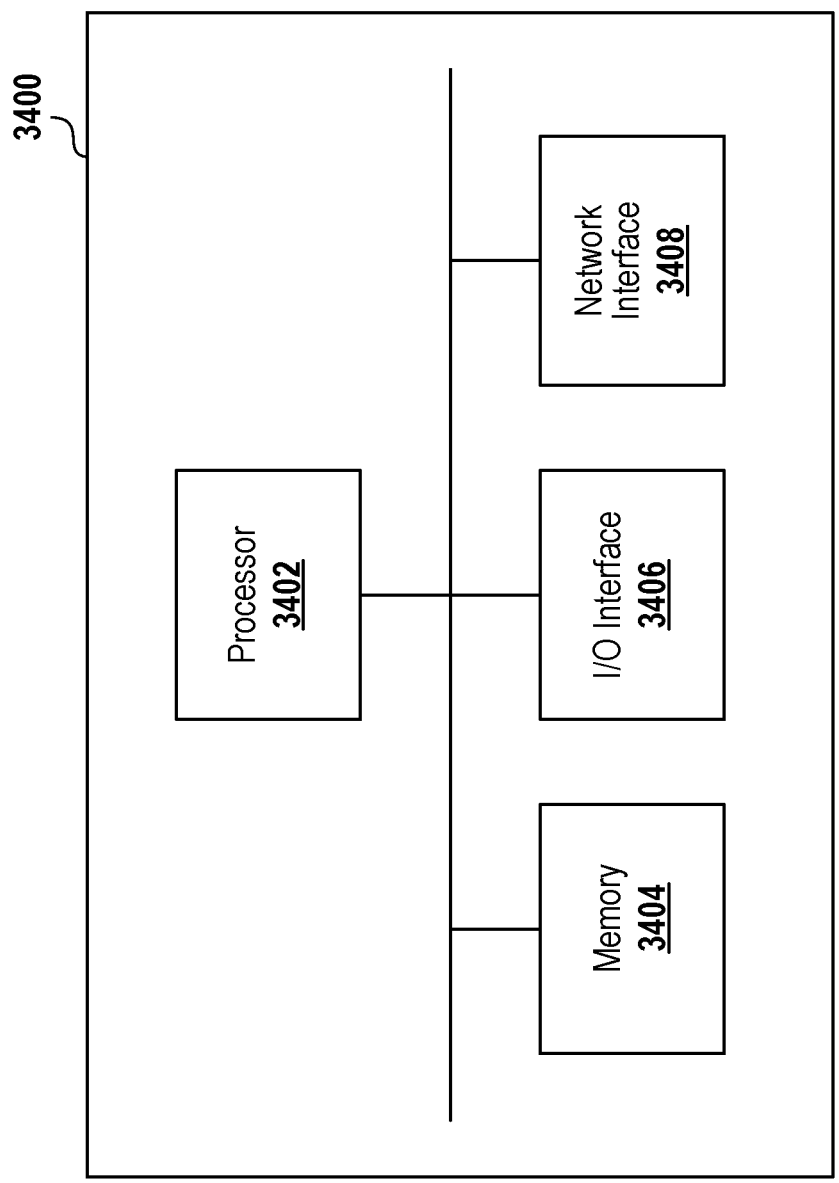
FIG. 34 is a block schematic process diagram of computing system adapted for orchestrating user interface journeys, according to some embodiments.

FIG. 34 is a block schematic process diagram of computing system 3400 adapted for orchestrating user interface journeys, according to some embodiments. The computing system 3200 can be utilized to provide the features of system 100, the front-end 104 and/or the back-end 102. The computing system 3400 can include a backend server or computer having corresponding processor 3402, computer memory 3404, input/output interfaces 3406, and network interfaces 3408.

The orchestration system 100 utilizes a mobile application as the system front-end 104 that communicates across the communication interface at network 150 with the system back-end 102, which could be a computer server that is configured to orchestrate the rendering of various web elements and pages, including interactive control elements, depending on various trigger conditions being observed as being triggered. In this example, the system back-end 102 may be specially configured to either periodically or continuously estimate a state position of the customer's "journey", which can be used as a model input into a mechanism that automatically determines which interactive control elements to display, when, and where. This is a non-trivial computer problem, because the state position of the customer's journey may not always be evident in the types of pages being visited or even the types of interaction. State and estimated positions can be defined and tracked as a data record, data field as part of a data structure representing the user's history.

In some embodiments, a set of static state positions can be pre-defined, each representing different steps within a purchasing journey, for example, from a first state representing need identification, a second state representing initial research, a third state representing product/service short-listing, a fourth state representing price comparisons, and a fifth state representing purchase. In other embodiments, the set of state positions instead can be identified using non-supervised learning approaches for generating clusters and distances, and tagged with fuzzy/estimated labels based on known parameters about the specific pages, sequence of pages, or types of pages being visited as part of that state.

State positions can be modelled as data structures such as linked list objects that have transition thresholds between them, and in some embodiments, the state positions can include transitions back to earlier states. The state positions can be modelled similar to finite state machines having fuzzy transitions, as the system is required to estimate the state unless there is a definite activity being conducted (e.g., a purchase is always indicative of a purchase state). A user's page traversal history in previous shopping sessions are processed and used to improve the accuracy of the state estimation. If there is not enough information available, or alternatively, a similar demographic or cluster of other users can be used to as a model for estimating state positions and transitions thereof.

In a first non-limiting example practical embodiment, a user with a medium sized history of page traversals, interactions, queries, and payments has provided consent to allow his/her data to be used to tune the relevance of advertisements or offers being provided. This consent, for example, can be provided through an opt-in mechanism, and in some cases, enhanced rewards and custom in-path offers may be made available. The user uses his/her mobile application on his/her device often and has a sizeable history.

The orchestration engine is configured to optimize the rendering of relevant offers or visual overlays that are designed to be useful for the user, and to aid the user in making purchasing decisions. In this example, the optimization includes an input that is the user's estimated state position in a shopping journey. However, the mobile application and the orchestration engine both are never entirely certain what stage the user is in a shopping journey (as the user may not be able to articulate it either as the shopping journey can be a fluid process), and the mobile application and the orchestration engine are required to make an estimation.

For example, some users put items into a online shopping cart not for purchase, but rather as a pseudo short-list and they remove products before they ultimately make a purchase. On the other hand, some users may use tools such as wish-lists, multiple browser windows, across multiple connected devices, etc., to represent their preferred approach for conducting research.

The orchestration engine periodically processes existing data sets to estimate a position, and this can be done, for example, with each page transition, or with each loading of visual elements on a page. As the processing may be computationally intensive, it may instead conduct the estimation instead every few pages (e.g., 2, 3, 4, 5) page loads.

The user's previous history or similar demographics can be used to map out through clustering, what types of pages (e.g., the elements thereon) relate to different steps. In this example, the user goes through some or all of a combination of a first state representing need identification, a second state representing initial research, a third state representing product/service short-listing, a fourth state representing price comparisons, and a fifth state representing purchase.

For a particular page, the user's state representations could look like the following table. These table values can be obtained based on clustering approaches based on previous shopping journeys.

| State 1 | State 2 | State 3 | State 4 | State 5 |
| --- | --- | --- | --- | --- |
| 0.05 | 0.05 | 0.41 | 0.39 | 0.2 |

Each of these underlying state representations, for example, can be established using a machine learning model that specifically clusters elements of information that can be extracted, for example, from key words frequencies extracted from the underlying HTML code (e.g., if there are a large number of links available, that could likely be a research state like state 2), overlay elements visible on the page (e.g., if there are a number of overlay elements present, those could be modal overlays, such as state 1), logos/images present (e.g., if there are various payment provider logos being rendered, that's potentially state 4 or 5), etc. These aspects are not hard coded, and instead can be provided to a machine learning model which is trained to optimize the state estimation through supervised learning or feedback after the purchasing journey is completed and the system can process the previous information knowing that a purchase was finally consummated to re-train and tune the system.

Accordingly, in the example above, the user, at a particular point in time in the shopping journey, might be at state 3 or 4 (in this case, if they are tied, the system can simply tie-break with a pseudo-random number generator), and the estimated state position can be provided as an input into the orchestrator's determination (e.g., the machine learning model) controlling which visual interface element, how, and/or other characteristics of the in-path offer or information to be rendered. As an extension of the features noted above in respect of tuning and training the system to improve the probability of a positive interaction, the specific estimated state can be used as a specific input.

For example, if a user is estimated to be on the product/service short-listing, the chosen in-path offer that has an improved chance of a positive interaction may be a product-specific offer for one of the short-listed products/services, so that the user is able to obtain a financial incentive for making a decision among the short-listed products or services. Accordingly, both the user and the company making the offer are able to benefit from the increased relevance of the offer as the company is able to make a sale, and the user is able to obtain a highly relevant benefit at a relevant time in the journey. Conversely, providing an advertisement for another product when a user already has made up his/her mind on a product (e.g., at states 4 or 5), could be very negative as the user is served an ad that is not relevant and thus discards it from consideration.

In a variant embodiment, the machine learning model success optimization is not based on consummated purchases or click-throughs, but rather, tracked or estimated state transitions to a next state (e.g., with the orchestrator's visual element related product selected).

An example set of machine learning model inputs and outputs are provided below:

| Model Input | Model Output |
| --- | --- |
| Estimated State Position = State 4 | Selected offer = 5% discount |
| User Profile Feature 1 ... N | Visual overlay color = blue |
| Offers and offer trigger Conditions 1 ... N | Size = medium |
| | DOM tree insertion area = insert into upper right hand corner frame |

The model output can represent the specific action-value combinations that yield what the model estimates to the optimized outcome for yielding an interaction with the selected offer or to proceed to a state transition to a next state or finally a purchase. For example, each of the offer rendering parameters (size, color, opacity), as well as the selection of which offer and size of offer (e.g., if there are a number of variations to choose from) can be matched with action-values which all represent estimated contributions to the success criteria, and the combination with the highest overall action-value can be selected for rendering. In some embodiments, particular offers can also be represented as having different cost values, for example, with larger offers with larger discounts being more costly, and thus the system is configured to select a highest action value that takes into consideration the cost required to present such an offer. Accordingly, the system may be tuned to automatically attempt to "right size" the offer being provided that best drives interaction while not being an outsized offer. In a variant embodiment, the offer size is dynamic and instead a range is provided to the system and the system can be configured to automatically "right size" the offer based on the outputs from the machine learning model.

Depending on the interaction (or lack thereof), or state transitions (or lack thereof), the model can be re-trained and re-tuned with feedback, either in real-time (e.g., reinforcement learning) or in batch processing at a later time.

The state representation is maintained on technical infrastructure that is adapted to provide a technical benefit of overall increased model accuracy, at the drawback of increased complexity and inputs. Accordingly, in some embodiments, the state representation model data architecture in some embodiments, can be trained during periods of low activity or during off-peak times. In other embodiments, the state representation model can be initially established based on cluster analysis, and then only iteratively updated based on new inputs to reduce overall computational burden.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

The invention claimed is:

1. A computer system for orchestrating user interface modifications, the system comprising:
   a processor;
   a communication interface;
   a non-transitory computer readable memory in communication with the processor, the memory storing software code, when executed, cause the system to:
   obtain through the communication interface, a first data set representative of intercepted data communication messages between a user interface of a user and a merchant hosting server, the first data set representing queries or navigation inputs entered by the user on the user interface;
   obtain through the communication interface, a second data set representing an instruction set for loading visual elements on the user interface provided from the merchant hosting server;
   analyze the first data set to obtain one or more user-specific characteristics;
   determine, when the user-specific characteristics associated with the user satisfy one or more trigger conditions associated with a current resource offering; and
   responsive to a determination that the user-specific characteristics associated with the user satisfy the one or more sets of trigger conditions:
   inject, into the instruction set for loading the visual elements on the user interface provided from the merchant hosting server, code corresponding to an interactive visual element corresponding to the current resource offering such that the user interface renders the interactive visual element; and receive a navigation input from the user indicating, through the interactive visual element, that the current resource offering is executed by the user; and execute a set of machine codes associated with the current resource offering to cause the user interface to render a shopping interface for the user.

2. The system of claim 1, wherein the trigger condition is associated with at least one of an in-journey offer, an in-journey coupon, and an in-journey product recommendation.

3. The system of claim 1, wherein at least one of the first data set and the second data set are provided to a database corresponding to the user stored on a protected data storage to update a user profile of the user.

4. The system of claim 3, wherein the software code, when executed, further cause the system to:
process one or both of the first data set and the second data set to estimate a state position of a browsing journey of the user for browsing a product or a service; and
inject the code into the instruction set for loading visual elements on the user interface based on at least on the estimated state position of the browsing journey of the user.

5. The system of claim 4, wherein the trigger condition is associated with a target set of one or more target state positions, and wherein the injection of the instruction set for loading visual elements on the user interface provided from the merchant hosting server occurs at a visual position corresponding to a visual frame associated with one of the one or more target state positions associated with the trigger condition.

6. The system of claim 5, wherein a machine learning model architecture representative of user preferences is maintained on the protected data storage, and the machine learning model architecture representative of user preferences is periodically trained based on action value pairs representing rendering characteristics of triggers associated with the navigation input from the user indicating, through the interactive visual element, that the trigger condition has positively interacted to optimize a loss function to tune the rendering characteristics to automatically improve a probability of a positive interaction; and wherein the machine learning model architecture representative of user preferences is utilized to determine the rendering characteristics associated with a interactive visual element associated with the trigger condition.

7. The system of claim 6, wherein the rendering characteristics include a selection of a target state position from the target set of the one or more target state positions, the selection of the target state position determining when in the browsing journey of the user the interactive visual element will be rendered.

8. The system of claim 7, wherein the one or more target state positions comprise one or more of: a research state, a browsing state, a purchasing state, a payment selection state, and a purchased state.

9. The system of claim 5, wherein the rendering characteristics include at least one of a size, a position, a color, or an opacity of the interactive visual element.

10. The system of claim 1, wherein the data sets representative of intercepted data communication messages between a user interface of a user and a merchant hosting server are intercepted from communications between at least one of a mobile application, a customized browser having interfaces for communicating the data communication messages, or a browser extension coupled to a browser, the browser extension having the interfaces for communicating the data communication messages.

11. A computer-implemented method for orchestrating user interface modifications, the method comprising:
obtaining, through a communication interface, a first data set representative of intercepted data communication messages between a user interface of a user and a merchant hosting server, the first data set representing queries or navigation inputs entered by the user on the user interface;
obtaining, through the communication interface, a second data set representing an instruction set for loading visual elements on the user interface provided from the merchant hosting server;
analyzing the first data set to obtain one or more user-specific characteristics;
determining, when the user-specific characteristics associated with the user satisfy one or more trigger conditions associated with a current resource offering; and
responsive to a determination that the user-specific characteristics associated with the user satisfy the one or more sets of trigger conditions:
injecting, into the instruction set for loading the visual elements on the user interface provided from the merchant hosting server, code corresponding to an interactive visual element corresponding to the current resource offering such that the user interface renders the interactive visual element;
receiving a navigation input from the user indicating, through the interactive visual element, that the current resource offering is executed by the user; and
executing a set of machine codes associated with the current resource offering to cause the user interface to render a shopping interface for the user.

12. The method of claim 11, wherein the trigger condition is associated with at least one of an in-journey offer, an in-journey coupon, and an in-journey product recommendation.

13. The method of claim 11, wherein at least one of the first data set and the second data set are provided to a database corresponding to the user stored on a protected data storage to update a user profile of the user.

14. The method of claim 13, comprising:
processing one or both of the first data set and the second data set to estimate a state position of a browsing journey of the user for browsing a product or a service; and
injecting the code into the instruction set for loading visual elements on the user interface based on at least on the estimated state position of the browsing journey of the user.

15. The method of claim 14, wherein the trigger condition is associated with a target set of one or more target state positions, and wherein the injection of the instruction set for loading visual elements on the user interface provided from the merchant hosting server occurs at a visual position corresponding to a visual frame associated with one of the one or more target state positions associated with the trigger condition.

16. The method of claim 15, wherein a machine learning model architecture representative of user preferences is maintained on the protected data storage, and the machine learning model architecture representative of user preferences is periodically trained based on action value pairs representing rendering characteristics of triggers associated with the navigation input from the user indicating, through the interactive visual element, that the trigger condition has positively interacted to optimize a loss function to tune the rendering characteristics to automatically improve a probability of a positive interaction; and wherein the machine learning model architecture representative of user preferences is utilized to determine the rendering characteristics associated with a interactive visual element associated with the trigger condition.

17. The method of claim 16, wherein the rendering characteristics include a selection of a target state position from the target set of the one or more target state positions, the selection of the target state position determining when in the browsing journey of the user the interactive visual element will be rendered.

18. The method of claim 17, wherein the one or more target state positions comprise one or more of: a research state, a browsing state, a purchasing state, a payment selection state, and a purchased state.

19. The method of claim 15, wherein the rendering characteristics include at least one of a size, a position, a color, or an opacity of the interactive visual element.

20. The method of claim 11, wherein the data sets representative of intercepted data communication messages between a user interface of a user and a merchant hosting server are intercepted from communications between at least one of a mobile application, a customized browser having interfaces for communicating the data communication messages, or a browser extension coupled to a browser, the browser extension having the interfaces for communicating the data communication messages.

21. A non-transitory computer-readable storage medium storing instructions which when executed adapt at least one computing device to:

obtain through a communication interface, a first data set representative of intercepted data communication messages between a user interface of a user and a merchant hosting server, the first data set representing queries or navigation inputs entered by the user on the user interface;

obtain through the communication interface, a second data set representing an instruction set for loading visual elements on the user interface provided from the merchant hosting server;

analyze the first data set to obtain one or more user-specific characteristics;

determine, when the user-specific characteristics associated with the user satisfy one or more trigger conditions associated with a current resource offering; and responsive to a determination that the user-specific characteristics associated with the user satisfy the one or more sets of trigger conditions:

inject, into the instruction set for loading the visual elements on the user interface provided from the merchant hosting server, code corresponding to an interactive visual element corresponding to the current resource offering such that the user interface renders the interactive visual element;

receive a navigation input from the user indicating, through the interactive visual element, that the current resource offering is executed by the user; and execute a set of machine codes associated with the current resource offering to cause the user interface to render a shopping interface for the user.

* * * * *